United States Patent
Ono et al.

(10) Patent No.: US 9,412,180 B2
(45) Date of Patent: Aug. 9, 2016

(54) INFORMATION PROCESSING APPARATUS, INFORMATION PROCESSING METHOD, AND PROGRAM

(71) Applicant: SONY CORPORATION, Tokyo (JP)

(72) Inventors: Yuji Ono, Kanagawa (JP); Hideto Takeuchi, Tokyo (JP)

(73) Assignee: SONY CORPORATION, Tokyo (JP)

(*) Notice: Subject to any disclaimer, the term of this patent is extended or adjusted under 35 U.S.C. 154(b) by 3 days.

(21) Appl. No.: 14/370,812

(22) PCT Filed: Jan. 9, 2013

(86) PCT No.: PCT/JP2013/050209
§ 371 (c)(1),
(2) Date: Jul. 7, 2014

(87) PCT Pub. No.: WO2013/108686
PCT Pub. Date: Jul. 25, 2013

(65) Prior Publication Data
US 2015/0146921 A1    May 28, 2015

(30) Foreign Application Priority Data

Jan. 17, 2012 (JP) ................................ 2012-007538

(51) Int. Cl.
*G06T 7/20* (2006.01)
*H04N 7/18* (2006.01)
*G06K 9/00* (2006.01)

(52) U.S. Cl.
CPC .......... *G06T 7/2093* (2013.01); *G06K 9/00362* (2013.01); *G06K 9/00771* (2013.01);
(Continued)

(58) Field of Classification Search
None
See application file for complete search history.

(56) References Cited

U.S. PATENT DOCUMENTS

2011/0317874 A1* 12/2011 Ikenoue ................. G06F 3/017
382/103

2013/0155229 A1*  6/2013  Thornton ................. H04N 7/18
348/143
(Continued)

FOREIGN PATENT DOCUMENTS

JP    2006-245795    9/2006
JP    2010-49296     3/2010
(Continued)

OTHER PUBLICATIONS translation of the Office action provided in the IDS is attached as 2013554271 JPO Office Action translation last accessed May 6, 2016.*
Extended European Search Report issued Jul. 22, 2015 in Patent Application No. 13738625.6.
(Continued)

*Primary Examiner* — Siamak Harandi
*Assistant Examiner* — Narek Zohrabyan
(74) *Attorney, Agent, or Firm* — Oblon, McClelland, Maier & Neustadt, L.L.P

(57) ABSTRACT

The present technology relates to an information processing apparatus, an information processing method, and a program capable of searching for and tracking a person desired to be searched for and tracked from images captured by a plurality of cameras with high precision.

By inputting decision information used for a user to decide a searching target in a moving-object image PA captured by a monitoring camera imaging an imaging area CamA on a screen P211 indicating a searching and tracking result, as indicated by a hand H1, and by erasing a plot E from the searching and tracking result because of a distant position to which a person may not travel at an average human movement speed for about 5 seconds despite moving for a time of 5 seconds (1:00:05 to 1:00:00) from a plot A to the plot E by time-space comparison between detection results of the plots A and E, it is possible to improve precision of the searching and tracking result. The present technology can be applied to a security system or a marketing research system.

18 Claims, 25 Drawing Sheets

(52) U.S. Cl.
CPC .............. *G06T 7/2006* (2013.01); *G06T 7/208* (2013.01); *G06T 7/2033* (2013.01); *H04N 7/18* (2013.01); *G06T 2207/20148* (2013.01); *G06T 2207/30196* (2013.01); *G06T 2207/30232* (2013.01)

(56) References Cited

U.S. PATENT DOCUMENTS

| | | | | |
|---|---|---|---|---|
| 2013/0201329 A1* | 8/2013 | Thornton | ................ | H04N 7/18 348/143 |
| 2013/0201330 A1* | 8/2013 | Thornton | ................ | H04N 7/18 348/143 |
| 2015/0117835 A1* | 4/2015 | Yabuuchi | ......... | G08B 13/19613 386/230 |

FOREIGN PATENT DOCUMENTS

| | | | |
|---|---|---|---|
| JP | 2010117952 A | * | 5/2010 |
| JP | 2010-257451 | | 11/2010 |

OTHER PUBLICATIONS

Omar Javed et al., "Appearance Modeling for Tracking in Multiple Non-overlapping Cameras", Proceedings / 2005 IEEE Computer Society Conference on Computer Vision and Pattern Recognition, vol. 2, XP-010817496, Jun. 20, 2005, pp. 26-33.

Chen Change Loy et al., "Multi-Camera Activity Correlation Analysis", 2009 IEEE Conference on Computer Vision and Pattern Recognition, XP-031607354, Jun. 20, 2009, pp. 1988-1995.

Yogesh Raja et al., "User-assisted Visual Search and Tracking Across Distributed Multi-camera Networks", Optics and Photonics for Counterterrorism and Crime Fighting VII; Optical Materials in Defence Systems Technology VIII; and Quantum-Physics-based Information Security, vol. 8189, No. 1, XP-060010238, Oct. 6, 2011, 14 pages.

International Search Report issued Apr. 16, 2013 in PCT/JP2013/050209.

Daisuke Matsubara, et al., "Human Tracking with Distributed Cameras by using Similarity-based Image Search", The Institute of Electronics, Information and Communication Engineers, IEICE Technical Report, 2010, 21 page (with English abstract and English translation).

Japanese Office Action dated Feb. 16, 2016 in corresponding Application No. 2013-554271 (5 pages).

* cited by examiner

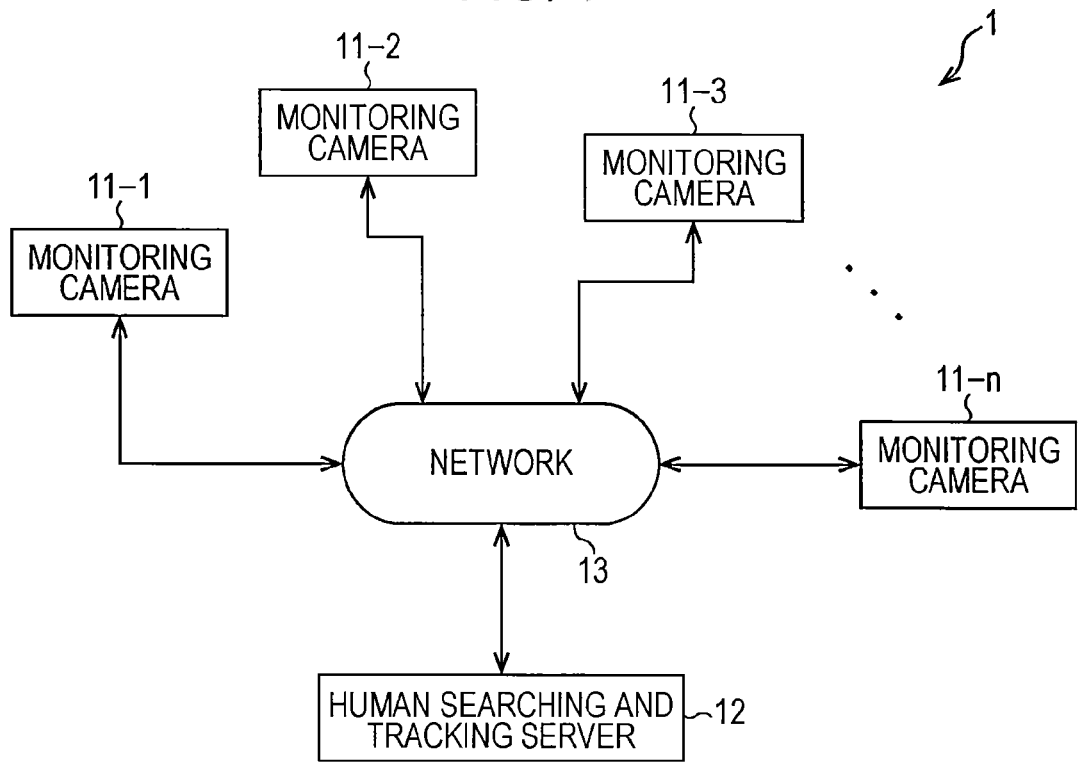
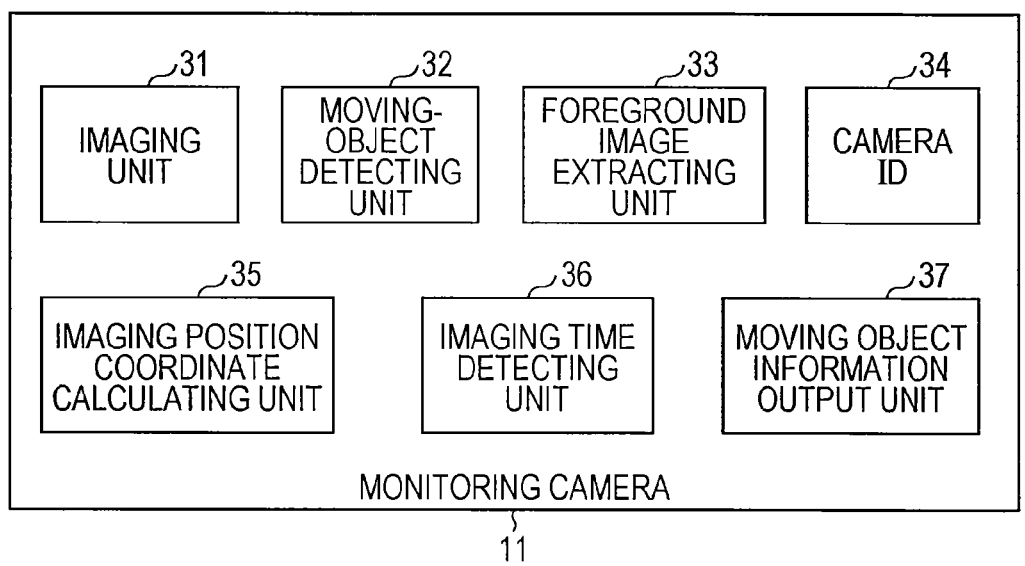

INFORMATION PROCESSING APPARATUS, INFORMATION PROCESSING METHOD, AND PROGRAM

TECHNICAL FIELD

The present technology relates to an information processing apparatus, an information processing method, and a program, and particularly, to an information processing apparatus, an information processing method, and a program configured to search for and track a person desired to be searched for and tracked from images captured by a plurality of cameras with high precision.

BACKGROUND ART

From the past, for the purpose of crime prevention, marketing, or the like, video monitoring systems have been installed in places, such as hotels, buildings, convenience stores, and urban districts, in which unspecified people come and go. In such monitoring systems, operations of confirming how suspicious individuals move and how customers move in department stores have been carried out throughout these places.

However, to confirm how each person moves within a monitoring area, it is necessary to execute work of reviewing videos acquired from a plurality of cameras, following up the movement of a person within the camera videos, and performing the following in correspondence with the person moving between the cameras. Therefore, it takes a considerable time, and thus a large burden is put on workers.

Accordingly, systems tracking a moving object within a plurality of camera videos or systems searching for a moving object have been suggested. For example, a system that performs a scheme of tracking a person within a single camera video and connecting the person between a plurality of cameras has been suggested (see PTL 1). Also, a system that performs human tracking using similar image search and that divides a foreground region in a captured image into block states, performs the similar image search in units of blocks, and determines whether the person is the same based on a matching result has been suggested (see NPL 1).

CITATION LIST

Non Patent Literature

PTL 1: Japanese Unexamined Patent Application Publication No. 2006-245795
NPL 1: Human Tracking Using Similar Image Search in Sparsely Distributed Camera Environment in Technical Report, vol. 110, no. 330, PRMU 2010-130, pp. 25 to 30, December 2010

SUMMARY OF INVENTION

Technical Problem

In the technology disclosed in PTL 1, however, it is difficult to continuously track a person using a single camera in practice. Further, the tracking is stopped since persons overlap with each other and a person is hidden behind a post or the like, and thus a tracking precision may deteriorate as a whole.

In the case of NPL 1, as a photographing time increases more and more to determine whether all of the foreground regions divided in the block states are similar, a processing time further increases. Thus, there is a concern that the precision further deteriorates.

The present technology has been devised in light of the above-mentioned circumstances and is configured to improve precision of a human searching and tracking process by deleting images unsuitable for searching among images captured by a plurality of cameras and by specifying images suitable for searching target images as decision information based on a result of the searching process by a user and subsequently repeating a process of amending the searching process.

Solution to Problem

According to a first aspect of the present technology, there is provided an information processing apparatus including: a plurality of imaging units that each capture an image, detect a moving object, extract a moving-object image configured from the image of the detected moving object, detect space position coordinates of the moving object based on the moving-object image, and output the moving-object image and moving-object information including the space position coordinates of the moving object and an imaging time at which the image is captured; a moving-object image likelihood calculating unit that calculates a moving-object image likelihood which is a likelihood of a moving-object image included in moving-object information other than searching target moving-object information, which is moving-object information including the moving-object image of the moving object which is a searching target, with respect to a moving-object image of the searching contrast moving-object information; a moving-object image threshold determining unit that determines whether each moving-object image likelihood calculated by the moving-object image likelihood calculating unit is greater than a predetermined threshold and searches for the moving-object information of the moving-object image likelihood greater than the predetermined threshold as searching result moving-object information, which is moving-object information including the moving-object image of the same moving object as the moving object of the moving-object image of the searching target moving-object information; a searching result moving-object information storage unit that stores the moving-object information searched for as the searching result moving-object information by the moving-object image threshold determining unit; an operation input unit that receives an input of decision information used for a user to decide the searching target moving-object information among the moving-object information stored as the searching result moving-object information in the result moving-object information storage unit based on the moving-object image; a time-space likelihood calculating unit that calculates a time-space likelihood which is configured from a likelihood based on the space position coordinates and the imaging time and is a likelihood of the moving-object information other than decision moving-object information, which is moving-object information for which the decision information is input, with respect to the decision moving-object information for which the decision information is input, among the moving-object information stored as the searching result moving-object information in the result moving-object information storage unit; and a time-space likelihood threshold determining unit that determines whether each time-space likelihood calculated by the time-space likelihood calculating unit is less than a predetermined threshold and erases the moving-object information of the time-space likelihood less than the predetermined threshold from the searching result moving-object information storage unit.

After the time-space likelihood threshold determining unit determines whether each time-space likelihood calculated by the time-space likelihood calculating unit is less than the predetermined threshold, the operation input unit may receive an input of decision information used for the user to newly decide the searching target moving-object information among the moving-object information stored as the searching result moving-object information in the result moving-object information storage unit based on the moving-object image. The time-space likelihood calculating unit may newly calculate a time-space likelihood which is configured from the likelihood based on the space position coordinates and the imaging time and which is a likelihood of the moving-object information other than the decision moving-object information with respect to the decision moving-object information for which the decision information is newly input, among the moving-object information stored as the searching result moving-object information in the result moving-object information storage unit. The time-space likelihood threshold determining unit may determine whether each time-space likelihood newly calculated by the time-space likelihood calculating unit is less than the predetermined threshold and erase the moving-object information of the time-space likelihood less than the predetermined threshold from the searching result moving-object information storage unit. The operation input unit, the time-space likelihood calculating unit, and the time-space likelihood threshold determining unit may repeat the same processes whenever decision information is newly input by the operation input unit.

The moving-object information further may include an ID identifying one of the plurality of imaging units capturing the moving-object image to be included. The information processing apparatus may further include: a BTF calculating unit that calculates a BTF (Brightness Transfer Function) of correcting a change in a color between the imaging units based on the two moving-object images with the different IDs identifying the plurality of imaging units each capturing the moving-object image in the searching target moving-object information, which is the moving-object information including the moving-object image of the moving object which is the searching target, and the decision moving-object information for which the input of the decision information used to decide the searching target moving-object information is received; a BTF processing unit that performs the BTF on the moving-object image of the moving-object information including the moving-object image captured by the imaging unit with the ID for which the BTF is obtained, among the moving-object information other than the decision moving-object information among the moving-object information stored as the searching result moving-object information in the result moving-object information storage unit; a BTF moving-object image likelihood calculating unit that calculates a BTF moving-object image likelihood which is configured from a likelihood based on the moving-object image and which is a likelihood of the moving-object information including the moving-object image processed using the BTF by the BTF processing unit with respect to the moving-object image of the decision moving-object information; and a BTF moving-object image threshold determining unit that determines whether each BTF moving-object image likelihood calculated by the BTF moving-object image likelihood calculating unit is less than a predetermined threshold. The time-space likelihood threshold determining unit may determine whether a time-space likelihood newly calculated by the time-space likelihood calculating unit is less than the predetermined threshold. The BTF moving-object image threshold determining unit may determine whether each BTF moving-object image likelihood calculated by the BTF moving-object image likelihood calculating unit is less than the predetermined threshold when the newly calculated time-space likelihood is not less than the predetermined threshold, and erase the moving-object information including the moving-object image for which the BTF moving-object image likelihood is less than the predetermined threshold from the searching result moving-object information storage unit when the BTF moving-object image likelihood is less than the predetermined threshold.

The moving-object image likelihood calculating unit may calculate similarity indicating a degree of similarity of each moving object as the moving-object image likelihood based on a moving-object image included in each of the moving-object image of the searching target moving-object information, which is the moving-object information including the moving-object image of the moving object which is the searching target, and the moving-object image included in the moving-object information other than the searching contrast moving-object information.

The time-space likelihood calculating unit may calculate the time-space likelihood from a relation between a time between the imaging times and a necessary time taken to travel a distance between the space position coordinates of the moving-object information other than the decision moving-object information and the decision moving-object information for which the decision information is input at an average human movement speed.

According to the first aspect of the present technology, there is provided an information processing method of an information processing apparatus including a plurality of imaging units that each capture an image, detect a moving object, extract a moving-object image configured from the image of the detected moving object, detect space position coordinates of the moving object based on the moving-object image, and output the moving-object image and moving-object information including the space position coordinates of the moving object and an imaging time at which the image is captured. The information processing method includes: a moving-object image likelihood calculating process of calculating a moving-object image likelihood which is a likelihood of a moving-object image included in moving-object information other than searching target moving-object information, which is moving-object information including the moving-object image of the moving object which is a searching target, with respect to a moving-object image of the searching contrast moving-object information; a moving-object image threshold determining process of determining whether each moving-object image likelihood calculated by the moving-object image likelihood calculating process is greater than a predetermined threshold and searching for the moving-object information of the moving-object image likelihood greater than the predetermined threshold as searching result moving-object information, which is moving-object information including the moving-object image of the same moving object as the moving object of the moving-object image of the searching target moving-object information; a searching result moving-object information storage process of storing the moving-object information searched for as the searching result moving-object information by the moving-object image threshold determining process; an operation input process of receiving an input of decision information used for a user to decide the searching target moving-object information among the moving-object information stored as the searching result moving-object information in the result moving-object information storage process based on the moving-object image; a time-space likelihood calculating process of calculating a time-space likelihood which is configured from a likelihood based on the space position coordinates and the imaging time and which is a likelihood of the moving-object information other than decision moving-object information, which is moving-object information for which the decision information is input, with respect to the decision moving-object information for which the decision information is input, among the moving-object information stored as the searching result moving-object information in the result moving-object information storage process; and a time-space likelihood threshold determining process of determining whether each time-space likelihood calculated by the time-space likelihood calculating process is less than a predetermined threshold and erasing the moving-object information of the time-space likelihood less than the predetermined threshold from the moving-object information stored in the searching result moving-object information storage process.

According to the first aspect of the present technology, there is provided a program of a computer controlling an information processing apparatus including a plurality of imaging units that each capture an image, detect a moving object, extract a moving-object image configured from the image of the detected moving object, detect space position coordinates of the moving object based on the moving-object image, and output the moving-object image and moving-object information including the space position coordinates of the moving object and an imaging time at which the image is captured. The program causes the computer to perform: a moving-object image likelihood calculating step of calculating a moving-object image likelihood which is a likelihood of a moving-object image included in moving-object information other than searching target moving-object information, which is moving-object information including the moving-object image of the moving object which is a searching target, with respect to a moving-object image of the searching contrast moving-object information; a moving-object image threshold determining step of determining whether each moving-object image likelihood calculated by a process of the moving-object image likelihood calculating step is greater than a predetermined threshold and searching for the moving-object information of the moving-object image likelihood greater than the predetermined threshold as searching result moving-object information, which is moving-object information including the moving-object image of the same moving object as the moving object of the moving-object image of the searching target moving-object information; a searching result moving-object information storage step of storing the moving-object information searched for as the searching result moving-object information by a process of the moving-object image threshold determining step; an operation input step of receiving an input of decision information used for a user to decide the searching target moving-object information among the moving-object information stored as the searching result moving-object information in a process of the result moving-object information storage step based on the moving-object image; a time-space likelihood calculating step of calculating a time-space likelihood which is configured from a likelihood based on the space position coordinates and the imaging time and which is a likelihood of the moving-object information other than decision moving-object information, which is moving-object information for which the decision information is input, with respect to the decision moving-object information for which the decision information is input, among the moving-object information stored as the searching result moving-object information in the process of the result moving-object information storage step; and a time-space likelihood threshold determining step of determining whether each time-space likelihood calculated by a process of the time-space likelihood calculating step is less than a predetermined threshold and erasing the moving-object information of the time-space likelihood less than the predetermined threshold from the moving-object information stored in the process of the searching result moving-object information storage step.

According to a second aspect of the present technology, there is provided an information processing apparatus including: a plurality of imaging units that each capture an image, detect a person, extract a person image configured from the image of the detected person, detect space position coordinates of the person based on the person image, and output the person image and personal information including the space position coordinates of the person and an imaging time at which the image is captured; a person image likelihood calculating unit that calculates a person image likelihood which is a likelihood of a person image included in person information other than searching target person information, which is person information including the person image of the person which is a searching target, with respect to a person image of the searching contrast person information; a person image threshold determining unit that determines whether each person image likelihood calculated by the person image likelihood calculating unit is greater than a predetermined threshold and searches for the person information of the person image likelihood greater than the predetermined threshold as searching result person information, which is person information including the person image of the same person as the person of the person image of the searching target person information; a searching result person information storage unit that stores the person information searched for as the searching result person information by the person image threshold determining unit; an operation input unit that receives an input of decision information used for a user to decide the searching target person information among the person information stored as the searching result person information in the result person information storage unit based on the person image; a time-space likelihood calculating unit that calculates a time-space likelihood which is configured from a likelihood based on the space position coordinates and the imaging time and is a likelihood of the person information other than decision person information, which is person information for which the decision information is input, with respect to the decision person information for which the decision information is input, among the person information stored as the searching result person information in the result person information storage unit; and a time-space likelihood threshold determining unit that determines whether each time-space likelihood calculated by the time-space likelihood calculating unit is less than a predetermined threshold and erases the person information of the time-space likelihood less than the predetermined threshold from the searching result person information storage unit.

After the time-space likelihood threshold determining unit determines whether each time-space likelihood calculated by the time-space likelihood calculating unit is less than the predetermined threshold, the operation input unit may receive an input of decision information used for the user to newly decide the searching target person information based on the person image among the person information stored as the searching result person information in the result person information storage unit. The time-space likelihood calculating unit may newly calculate a time-space likelihood which is configured from the likelihood based on the space position coordinates and the imaging time and which is a likelihood of the person information other than the decision person information with respect to the decision person information for which the decision information is newly input, among the person information stored as the searching result person information in the result person information storage unit. The time-space likelihood threshold determining unit may determine whether each time-space likelihood newly calculated by the time-space likelihood calculating unit is less than the predetermined threshold and erase the person information of the time-space likelihood less than the predetermined threshold from the searching result person information storage unit. The operation input unit, the time-space likelihood calculating unit, and the time-space likelihood threshold determining unit may repeat the same processes whenever decision information is newly input by the operation input unit.

The person information further may include an ID identifying one of the plurality of imaging units capturing the person image to be included. The information processing apparatus may further include: a BTF calculating unit that calculates a BTF (Brightness Transfer Function) of correcting a change in a color between the imaging units based on the two person images with different IDs identifying the plurality of imaging units each capturing the person image in the searching target person information, which is the person information including the person image of the person which is the searching target, and the decision person information for which the input of the decision information used to decide the searching target person information is received; a BTF processing unit that performs the BTF on the person image of the person information including the person image captured by the imaging unit with the ID for which the BTF is obtained, among the person information other than the decision person information among the person information stored as the searching result person information in the result person information storage unit; a BTF person image likelihood calculating unit that calculates a BTF person image likelihood which is configured from a likelihood based on the person image and which is a likelihood of the person information including the person image processed using the BTF by the BTF processing unit with respect to the person image of the decision person information; and a BTF person image threshold determining unit that determines whether each BTF person image likelihood calculated by the BTF person image likelihood calculating unit is less than a predetermined threshold. The time-space likelihood threshold determining unit may determine whether a time-space likelihood newly calculated by the time-space likelihood calculating unit is less than the predetermined threshold. The BTF person image threshold determining unit may determine whether each BTF person image likelihood calculated by the BTF person image likelihood calculating unit is less than the predetermined threshold when the newly calculated time-space likelihood is not less than the predetermined threshold, and erase the person information including the person image for which the BTF person image likelihood is less than the predetermined threshold from the searching result person information storage unit when the BTF person image likelihood is less than the predetermined threshold.

The information processing apparatus may further include: a same-person information retaining unit that retains searching target person information which is person information including the person image of the person that is the searching target and decision person information for which an input of decision information used to decide the searching target person information is received, as person information of the same person as the searching target person; an other-person information retaining unit that retains, as other-person information which is person information of a person other than the searching target person, person information including a person image of which each time-space likelihood newly calculated by the time-space likelihood calculating unit is less than the predetermined threshold or each BTF person image likelihood calculated by the BTF person image likelihood calculating unit is less than the predetermined threshold; a unique feature searching unit that selects a unique feature used to search for the searching target person by learning based on the person image of the person information retained in the same-person information retaining unit and the person image of the person information retained in the other-person information retaining unit; a unique feature likelihood calculating unit that calculates a unique feature likelihood which is a likelihood based on the unique feature of the person image included in the person information other than the searching contrast person information with respect to the person image of the searching target person information; and a unique feature likelihood threshold determining unit that determines whether each unique feature likelihood calculated by the unique feature likelihood calculating unit is less than a predetermined threshold and erases the person information of the unique feature likelihood less than the predetermined threshold from the searching result person information storage unit. The time-space likelihood threshold determining unit may determine whether each time-space likelihood newly calculated by the time-space likelihood calculating unit is less than the predetermined threshold. The BTF person image threshold determining unit may determine whether each BTF person image likelihood calculated by the BTF person image likelihood calculating unit is less than the predetermined threshold when the newly calculated time-space likelihood is not less than the predetermined threshold. The unique feature likelihood threshold determining unit may determine whether each unique feature likelihood calculated by the unique feature likelihood calculating unit is less than the predetermined threshold and erase the person information of the unique feature likelihood less than the predetermined threshold from the searching result person information storage unit when the BTF person image likelihood is not less than the predetermined threshold.

When the person information of the unique feature likelihood less than the predetermined threshold is erased from the searching result person information storage unit by the unique feature likelihood threshold determining unit, the other-person information retaining unit may retain the person information of the unique feature likelihood less than the predetermined threshold as other-person information which is person information of the other person.

The unique feature searching unit may select, as the unique feature, a feature amount by which a likelihood between the person image of the person information retained in the same-person information retaining unit and the person image of the searching target person increases and by which a likelihood between the person image of the person information retained in the other-person information retaining unit and the person image of the searching target person, by the learning based on the person image of the person information retained in the same-person information retaining unit and the person image of the person information retained in the other-person information retaining unit.

The unique feature likelihood calculating unit may calculate, as the unique feature likelihood, similarity indicating a degree of similarity of each person based on a unique feature of a person image included in each of the person image of the searching target person information, which is the person information including the person image of the person that is the searching target, and the person image included in the person information other than the searching contrast person information.

The person image likelihood calculating unit may calculate similarity indicating a degree of similarity of each person as the person image likelihood based on a person image included in each of the person images of the searching target person information, which is the person information including the person image of the person that is the searching target, and the person image included in the person information other than the searching contrast person information.

The time-space likelihood calculating unit may calculate the time-space likelihood from a relation between a time between the imaging times and a necessary time taken to travel a distance between the space position coordinates of the person information other than the decision person information and the decision person information for which the decision information is input at an average human movement speed.

According to the second aspect of the present technology, there is provided an information processing method of an information processing apparatus including a plurality of imaging units that each capture an image, detect a person, extract a person image configured from the image of the detected person, detect space position coordinates of the person based on the person image, and output the person image and personal information including the space position coordinates of the person and an imaging time at which the image is captured. The information processing method includes: a person image likelihood calculating process of calculating a person image likelihood which is a likelihood of a person image included in person information other than searching target person information, which is person information including the person image of the person which is a searching target, with respect to a person image of the searching contrast person information; a person image threshold determining process of determining whether each person image likelihood calculated by the person image likelihood calculating process is greater than a predetermined threshold and searching for the person information of the person image likelihood greater than the predetermined threshold as searching result person information, which is person information including the person image of the same person as the person of the person image of the searching target person information; a searching result person information storage process of storing the person information searched for as the searching result person information by the person image threshold determining process; an operation input process of receiving an input of decision information used for a user to decide the searching target person information among the person information stored as the searching result person information in the result person information storage process based on the person image; a time-space likelihood calculating process of calculating a time-space likelihood which is configured from a likelihood based on the space position coordinates and the imaging time and which is a likelihood of the person information other than decision person information, which is person information for which the decision information is input, with respect to the decision person information for which the decision information is input, among the person information stored as the searching result person information in the result person information storage process; and a time-space likelihood threshold determining process of determining whether each time-space likelihood calculated by the time-space likelihood calculating process is less than a predetermined threshold and erasing the person information of the time-space likelihood less than the predetermined threshold from the person information stored in the searching result person information storage process.

According to the second aspect of the present technology, there is provided a program of a computer controlling an information processing apparatus including a plurality of imaging units that each capture an image, detect a person, extract a person image configured from the image of the detected person, detect space position coordinates of the person based on the person image, and output the person image and personal information including the space position coordinates of the person and an imaging time at which the image is captured. The program causes the computer to perform: a person image likelihood calculating step of calculating a person image likelihood which is a likelihood of a person image included in person information other than searching target person information, which is person information including the person image of the person which is a searching target, with respect to a person image of the searching contrast person information; a person image threshold determining step of determining whether each person image likelihood calculated by a process of the person image likelihood calculating step is greater than a predetermined threshold and searching for the person information of the person image likelihood greater than the predetermined threshold as searching result person information, which is person information including the person image of the same person as the person of the person image of the searching target person information; a searching result person information storage step of storing the person information searched for as the searching result person information by a process of the person image threshold determining step; an operation input step of receiving an input of decision information used for a user to decide the searching target person information among the person information stored as the searching result person information in a process of the result person information storage step based on the person image; a time-space likelihood calculating step of calculating a time-space likelihood which is configured from a likelihood based on the space position coordinates and the imaging time and which is a likelihood of the person information other than decision person information, which is person information for which the decision information is input, with respect to the decision person information for which the decision information is input, among the person information stored as the searching result person information in the process of the result person information storage step; and a time-space likelihood threshold determining step of determining whether each time-space likelihood calculated by a process of the time-space likelihood calculating step is less than a predetermined threshold and erasing the person information of the time-space likelihood less than the predetermined threshold from the searching result person information storage unit.

According to the first aspect of the present technology, an image is captured, a moving object is detected, a moving-object image configured from the image of the detected moving object is extracted, space position coordinates of the moving object are detected based on the moving-object image, and the moving-object image and moving-object information including the space position coordinates of the moving object and an imaging time at which the image is captured are output; a moving-object image likelihood is calculated which is a likelihood of a moving-object image included in moving-object information other than searching target moving-object information, which is moving-object information including the moving-object image of the moving object which is a searching target, with respect to a moving-object image of the searching contrast moving-object information; it is determined whether each calculated moving-object image likelihood is greater than a predetermined threshold and the moving-object information of the moving-object image likelihood greater than the predetermined threshold is searched for as searching result moving-object information, which is moving-object information including the moving-object image of the same moving object as the moving object of the moving-object image of the searching target moving-object information; the moving-object information searched for as the searching result moving-object information is stored; an input of decision information used for a user to decide the searching target moving-object information among the moving-object information stored as the searching result moving-object information based on the moving-object image is received; a time-space likelihood is calculated which is configured from a likelihood based on the space position coordinates and the imaging time and which is a likelihood of the moving-object information other than decision moving-object information, which is moving-object information for which the decision information is input, with respect to the decision moving-object information for which the decision information is input, among the moving-object information stored as the searching result moving-object information; and it is determined whether each calculated time-space likelihood is less than a predetermined threshold and the moving-object information of the time-space likelihood less than the predetermined threshold is erased from the moving-object information stored as the searching result moving-object information.

According to the second aspect of the present technology, an image is captured, a person is detected, a person image configured from the image of the detected person is extracted, space position coordinates of the person are detected based on the person image, and the person image and person information including the space position coordinates of the person and an imaging time at which the image is captured are output; a person image likelihood is calculated which is a likelihood of a person image included in person information other than searching target person information, which is person information including the person image of the person which is a searching target, with respect to a person image of the searching contrast person information; it is determined whether each calculated person image likelihood is greater than a predetermined threshold and the person information of the person image likelihood greater than the predetermined threshold is searched for as searching result person information, which is person information including the person image of the same person as the person of the person image of the searching target person information; the person information searched for as the searching result person information is stored; an input of decision information used for a user to decide the searching target person information among the person information stored as the searching result person information based on the person image is received; a time-space likelihood is calculated which is configured from a likelihood based on the space position coordinates and the imaging time and which is a likelihood of the person information other than decision person information, which is person information for which the decision information is input, with respect to the decision person information for which the decision information is input, among the person information stored as the searching result person information; and it is determined whether each calculated time-space likelihood is less than a predetermined threshold and the person information of the time-space likelihood less than the predetermined threshold is erased.

The information processing apparatus of the present technology may be an independent apparatus or a block performing information processing.

Advantageous Effects of Invention

According to the aspects of the present technology, it is possible to search for and track a person desired to be searched for and tracked with high precision from images captured by a plurality of cameras.

BRIEF DESCRIPTION OF DRAWINGS

FIG. 1 is a diagram illustrating an example of the configuration of a monitoring system of an embodiment to which the present technology is applied.

FIG. 2 is a block diagram illustrating a first configuration example of a monitoring camera.

BEST MODES FOR CARRYING OUT THE INVENTION

Figure 3:
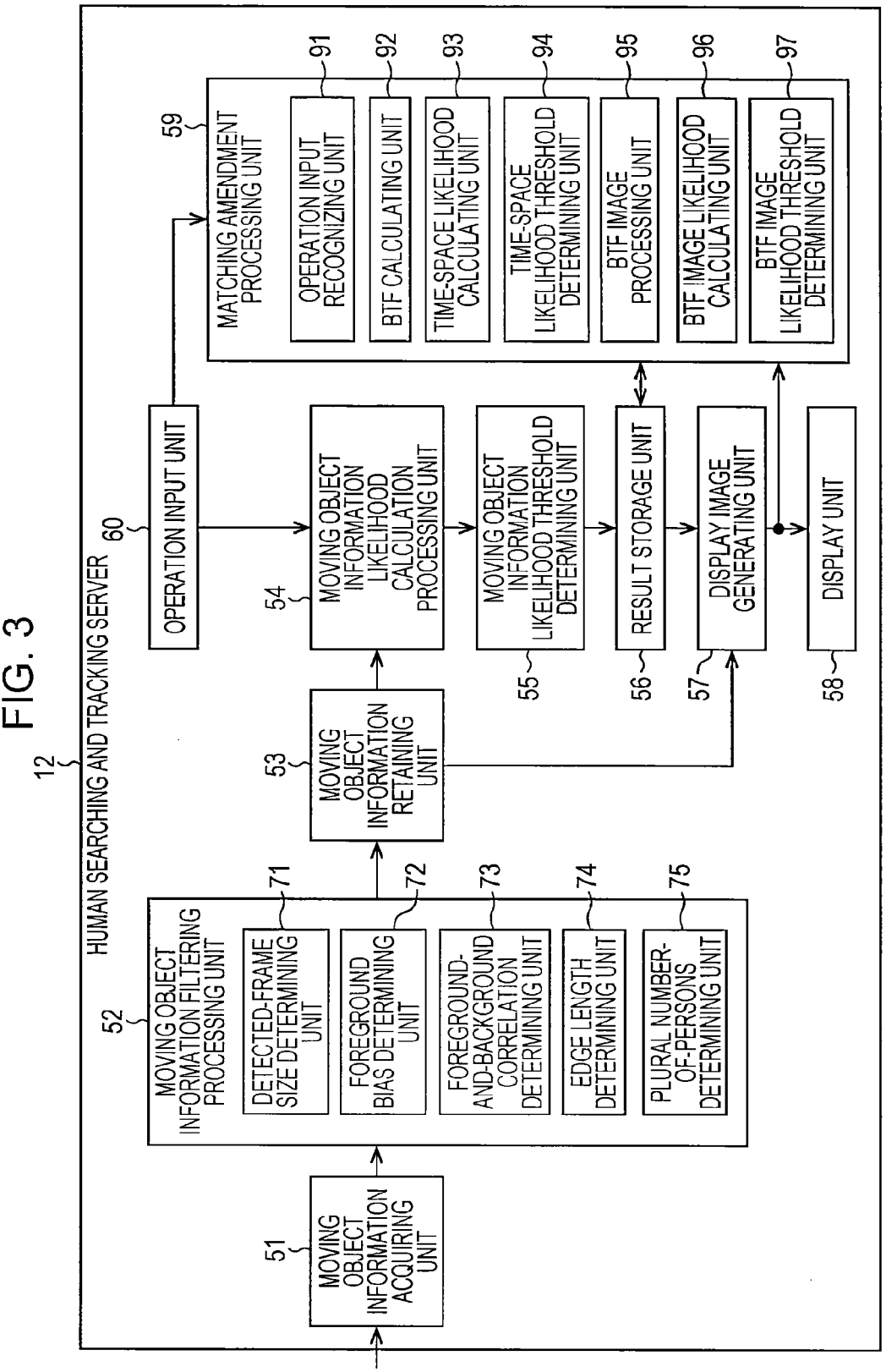
FIG. 3 is a block diagram illustrating a first configuration example of a human searching and tracking server.

Hereinafter, modes (hereinafter referred to as embodiments) for carrying out the invention will be described. The description will be made in the following order.
1. First Embodiment (Example Using Detection of Moving Object)
2. Second Embodiment (Example Using Detection of Person)
1. <First Embodiment>
[Example of Configuration of Monitoring System]

FIG. 1 is a diagram illustrating an example of the configuration of a monitoring system of an embodiment to which the present technology is applied. A monitoring system 1 in FIG. 1 images a plurality of areas within a monitoring area in which human searching or tracking is necessary and performs searching for a person within the monitoring area and tracking of a movement path of the person based on captured images. The monitoring system 1 is configured to include monitoring cameras 11-1 to 11-n, a human searching and tracking server 12, and a network 13.

The monitoring cameras 11-1 to 11-n are separately installed at n places in monitoring areas covered by the monitoring system 1, capture images of the respective monitoring areas, detect moving objects within the captured images, and extract images of the detected moving objects. Then, the monitoring cameras 11-1 to 11-n supply moving-object information including the extracted moving-object images of the moving objects to the human searching and tracking server 12 via the network 13 configured from the Internet, a public line, a dedicated line, or the like. The moving-object information is information that includes an imaging time, a foreground image of the moving-object image, global coordinates of the moving object obtained from the moving-object image, and an ID identifying the monitoring camera 11 in addition to the moving-object image. Here, the global coordinates refer to coordinate information specifying the position of a moving object within a space and are, for example, coordinate information including latitude and longitude which is coordinate information specifying the position of a moving object on the Earth. Hereinafter, when it is particularly not necessary to distinguish the monitoring cameras 11-1 to 11-n from each other, the monitoring cameras 11-1 to 11-n are simply referred to as the monitoring cameras 11 and are referred to as the same term in other configurations.

The human searching and tracking server 12 acquires the moving-object information supplied from the monitoring cameras 11, filters out and removes images unsuitable for the searching based on the moving-object images included in the moving-object information and foreground images of the moving-object images, and retains moving-object information including moving-object images suitable for the searching. The human searching and tracking server 12 performs a moving-object information matching process based on information regarding a person designated by a user in the retained moving-object information to extract moving-object information regarding the designated person. Further, the human searching and tracking server 12 generates and displays a display image of a searching and tracking result configured from a movement path of the designated person based on the moving-object information extracted through the moving-object information matching process. Furthermore, the human searching and tracking server 12 receives an input of decision information indicating that the user decides the designated person in regard to a part of the moving-object information which is the searching and tracking result and performs a matching amendment process using the moving-object information for which the decision information is received to amend and update the searching and tracking result. The human searching and tracking server 12 displays the searching and tracking result obtained through the moving-object information matching process or the matching amendment process, and then improves precision of the searching and tracking result by receiving the input of the decision information of the user and repeating the matching amendment process.

[First Configuration Example of Monitoring Camera]

Next, a first configuration example of the monitoring camera 11 will be described with reference to the block diagram of FIG. 2.

The monitoring cameras 11 are disposed at a plurality of positions of the monitoring areas and are disposed so that all of the areas in the monitoring areas are covered as a whole by combining images captured by the monitoring cameras 11-1 to 11-n. Each monitoring camera 11 includes an imaging unit 31, a moving-object detecting unit 32, a foreground image extracting unit 33, a camera ID storage unit 34, an imaging position coordinate calculating unit 35, an imaging time detecting unit 36, and a moving-object information output unit 37.

The imaging unit 31 is configured to include CCDs (Charge Coupled Devices), a CMOS (Complementary Metal Oxide Semiconductor), or the like and continuously captures images within a range which can be imaged from the position at which the monitoring camera 11 is installed. The imaging unit 31 captures a moving image configured to include images treated as continuous chronological still images. Accordingly, the images captured by the imaging unit 31 can be processed as one image in units of frames or units of fields and can also be processed as a moving image by continuously reproducing the images. Description will be made below assuming that images configured as still images are continuously captured. Accordingly, an image is assumed below to indicate a still image.

The moving-object detecting unit 32 detects a region in which a moving object is captured within the image from a relation between the chronologically previous and subsequent images with respect to each of the images captured by the imaging unit 31 and extracts a rectangular image including the region in which the moving object is present as a moving-object image.

The foreground image extracting unit 33 extracts a foreground image configured to include binary-value pixels of a foreground region and the other region from the moving-object image extracted by the moving-object detecting unit 32. The foreground image is, for example, an image in which the foreground region is displayed as white and the other region is displayed as black. The binary values may be values expressing other colors and the image may be an image in which a relation between white and black is reversed. In general, since a region in which a moving object is imaged is configured as a foreground region in a moving-object image in many cases, the foreground image is extracted as an image in which pixel values are divided into a region in which the moving object is displayed and the other region in the moving-object image.

The camera ID storage unit 34 stores camera IDs used to identify the monitoring cameras 11-1 to 11-$n$. Thus, when moving-object information is generated, the moving-object information is read in the moving-object information output unit 37.

The imaging position coordinate calculating unit 35 calculates global coordinates of an object detected as the moving object based on information regarding an image captured by the imaging unit 31. That is, for example, when the installation position of the monitoring camera is recognized by a GPS (Global Positioning System) (not illustrated) or the like, the imaging position coordinate calculating unit 35 recognizes a declination angle with respect to geomagnetism in an imaging direction, obtains a distance to the object detected as the moving object based on the size, position, or the like of the moving object within the image, and calculates global coordinates based on such information.

The imaging time detecting unit 36 has a function of generating time information, such as a real-time clock (not illustrated), and detects, as an imaging time, a time at a timing at which each of the images captured by the imaging unit 31 is captured.

The moving-object information output unit 37 generates moving-object information including the corresponding foreground image, the camera ID, the global coordinates of the moving object, and the imaging time based on information regarding the corresponding foreground image, the camera ID, the global coordinates of the moving object, and the imaging time, in regard to each of the moving-object images extracted from the images captured by the imaging units 31, and then outputs the moving-object information to the human searching and tracking server 12 via the network 13.

[First Configuration Example of Human Searching and Tracking Server]

Next, a first configuration example of the human searching and tracking server 12 will be described with reference to the block diagram of FIG. 3.

The human searching and tracking server 12 is configured to include a moving-object information acquiring unit 51, a moving-object information filtering processing unit 52, a moving-object information retaining unit 53, a moving-object information likelihood calculation processing unit 54, a moving-object information likelihood threshold determining unit 55, a result storage unit 56, a display image generating unit 57, a display unit 58, a matching amendment processing unit 59, and an operation input unit 60.

The moving-object information acquiring unit 51 acquires the moving-object information supplied from the monitoring cameras 11 via the network 13, temporarily stores the moving-object information, and supplies the moving-object information to the moving-object information filtering processing unit 52.

The moving-object information filtering processing unit 52 filters the moving-object information supplied from the moving-object information acquiring unit 51 under a predetermined condition, extracts only moving-object information suitable for human searching, retains the extracted moving-object information in the moving-object information retaining unit 53, and destroys unsuitable moving-object information.

More specifically, the moving-object information filtering processing unit 52 includes a detected-frame size determining unit 71, a foreground bias determining unit 72, a fore-ground-and-background correlation determining unit 73, an edge length determining unit 74, and a plural number-of-persons determining unit 75.

The detected-frame size determining unit 71 determines whether the moving-object information is the moving-object information suitable for the human searching depending on whether a frame size of the moving-object image is greater than a predetermined size. When it is determined that the moving-object information is not the moving-object information suitable for the human searching, this moving-object information is destroyed. The predetermined size may be experientially set as the minimum size necessary for the human searching. The detected-frame size determining unit 71 may estimate the body height of a person detected as a moving object based on the frame size of the moving-object image and determines whether the frame size is a frame size optimum for searching for the person with the estimated body height. That is, a tall person is considered to be unsuitable for the human searching, since a moving-object image with a small frame size has a low resolution. On the other hand, when a person is short, the frame size of the moving-object image is small and a resolution is not lowered compared to a tall person. Therefore, in this case, a short person is considered to be suitable for the human searching.

The foreground bias determining unit 72 calculates a ratio at which a foreground region of a foreground image occupies a moving-object image. When the ratio is greater than a predetermined threshold, the moving-object information including the moving-object image is considered not to be moving-object information suitable for the human searching, and thus is destroyed. That is, since a moving-object image in which only an image of a foreground region is captured is not suitable for the human searching, moving-object information including such a moving-object image is not suitable for the human searching, and thus is destroyed.

The foreground-and-background correlation determining unit 73 obtains a correlation between a foreground region and a background region of a moving-object image based on a moving-object image and a foreground image. When the correlation is high, that is, a foreground region in which a person being originally searched for is to be imaged is an image which is almost the same as the background region, the moving-object information is destroyed. That is, in this case, since there is a high probability of the moving object, i.e., the person, not being imaged in the region considered as the foreground region, the moving-object image is considered to be unsuitable for the human searching and the foreground-and-background correlation determining unit 73 destroys the moving-object information including such a moving-object image.

The edge length determining unit 74 generates an edge image which is a boundary between a foreground image and a background image based on the foreground image. When the length of an edge is longer than a predetermined length, moving-object information including the moving-object image is considered to be unsuitable for the human searching, and thus is destroyed. That is, when a person that is a moving object is a foreground image correctly extracted as a foreground, a region in which the person is definitely imaged is considered to be extracted in the moving-object image. However, when no person is correctly extracted from the moving-object image, the foreground region is extracted in a spotty form irrespective of the shape of the person in many cases. Consequently, since the length of the edge which is a boundary between the foreground region and the background region becomes long, the edge length determining unit 74 considers the moving-object information including such a moving-object image not to be suitable for the human searching, and thus destroys the moving-object information.

The plural number-of-persons determining unit 75 generates a waveform in which a pixel position of a foreground image in the horizontal direction is set as a horizontal axis and an integrated value of the pixel values disposed in the vertical direction is set as a vertical axis, determines whether moving-object information is suitable for the human searching depending on whether there are a plurality of local maximum values in the outer shape of the waveform, and then destroys the moving-object information unsuitable for the human searching. That is, when only one person is imaged within the moving-object image, the waveform obtained such that a pixel position of the foreground image in the horizontal direction is set as the horizontal axis and the integrated value of the pixel values disposed in the vertical direction is set as the vertical axis is understood to be a waveform having 1 convex shape and 1 local maximum value. However, when a plurality of persons are imaged, the number of local maximum values depends on the number of persons in the waveform. Therefore, in this case, the moving-object information is considered to be unsuitable for the human searching.

The moving-object information retaining unit 53 retains the moving-object information considered to be suitable for the human searching due to the moving-object information filtering processing unit 52, and then supplies the moving-object information to the moving-object information likelihood calculation processing unit 54 and the display image generating unit 57, as necessary.

The moving-object information likelihood calculation processing unit 54 calculates, for each piece of moving-object information, a moving-object image likelihood of the moving-object image of the moving-object information other than criterion moving-object information, which is a searching target including the moving-object image of the moving-object information designated as a searching target, with respect to the criterion moving-object information, among the moving-object images included in the moving-object information retained in the moving-object information retaining unit 53, and then supplies the moving-object image likelihood to the moving-object information likelihood threshold determining unit 55.

The moving-object information likelihood threshold determining unit 55 determines whether the moving-object image likelihood obtained based on the moving-object image obtained by the moving-object information likelihood calculation processing unit 54 is higher than a threshold, and then stores the moving-object information including the moving-object image with a higher moving-object image likelihood in the result storage unit 56. That is, the moving-object information likelihood threshold determining unit 55 performs a moving-object image matching process based on the moving-object image likelihood of the moving-object information other than the criterion moving-object information which is a searching target with respect to the criterion moving-object information and extracts the moving-object information including the moving-object image with the higher moving-object image likelihood as information matched based on the moving-object image. Then, the moving-object information likelihood threshold determining unit 55 stores the extracted moving-object information as a matching result with the criterion moving-object information, which is a searching target, in the result storage unit 56.

The display image generating unit 57 generates a display image to display a searching and tracking result of a searching target person based on the moving-object information stored in the result storage unit 56 as the information matched with the criterion moving-object information specifying the searching target person. Then, the display image generating unit 57 displays the generated display image on the display unit 58 configured to include an LCD (Liquid Crystal Display) or an organic EL (Electro-Luminescence). The display unit 58 displays the display image and receives an operation input of the display image performed using the operation input unit 60. The operation input unit 60 generates an operation signal according to a operation content on the display image serving as a touch panel or a pointer and supplies the operation signal to the moving-object information likelihood calculation processing unit 54 and the matching amendment processing unit 59.

When the user decides a moving-object image of the searching target person based on the moving-object image displayed in the searching and tracking result displayed on the display unit 58, the matching amendment processing unit 59 performs a matching amendment process based on decision information input through an operation of the operation input unit 60. The matching amendment processing unit 59 performs the matching amendment process again at the time of the input of the decision information again even after performing the matching amendment process to repeat the matching amendment process whenever the decision information is input.

More specifically, the matching amendment processing unit 59 includes an operation input recognizing unit 91, a BTF calculation unit 92, a time-space likelihood calculation unit 93, a time-space likelihood threshold determining unit 94, a BTF image processing unit 95, a BTF image likelihood calculating unit 96, and a BTF image likelihood threshold determining unit 97.

The operation input recognizing unit 91 recognizes that the decision information is input in regard to the selected moving-object information in the searching and tracking result displayed on the display unit 58 based on the operation signal of the operation input unit 60.

The BTF calculation unit 92 compares the camera IDs of a moving-object image designated as a searching target and a moving-object image searched for through the moving-object image matching process or the matching amendment process. When the camera IDs do not accord with each other, the BTF calculation unit 92 calculates a BTF (Brightness Transfer Function) of correcting a change in colors of an image occurring due to an individual difference, an environmental difference, or the like between the monitoring cameras 11, based on a pixel signal between the moving-object images for which the decision information is input or between a moving-object image designated as a searching target and a moving-object image for which the decision information is input. That is, the colors of the images captured by the different monitoring cameras 11 become different due to the individual difference, the environmental difference, or the like even when the actual colors are the same. However, when the user confirms that a moving-object image designated as a searching target matches an actually searched moving-object image and inputs the decision information, it is decided that the regions forming the same portions in both of the moving-object images have the same color. Thus, the BTF calculation unit 92 calculates the BTF of correcting the color of a moving-object image confirmed to be matched by setting a criterion moving-object image as a criterion from such a relation.

The time-space likelihood calculation unit 93 obtains a movement distance from a difference between the global coordinates included in the moving-object information for which the decision information is input and the global coordinates included in another piece of moving-object information stored in the result storage unit 56, and then calculates a time-space likelihood of the moving-object information from an average necessary time taken to travel the movement distance at an average human movement speed and a time between the imaging times of the moving-object information.

That is, when the time-space likelihood corresponds to a ratio of the time between the imaging times to the average necessary time taken between the pieces of moving-object information, the time-space likelihood is considered to be higher as the ratio is closer to 1 and the time-space likelihood is considered to be lower as the ratio is more distant from 1. Further, in this case, the time-space likelihood becomes considerably smaller as the ratio is closer to 0, and the time-space likelihood becomes gradually smaller as the ratio exceeds 1 and becomes larger. That is, when the time between the imaging times is close to 0, movement may not be practically possible as the spatial distance became greater, and thus the time-space likelihood becomes considerably small at this time. On the other hand, when the time between the imaging times is long, there is a probability of movement of the spatial distance at a speed slower than the average movement speed. The time-space likelihood at this time is lower than the time-space likelihood when the ratio is 1, but the movement can be realized. Thus, the time-space likelihood is higher than the time-space likelihood when the time between the imaging times is 0.

The time-space likelihood threshold determining unit 94 determines whether the time-space likelihoods of the moving-object information for which the decision information is input and the other moving-object information stored in the result storage unit 56 are lower than a predetermined threshold. When the time-space likelihood is lower than the predetermined threshold value, the moving-object information is deleted from the result storage unit 56.

When the time-space likelihood is not lower than the predetermined threshold and the BTF is obtained between the moving-object images of the moving-object information for which the decision information is input among the pieces of moving-object information for which the decision information is not input and which is stored in the result storage unit 56, the BTF image processing unit 95 performs a BTF color conversion process on the moving-object image included in the moving-object information.

The BTF image likelihood calculating unit 96 calculates a BTF image likelihood which is a likelihood between the moving-object images using the respective pixel signals which are the moving-object image of the moving-object information for which the decision information is input and the moving-object image for which the decision information is not input and which is subjected to the BTF color conversion process.

The BTF image likelihood threshold determining unit 97 compares the BTF image likelihood calculated by the BTF image likelihood calculating unit 96 to the predetermined threshold and deletes the moving-object information including the moving-object image with the BTF image likelihood lower than the predetermined threshold from the result storage unit 56.

[Imaging Process by Monitoring Camera in FIG. 2]

Figure 4:
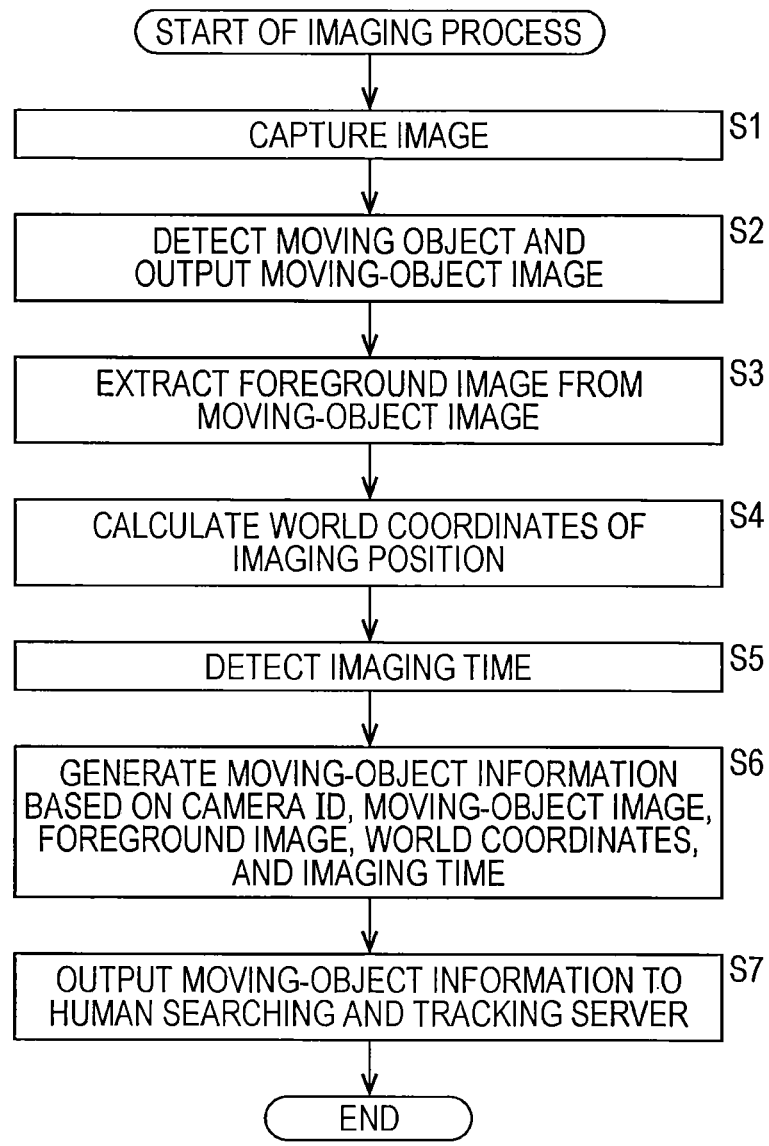
FIG. 4 is a flowchart illustrating an imaging process by the monitoring camera in FIG. 2.

Next, the imaging process by the monitoring camera 11 in FIG. 2 will be described with reference to the flowchart of FIG. 4.

In step S1, the imaging unit 31 of the monitoring camera 11 continuously captures images configured from still images or a moving image of the monitoring area which can be monitored at the installation position.

In step S2, the moving-object detecting unit 32 detects a moving object by comparing previous and subsequent images with respect to each of the images captured by the imaging unit 31 and generates a rectangular moving-object image including a region in which the detected moving object is present. For example, when the images captured by the imaging unit 31 are images captured in a fixed manner, there is no change in a stationary foreground region. On the other hand, a change occurs on the image due to any movement in a region in which the moving object within the image is present. Therefore, the moving-object detecting unit 32 detects the region in which the change occurs as a region in which a moving object is present and generates a moving-object image by trimming a rectangular image including the detected region in which the moving object is present.

In step S3, the foreground image extracting unit 33 extracts the foreground image from the moving-object image generated by the moving-object detecting unit 32 generates the foreground image in which the foreground region is set to be, for example, white and the other region is set to be black and which is expressed by binary values.

In step S4, the imaging position coordinate calculating unit 35 calculates an imaging direction, an angle, and a distance based on the position or the size of the moving object present in the moving-object image and calculates the global coordinates of the moving object which is a subject based on the global coordinates at which the monitoring camera is installed. That is, for example, based on the moving-object image, the imaging position coordinate calculating unit 35 calculates the coordinate position expressed by the latitude and longitude or the like of the moving object on the Earth as global coordinates.

In step S5, the imaging time detecting unit 36 detects time information of a timing at which the image is captured, as an imaging time, based on the time information generated by a real-time clock (not illustrated).

In step S6, the moving-object information output unit 37 reads the camera ID from the camera ID storage unit 34 and generates the moving-object image, the foreground image, the global coordinates, and the imaging time collectively as the moving-object information.

In step S7, the moving-object information output unit 37 outputs the generated moving-object information to the human searching and tracking server 12 via the network 13 such as the Internet.

Through the foregoing processes, the images are captured for each monitoring area by each of the monitoring cameras 11, the moving object is detected from the captured images, and the moving-object images are extracted. Then, the moving-object information configured to include the moving-object image and the information regarding the foreground image of the moving-object image, the global coordinates of the moving object in the moving-object image, and the imaging time at which the image is captured is generated and supplied to the human searching and tracking server 12.

[Moving-object Information Filtering Process]

Figure 5:
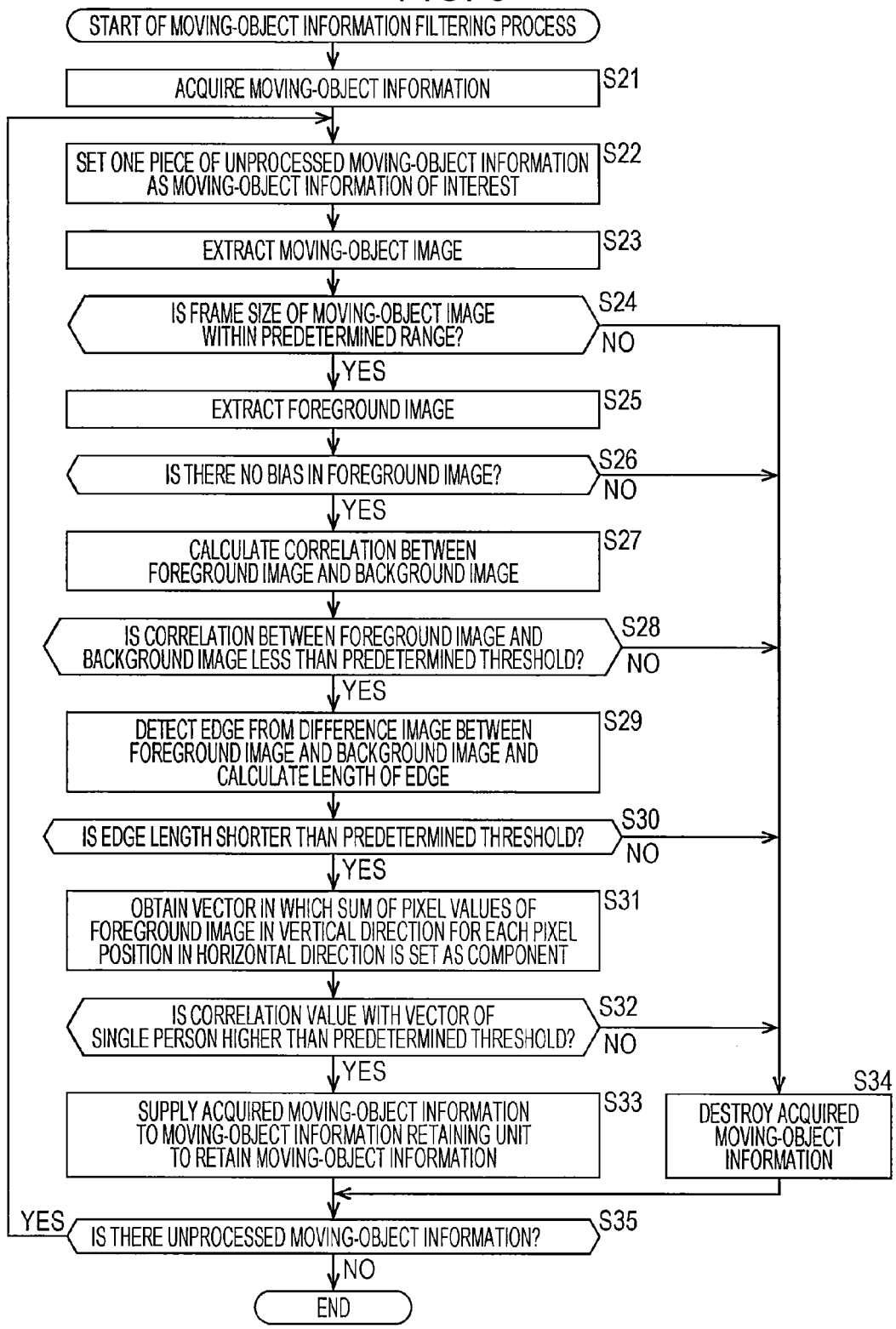
FIG. 5 is a flowchart illustrating a moving-object information filtering process.

Next, a moving-object information filtering process performed by the human searching and tracking server 12 will be described with reference to the flowchart of FIG. 5.

In step S21, the moving-object information acquiring unit 51 acquires and stores the moving-object information supplied sequentially from the monitoring servers 11 via the network 13.

In step S22, the moving-object information filtering processing unit 52 sets one piece of unprocessed moving-object information among the moving-object information stored in the moving-object information acquiring unit 51 as moving-object information of interest which is a processing target.

In step S23, the detected-frame size determining unit 71 extracts the moving-object image included in the moving-object information of interest.

In step S24, the detected-frame size determining unit 71 determines whether the frame size of the moving-object image of the moving-object information of interest is within a predetermined range. That is, when the frame size of the moving-object image is small, for example, it is difficult to extract a feature amount used for the human searching, and therefore the detected-frame size determining unit 71 determines whether the frame size is a frame size within the predetermined range from which the feature amount or the like necessary for the human searching can be sufficiently extracted and which is suitable for the human searching.

When the detected-frame size determining unit 71 determines in step S24 that the frame size of the moving-object image of the moving-object information of interest is within the predetermined range and considers the moving-object image not to be a moving-object image unsuitable for the human searching, the process proceeds to step S25. Conversely, when it is determined in step S24 that the frame size of the moving-object image of the moving-object information of interest is not within the predetermined determination size, the moving-object information filtering processing unit 52 destroys the moving-object information of interest in step S34.

In step S25, the foreground bias determining unit 72 extracts the foreground image from the moving-object information of interest.

Figure 6:
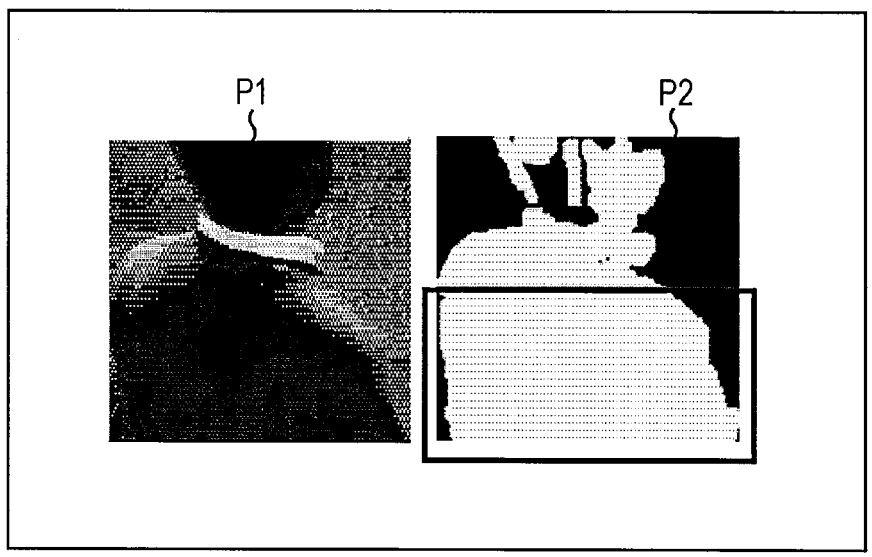
FIG. 6 is a diagram illustrating a moving-object image and a foreground image in which there is a bias in a foreground region.

In step S26, the foreground bias determining unit 72 calculates a ratio at which a distribution of a foreground region occupies the region of the extracted foreground image in the entire moving-object image and determines whether the ratio is greater than a predetermined threshold and there is a bias in the foreground region within the moving-object image. That is, for example, in the case of a moving-object image indicated by an image P1 of FIG. 6, the back of the head, the shoulder part, and the like of a person are shown. In this case, the foreground image is an image indicated by an image P2 of FIG. 6. In the case of the image P2, since a range surrounded by a straight-line rectangle has a large ratio for the foreground region, the image can be said to be unsuitable for the human searching. Accordingly, in this case, since the ratio at which the distribution of the foreground region occupies is greater than the predetermined threshold and there is a bias in the ratio of the foreground region, the foreground bias determining unit 72 considers the image to be unsuitable for the human searching and the moving-object information of interest is destroyed in step S34.

Conversely, when the ratio of the foreground region to the moving-object image is less than the predetermined threshold and there is no bias in the ratio of the foreground region in step S26 based on the information regarding the foreground image, the process proceeds to step S27.

In step S27, based on the moving-object image and the foreground image, the foreground-and-background correlation determining unit 73 calculates a correlation between the white region constituting the foreground region and the other region, i.e., a background region in the moving-object image. For example, the foreground-and-background correlation determining unit 73 generates a histogram of each color of each of the foreground region and the background region and obtains a reciprocal of the largest difference between the colors as the correlation. In this case, the larger a correlation value is, the higher the correlation is. On the contrary, the smaller the correlation value is, the lower the correlation is.

Figure 7:
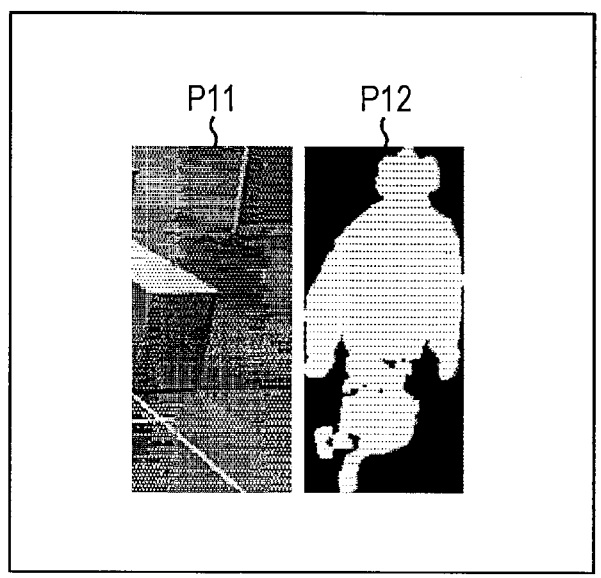
FIG. 7 is a diagram illustrating a moving-object image and a foreground image in which correlation between a foreground region and a background region is high.

In step S28, the foreground-and-background correlation determining unit 73 determines whether the obtained correlation is greater than a predetermined threshold, i.e., no change occurs in the foreground image and the background image and the foreground is considered not to be a moving object. For example, in step S28, when the moving-object image is an image P11 and the foreground image is an image P12, as illustrated in FIG. 7, the correlation between the white region and the black region is considered to be high and no moving object is considered to be present, as shown in the image P12. Therefore, the foreground-and-background correlation determining unit 73 considers the correlation value to be greater than the predetermined threshold, and thus the moving-object information of interest is destroyed in step S34.

The moving-object image P11 and the foreground image P12 illustrated in FIG. 7 occur, for example, when a moving object that is a person is present for a long time at the same position within an imaging range and a region in which the person is imaged is thus considered to be the region of a background image, and subsequently the person moves out of the imaging range, and a region in which the person is present up to that time is detected as a moving object. That is, since the person is present for a long time in the region indicated by white in the foreground image P12, the region is considered to be the background image, including the region in which the person is present. Thereafter, when the person moves out of the imaging range, the white region of the foreground image in which the person is present up to that time is considered to be the region in which the moving object is present. Therefore, the moving-object image P11 becomes an image obtained consequently by detecting the moving object irrespective of the fact that the person that should be originally the moving object is not present.

Conversely, when the correlation value is less than the predetermined threshold, the moving object is present in the foreground region and the other region is thus considered to be the background region in step S28, the process proceeds to step S29.

In step S29, the edge length determining unit 74 obtains an edge image formed by a boundary between the foreground image and the background image based on the foreground image and obtains an edge length which is the length of an edge included in the obtained edge image.

Figure 8:
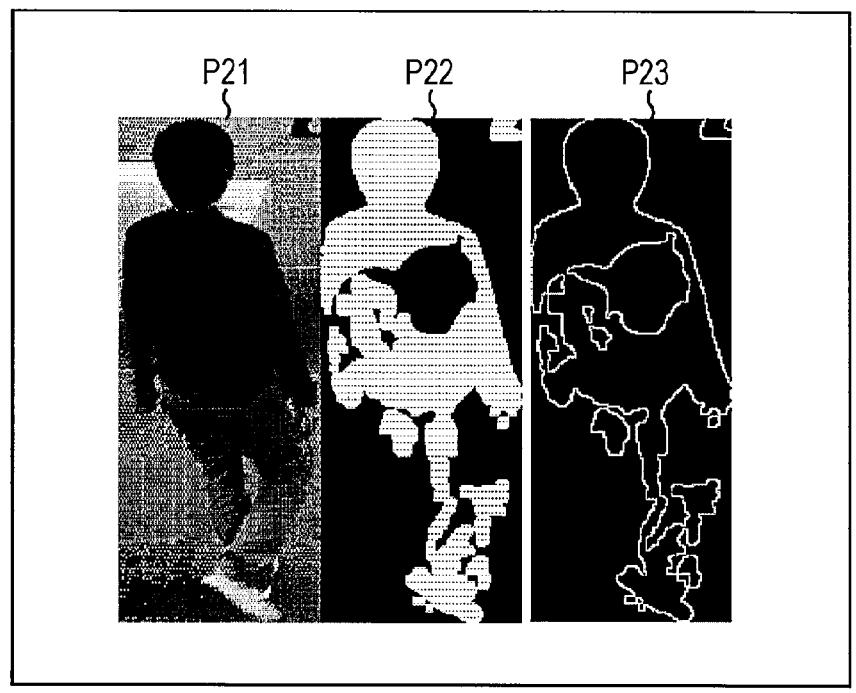
FIG. 8 is a diagram illustrating a moving-object image, a foreground image, and an edge image in which a foreground region is not correctly obtained.

In step S30, the edge length determining unit 74 determines whether the obtained edge length is shorter than a predetermined threshold. When the edge length is not shorter than the predetermined threshold, the process proceeds to step S34 and the moving-object information of interest is destroyed. That is, for example, when an image is a back image of a person, as shown in an image P21 of FIG. 8, the color of the clothes of the person is similar to the color of the background, the foreground region is thus not extracted correctly, and a foreground image may become an image like an image P22. As shown in the image P22, when a foreground region is extracted in a spotty form, the foreground region becomes unsuitable for the human searching. In this case, when the edge image is extracted based on the image P22 which is the foreground image, an image is shown like an image P23. In this case, since the foreground region is obtained in the spotty form, the edge length becomes longer. Accordingly, when the edge length is obtained based on the edge image and is longer than a predetermined threshold, a correct foreground region is considered not to be obtained and the moving-object information of interest is thus destroyed.

Conversely, when the edge length is considered to be shorter than the predetermined length in step S30, the process proceeds to step S31.

Figure 9:
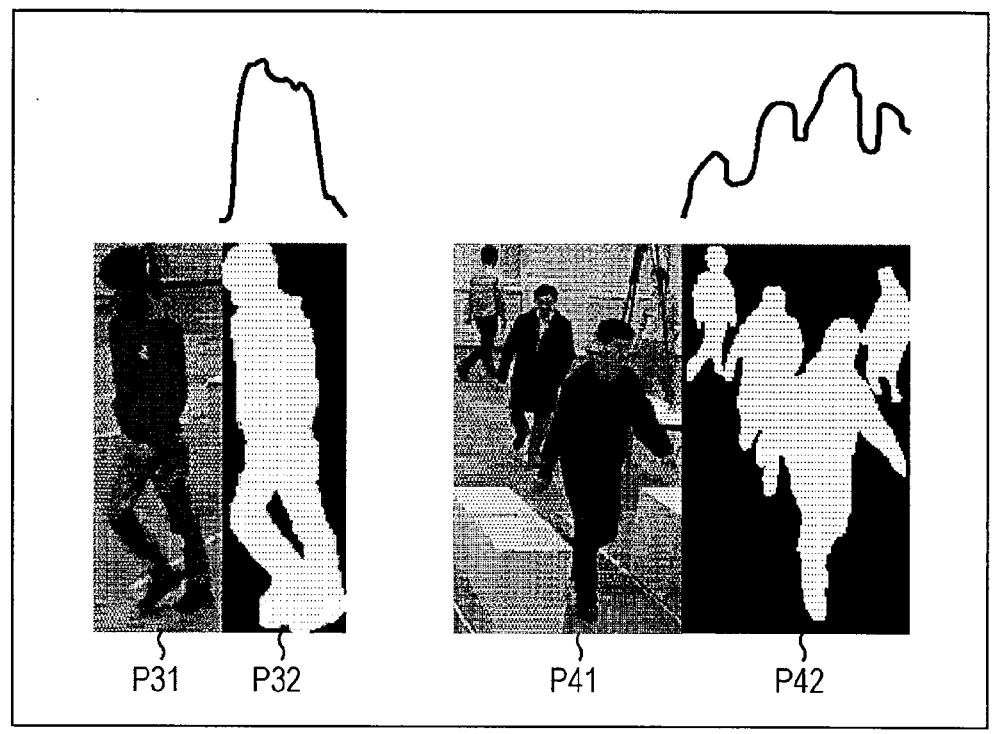
FIG. 9 is a diagram illustrating a moving-object image and a foreground image in which a single person and a plurality of persons are imaged.

In step S31, the plural number-of-persons determining unit 75 extracts a foreground image and generates a vector in which a sum of the pixel values present in the vertical direction for each coordinate position in the horizontal direction is set as a component. That is, when a foreground image corresponding to the moving-object image shown in an image P31 of FIG. 9 is an image P32, a waveform is obtained in which a coordinate position of the foreground image in the horizontal direction is set as the horizontal axis and the sum of the pixel values in the vertical direction for each coordinate position in the horizontal direction is set as the vertical axis, as shown above the image P32. Accordingly, the plural number-of-persons determining unit 75 calculates a vector V corresponding to this waveform. For example, when the coordinates of the foreground image are expressed as (x, y) (where x=x1, x2, x3, ..., xn and y=y1, y2, y3, ..., xm) and the pixel values of the foreground image are expressed as P(x, y), the obtained vector V is expressed as follows.

$$V=(P(x1,y1)+(P(x1,y2)+ \ldots +P(x1,ym),P(x2,y1)+P(x2,y2)+ \ldots +P(x2,ym),P(x3,y1)+P(x3,y2)+ \ldots + P(x3,ym)+ \ldots ,P(xn,y1)+P(xn,y2)+ \ldots P(xn,ym))$$

In step S32, the plural number-of-persons determining unit 75 calculates a correlation between the vector V and a vector V1 when a single person is imaged within a moving-object image and determines whether the calculated correlation is greater than a predetermined threshold. That is, as shown in the image P31 of FIG. 9, when a single person is imaged as a moving-object image, a waveform in which a coordinate position of the foreground image P32 in the horizontal direction is set as the horizontal axis and the sum of the pixel values in the vertical direction for each coordinate position in the horizontal direction is set as the vertical axis has one local maximum value and also has an outer shape with one convex waveform shape. On the other hand, for example, as shown in an image P41, when 4 persons are imaged, an image P42 is obtained as a foreground image. Therefore, as shown above the image P42, a waveform with a sum of the pixel values in the vertical direction for each coordinate position in the horizontal direction has 4 local maximum values corresponding to the number of persons and also has an outer shape with 4 convex waveform shapes.

Since the above-described vector V corresponds to a waveform with the outer shape of the waveform, the vector V1 at the time of the imaging of a single person corresponds to a waveform which has one local maximum value and also has a convex waveform, as shown above the image P32, and thus the correlation becomes high. On the other hand, in the case of a foreground image in which a plurality of persons are imaged, a plurality of local maximum values are included and an outer shape with a plurality of convex waveform shapes is formed, as shown above the image P42. Therefore, the correlation between the vector V and the vector V1 becomes low.

Accordingly, when the calculated correlation is not higher than the predetermined threshold in step S32, the plural number-of-persons determining unit 75 considers a plurality of persons to be included within a moving-object image, and thus the process proceeds to step S34 and the moving-object information of interest is destroyed.

Conversely, when the calculated correlation is higher than the predetermined threshold in step S32, only a single person is considered to be included within the moving-object image and the process proceeds to step S33.

In step S33, the moving-object information filtering processing unit 52 considers the moving-object information of interest to be the moving-object information suitable for the human searching and retains the moving-object information of interest in the moving-object information retaining unit 53.

In step S35, the moving-object information filtering processing unit 52 determines whether there is unprocessed moving-object information in the moving-object information acquiring unit 51. When there is unprocessed moving-object information, the process returns to step S22. That is, until there is no unprocessed moving-object information, the processes of steps S22 to S35 are repeated. In addition, when it is determined in step S35 that there is no unprocessed moving-object information, the process ends.

That is, through the foregoing processes, of the moving-object information sequentially supplied from the monitoring cameras 11, only the moving-object image in which the frame size is within the predetermined range, there is no bias in the foreground image, the correlation between the foreground image and the background image is less than the predetermined threshold, the edge length in the edge image of the foreground image is shorter than the predetermined length, and only a single person is considered to imaged, is considered to be a moving-object image suitable for the human searching, and only the moving-object information including such a moving-object image is retained as the moving-object information suitable for the human searching in the moving-object information retaining unit 53 by the moving-object information filtering process.

Figure 10:
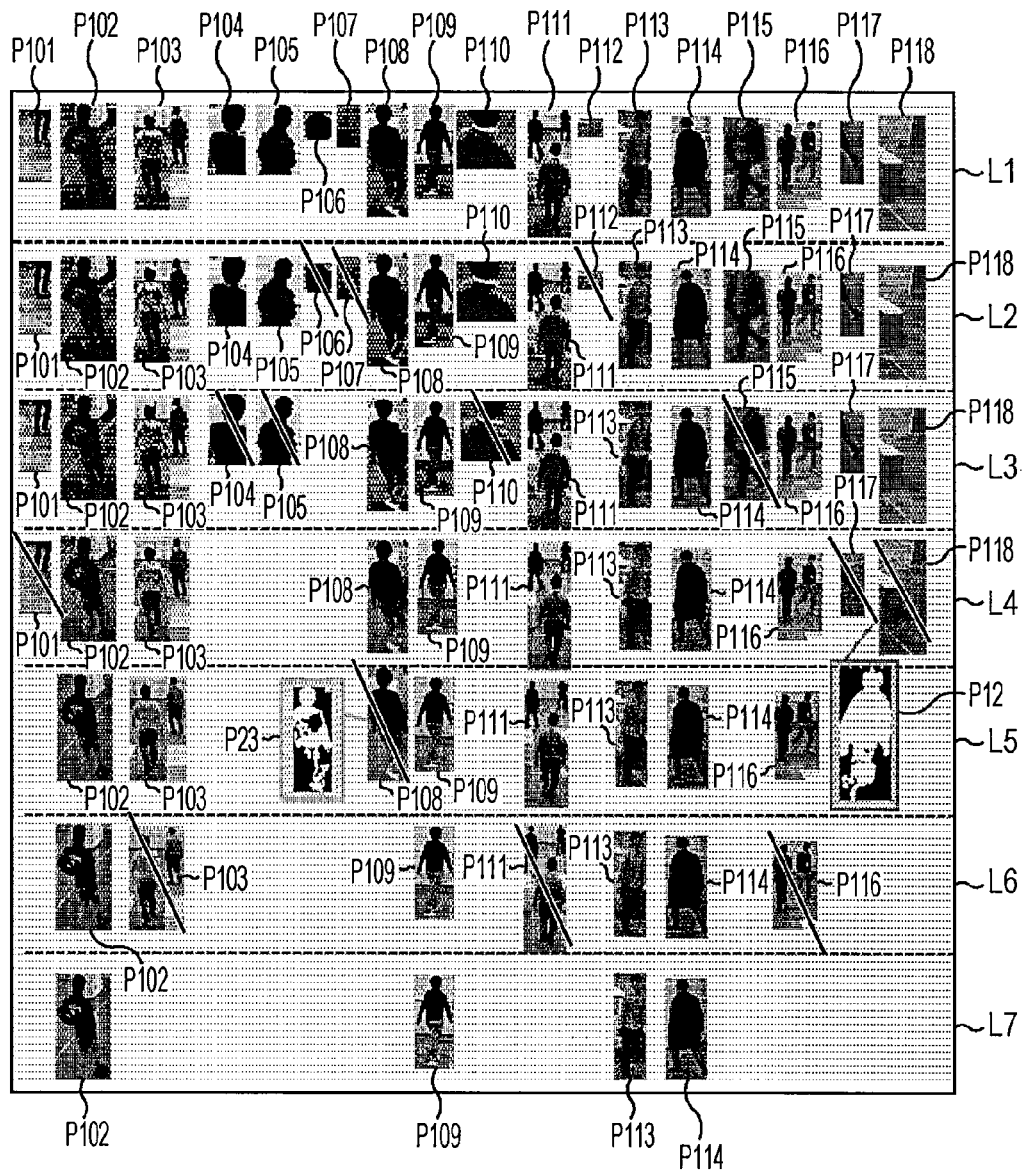
FIG. 10 is a diagram illustrating examples of moving-object images filtered by the moving-object information filtering process.

For example, when the moving-object images included in the moving-object information supplied from the monitoring cameras 11 are moving-object images P101 to P118, as shown in a state L1 illustrated in FIG. 10, the moving-object information is filtered through the moving-object information filtering process, as follows.

Through the processes of steps S23 and S24, as shown in a state L2, the moving-object information including moving-object images P106, P107, and P112 in which the frame size is not within the predetermined range and the frame size is small and which are drawn by diagonal lines in the drawing is destroyed, and thus the moving-object information including moving-object images shown in a state L3 remains.

Next, through the processes of steps S25 and S26, as shown in the state L3, the moving-object information including moving-object images P104, P105, P110, and P115 in which there is a bias in the foreground images and the ratio of the foreground region is high is destroyed, and thus the moving-object information including moving-object images shown in a state L4 remains.

Further, through the processes of steps S27 and S28, as shown in the state L4, the moving-object information including moving-object images P101, P117, and P118 in which the correlation between the foreground image and the background image is high and a person that is a moving object is rarely included is destroyed, and thus the moving-object information including moving-object images shown in a state L5 remains. The moving-object image P118 is an image corresponding to the image P11 of FIG. 7 and the foreground image is P12.

Through the processes of steps S29 and S30, as shown in the state L5, the moving-object information including a moving-object image P108 in which the foreground region of the foreground image is not correctly extracted is destroyed, and thus the moving-object information including moving-object images shown in a state L6 remains. The moving-object image P108 is an image corresponding to the image P21 of FIG. 8.

Further, through the processes of steps S31 and S32, as shown in the state L6, the moving-object information including moving-object images P103, P111, and P116 in which a plurality of persons are imaged is destroyed, and thus the moving-object information including moving-object images shown in a state L7 remains.

In this way, of the moving-object images P101 to P118 supplied from the monitoring cameras 11, only the moving-object information including moving-object images P102, P109, P113, and P114 optimum for the human searching is retained in the moving-object information retaining unit 53.

As a result, since it is possible that only the moving-object information including the moving-object images suitable for the human searching is filtered through the moving-object information filtering process and is retained in the moving-object information retaining unit 53, it is possible to improve precision of the human searching. By destroying the moving-object information unsuitable for the human searching, it is possible to rapidly perform a moving-object information matching process which is necessary for the human searching and will be described below with reference to FIG. 11.

[Moving-Object Information Matching Process]

Next, a moving-object information matching process performed by the human searching and tracking server 12 will be described with reference to the flowchart of FIG. 11.

In step S51, the display image generating unit 57 displays a list of the moving-object images in the moving-object information retained in the moving-object information retaining unit 53 on the display unit 58 and displays a display image to prompt selection of the moving-object image indicating a searching target person.

In step S52, the moving-object information likelihood calculation processing unit 54 determines whether the operation input unit 60 is operated and the moving-object image designating the searching target person is selected. When the moving-object image designating the searching target person is not selected, the process returns to step S51. That is, until the moving-object image designating the searching target person is designated, the processes of steps S51 and S52 are repeated. Then, when the moving-object image designating the searching target person is designated in step S52, the process proceeds to step S53.

In step S53, the moving-object information likelihood calculation processing unit 54 sets, as criterion moving-object information, the moving-object information corresponding to the moving-object image designated as the searching target in the moving-object information retained in the moving-object information retaining unit 53 and sets the other moving-object information as unprocessed moving-object information.

In step S54, the moving-object information likelihood calculation processing unit 54 reads one piece of unprocessed moving-object information retained in the moving-object information retaining unit 53 and sets the read moving-object information as moving-object information of interest.

In step S55, the moving-object information likelihood calculation processing unit 54 calculates a moving-object image likelihood which is a likelihood between the moving-object image included in the criterion moving-object information and the moving-object image included in the moving-object information of interest and supplies the calculated moving-object image likelihood together with the moving-object information of interest to the moving-object image likelihood threshold determining unit 55. That is, for example, the moving-object information likelihood calculation processing unit 54 calculates the moving-object image likelihood based on similarity which is higher as persons imaged in the criterion moving-object information and the moving-object information of interest are more similar to each other.

In step S56, the moving-object image likelihood threshold determining unit 55 determines whether the supplied moving-object image likelihood is higher than a predetermined threshold. That is, the moving-object image likelihood threshold determining unit 55 determines whether the persons of the moving-object images of the criterion moving-object information and the moving-object information of interest accord with each other based on whether the moving-object image likelihood is higher than the predetermined threshold. When it is considered in step S56 that the moving-object image likelihood is higher than the predetermined threshold and the persons of the moving-object images of the criterion moving-object information and the moving-object information of interest match each other (accord with each other), the process proceeds to step S57.

In step S57, the moving-object image likelihood threshold determining unit 55 stores the moving-object information of interest in the result storage unit 56. At this time, the moving-object information likelihood calculation processing unit 54 sets the moving-object information of interest retained in the moving-object information retaining unit 53 as processed moving-object information.

Conversely, when it is considered in step S56 that the moving-object image likelihood is not higher than the predetermined threshold and the persons of the moving-object images of the criterion moving-object information and the moving-object information of interest do not match each other (do not accord with each other), the process proceeds to step S59.

In step S59, the moving-object image likelihood threshold determining unit 55 destroys the moving-object information of interest. Then, the moving-object information likelihood calculation processing unit 54 sets the moving-object information of interest retained in the moving-object information retaining unit 53 as processed moving-object information.

In step S58, the moving-object information likelihood calculation processing unit 54 determines whether unprocessed moving-object information is retained in the moving-object information retaining unit 53. For example, when unprocessed moving-object information is retained, the process proceeds to step S54. That is, until there is no unprocessed moving-object information in the moving-object information retaining unit 53, the processes of steps S54 to S59 are repeated so that the matching process is repeated on the moving-object images of all of the moving-object information and the criterion moving-object information.

When it is considered in step S58 that unprocessed moving-object information is considered not to be retained in the moving-object information retaining unit 53, the process proceeds to step S60.

In step S60, the display image generating unit 57 generates a display image indicating a searching and tracking result based on the moving-object information stored in the result storage unit 56.

In step S61, the display image generating unit 57 displays the display image indicating the searching and tracking result on the display unit 58. The display image indicating the searching and tracking result is, for example, an image P201 as illustrated in FIG. 12.

Figure 12:
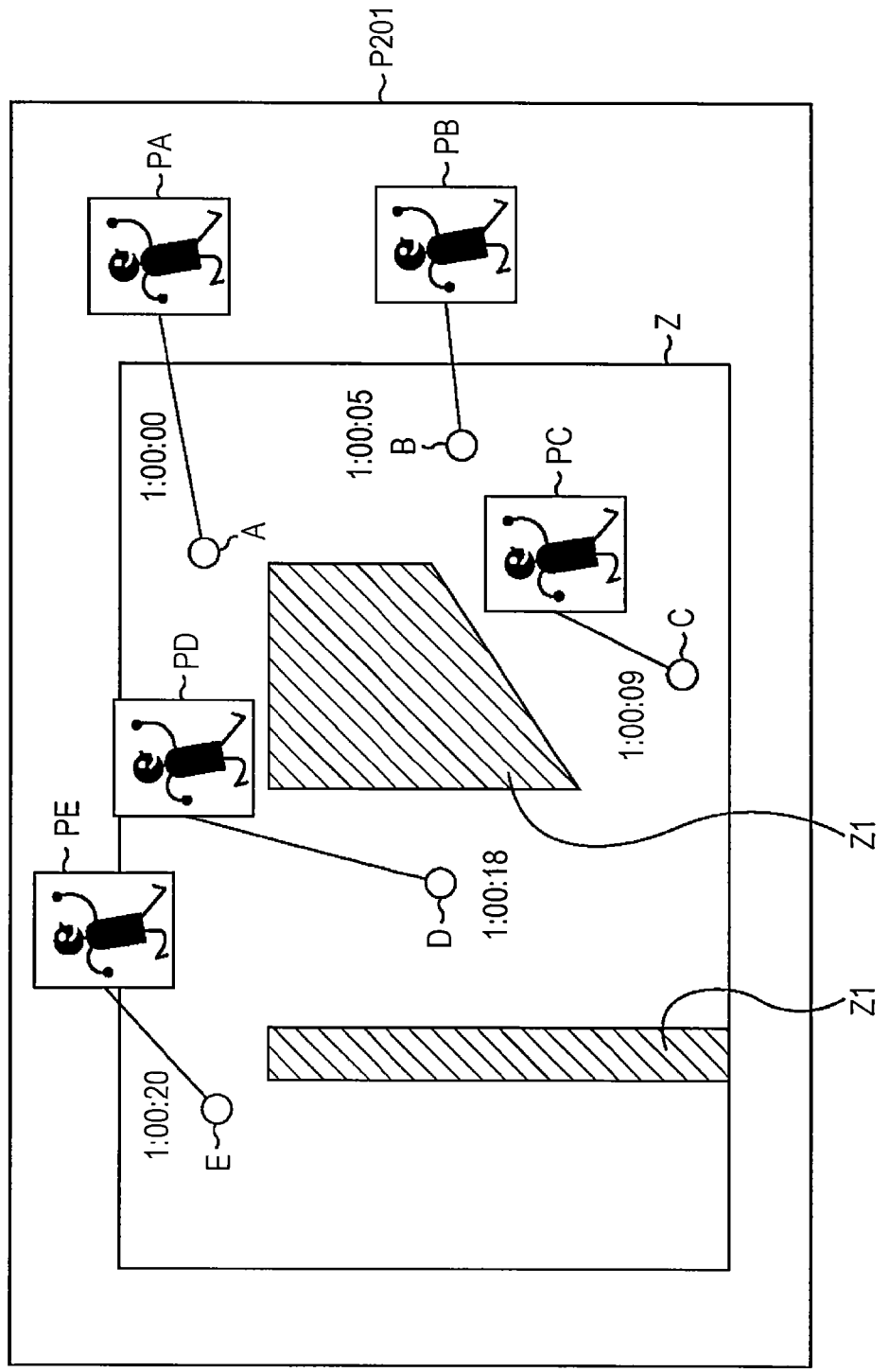
FIG. 12 is a diagram illustrating an example of a display screen showing a human searching and tracking result displayed by the moving-object information matching process.

In the image P201 illustrated in FIG. 12, plots A to E indicating positions at which a moving-object image of the same person as the searching target person is captured are displayed at positions corresponding to global coordinates in a monitoring region Z based on the moving-object information stored in the result storage unit 56. Regions Z1 and Z2 indicate objects within a monitoring area. An imaging time at which the moving-object image included in each of pieces of the moving-object information is captured are displayed above each of the plots A to E indicating the positions at which the person considered to be the searching target is detected. In the present case, the imaging times of the plots A to E are shown as 1:00:00, 1:00:05, 1:00:09, 1:00:18, and 1:00:20. Further, moving-object images captured at the positions are appended to the plots A to E by lead lines, and thus moving-object images PA to PE are appended to the plots A to E, respectively.

When the image P201 indicating the searching and tracking result is displayed, the user can recognize at which time the person designated as the searching target passes through the positions indicated by the plots, B, C, D, and E in this order from the position indicated by the plot A.

When the user visually confirms the moving-object images PA to PE displayed in the state connected by the lead lines from the plots A to E in the display image P201 and confirms that the person is the searching target, the user can input decision information by selection with the operation input unit 60. When the decision information is input, a matching amendment process to be described below with reference to the flowchart of FIG. 13 can be performed and the searching and tracking result can be amended so that a searching and tracking result can be obtained with higher precision.

Here, the description will be made referring back to the flowchart of FIG. 11.

In step S62, the matching amendment processing unit 59 determines whether one of the moving-object images PA to PE shown in the display image P201 is selected based on information regarding the display image P201 supplied from the display image generating unit 57 and an operation signal supplied from the operation input unit 60, the decision information is input, and the matching amendment process is instructed.

When one of the moving-object images PA to PE shown in the display image P201 is selected and the decision information is input in step S62, the matching amendment process is considered to be instructed and the process proceeds to step S63.

In step S63, the matching amendment processing unit 59 performs the matching amendment process and displays a human searching and tracking result subjected to the amendment process. The matching amendment process will be described below in detail with reference to FIG. 13.

In step S64, the matching amendment processing unit 59 determines whether ending is instructed. When ending is not instructed, the process returns to step S61. That is, the display screen P201 indicating the human searching and tracking result is continuously displayed on the display unit 58. Conversely, when ending is instructed in step S64, the process ends.

By merely designating the moving-object image of the searching target person through the foregoing moving-object information matching process it is possible to search for the moving-object information which accords with the searching target person based on the moving-object image and display the searching and tracking result indicating a movement path of the searching target person from the moving-object information which is the searching result. The example has been described above in which when the searching target person is designated, the person is designated from the moving-object image of the moving-object information retained in the moving-object information retaining unit 53. However, a searching target person may be designated by enabling separately inputting an image other than the images captured by the monitoring cameras 11 and treating the image in the same way as the moving-object image.

Figure 11:
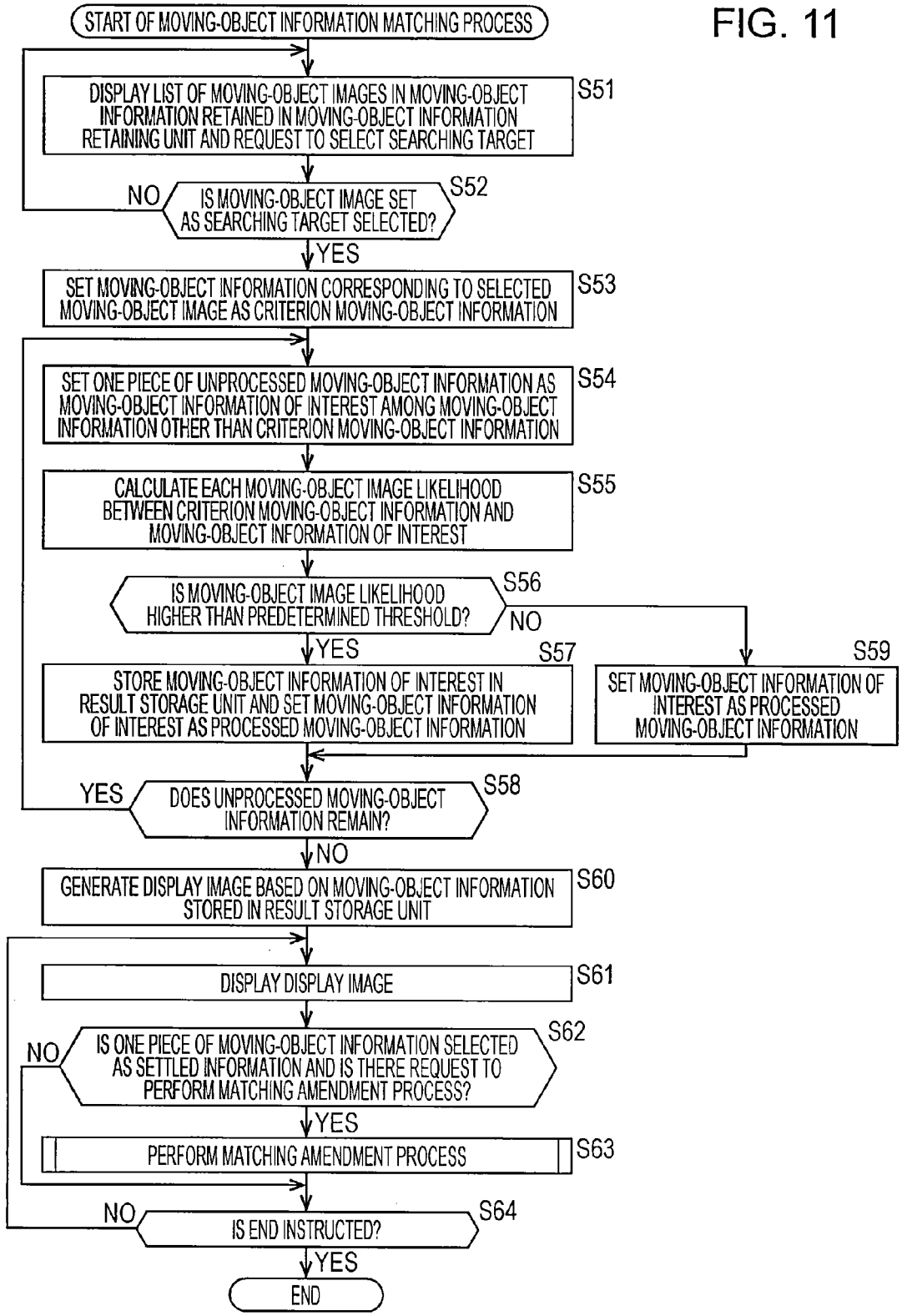
FIG. 11 is a flowchart illustrating a moving-object information matching process.

[Matching Amendment Process of FIG. 11]

Figure 13:
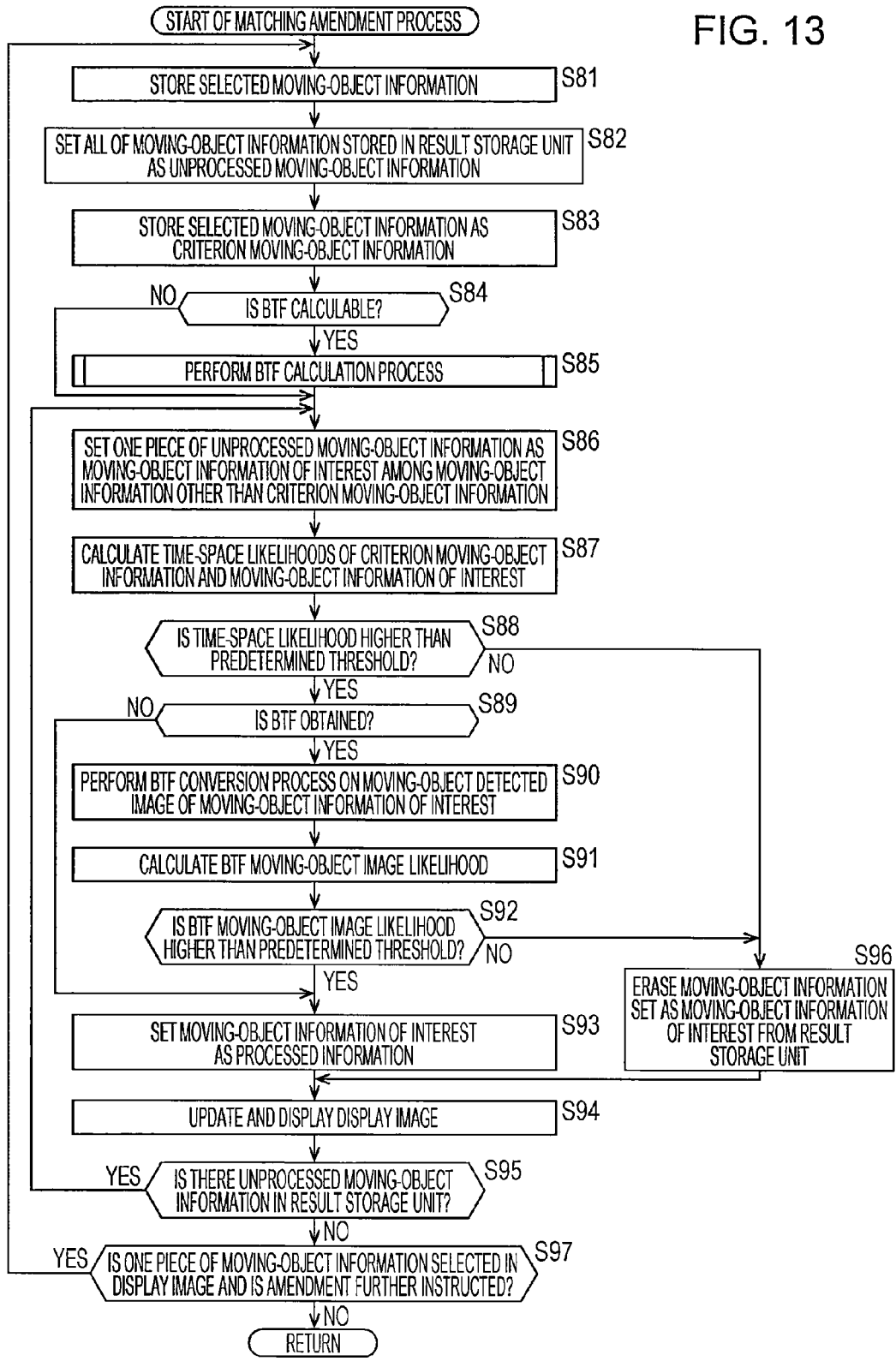
FIG. 13 is a flowchart illustrating a matching amendment process of FIG. 11.

Next, the matching amendment process of FIG. 11 performed by the human searching and tracking server 12 will be described with reference to the flowchart of FIG. 13.

In step S81, the matching amendment processing unit 59 stores information indicating that the moving-object image for which the decision information is input by the operation input unit 60 is included, in association with the moving-object information. Since it is decided that the moving-object information for which the decision information is input is the moving-object information appropriately extracted through the moving-object image matching process, the moving-object information is excluded from the searching target and is continuously stored in the result storage unit 53 in the subsequent processes.

In step S82, the matching amendment processing unit 59 sets, as the unprocessed moving-object information, all of the moving-object information for which the decision information is not input among the moving-object information stored in the result storage unit 56.

In step S83, the matching amendment processing unit 59 sets, as the criterion moving-object information, the moving-object information for which the decision information is recently input among the moving-object information stored in the result storage unit 56.

In step S84, the BTF calculating unit 92 determines whether the BTF can be calculated. In step S84, a first BTF-calculable condition is a case in which there is moving-object information including another moving-object image which has a camera ID different from the camera ID included in the criterion moving-object information and for which the decision information is input. A second BTF-calculable condition is a case in which there are two or more moving-object images for which the decision information is input and the moving-object images are captured by the different monitoring cameras 11 with different camera IDs. Accordingly, based on whether the moving-object information satisfying one of the foregoing two conditions is present in the result storage unit 56, the BTF calculating unit 92 determines whether the BTF can be calculated. When the BTF can be calculated in step S84, the BTF calculating unit 92 calculates the BTF by performing a BTF calculation process using information regarding the pixel values between the moving-object images for which the decision information is input despite of different camera IDs or the moving-object images included in the criterion moving-object information in step S85. The BTF is a function indicating a mutual correspondence relation between colors of the moving-object images including the same subject imaged by the monitoring cameras 11 specified by two different camera IDs. Accordingly, when the BTF is calculated, color correction can be performed by performing color conversion on one of the moving-object images captured by two monitoring cameras 11 with different camera IDs, using the BTF, irrespective of whether there is the decision information. Through the color correction process, it is possible to correct a change in color occurring due to a difference in imaging environment light of the monitoring area between the different monitoring cameras 11 or an individual difference or the like of an image sensor of the imaging unit 31. As a result, the moving-object images captured by two different monitoring cameras 11 are subjected to color correction as if the moving-object images are captured by the same monitoring camera 11. Therefore, it is possible to calculate the moving-object image likelihood between the moving-object images more accurately.

The details of the BTF calculation process may be referred to in "Appearance modeling for tracking in multiple non-overlapping cameras" by O. Javed, K. Shafique and M. Shah, In IEEE Int. Conf. on Computer Vision and Pattern Recognition pp. 26 to 33, 2005.

On the other hand, when the moving-object image for which the decision information is input is captured by one kind of monitoring camera 11 in step S84, the BTF is considered not to be calculable and the process of step S85 is skipped.

In step S86, the time-space likelihood calculating unit 93 sets, as the moving-object information of interest, one piece of the unprocessed moving-object information among the moving-object information which is stored in the result storage unit 56 and is the moving-object information excluding the criterion moving-object information.

In step S87, the time-space likelihood calculating unit 93 calculates a time-space likelihood based on information regarding the global coordinates and the imaging time included in the criterion moving-object information and the moving-object information of interest. More specifically, for example, the time-space likelihood calculating unit 93 obtains a movement distance from a difference between the global coordinates included in the criterion moving-object information and the global coordinates included in the moving-object information of interest and calculates the time-space likelihood of the moving-object information based on a ratio of a time between the imaging times of the moving-object information to an average necessary time taken to travel the movement distance at an average human movement speed.

In step S88, the time-space likelihood threshold determining unit 94 determines whether the calculated time-space likelihood is higher than a predetermined threshold. For example, when a display image indicating the human searching and tracking result is a display image illustrated in the upper portion of FIG. 14, as indicated by a hand H1, a moving-object image PA corresponding to a plot A is selected by the operation input unit 60, and the decision information is input, the moving-object information corresponding to the plot A becomes the criterion moving-object information. In the case of the display image of FIG. 14, the imaging times are 1:00:00, 1:00:05, 1:00:10. 1:00:15, and 1:00:05 in the moving-object information corresponding to the plots A to E, respectively. The plots A and B are moving-object information corresponding to the moving-object images PA and PB captured by the same monitoring camera 11 that images an imaging area CamA indicated by a triangle formed by the same dotted line. Likewise, the plots C and D are moving-object information corresponding to the moving-object images PC and PD captured by the same monitoring camera 11 that images an imaging area CamB indicated by a triangle formed by a dotted line. Further, the plot E is moving-object information corresponding to the moving-object image PE captured by the monitoring camera 11 that images an imaging area CamC indicated by a triangle formed by a dotted line.

In this case, when the moving-object information corresponding to the plot B is moving-object information of interest and a distance between the plots A and B is assumed to be a distance AB, the ratio of the time between the imaging times of the moving-object information to the average necessary time taken to travel the movement distance at the average human movement speed is 5/(AB/w). Here, w indicates the average human movement speed. For example, when the distance AB is 5 m and the average human movement speed is 1 m/s, the ratio is 1 and the time-space likelihood is the highest value. Likewise, when the moving-object information corresponding to the plots C and D is the moving-object information of interest and the distances between the plots A and C and between the plots A and D are assumed to be a distance AC and a distance AD, the ratios of the times between the imaging times of the moving-object information to the average necessary time taken to travel the movement distances at the average human movement speed are 10/(AC/w) and 15/(AD/w), respectively. For example, when the distances AC and AD are 10 m and 15 m, respectively, and the average human movement speed is 1 m/s, the ratios are all 1 and the time-space likelihood is the highest value.

Thus, when the time-space likelihood is the highest value in step S88, the time-space likelihood threshold determining unit 94 considers the time-space likelihood to be higher than the predetermined threshold and the process proceeds to step S89.

On the other hand, when the moving-object information corresponding to the plot E is the moving-object information of interest and the distance between the plots A and E is assumed to be a distance AE, the ratio of the time between the imaging times of the moving-object information to the average necessary time taken to travel the movement distance at the average human movement speed is 5/(AE/w). That is, for example, when the distance AE is 25 m and the average human movement speed is 1 m/s, it takes about 5 seconds to travel 25 m. Therefore, the ratio is 0.2 and the time-space likelihood is a low value. When the time-space likelihood is low in step S88, the time-space likelihood threshold determining unit 94 considers the time-space likelihood to be lower than the predetermined threshold and the process proceeds to step S96.

Figure 14:
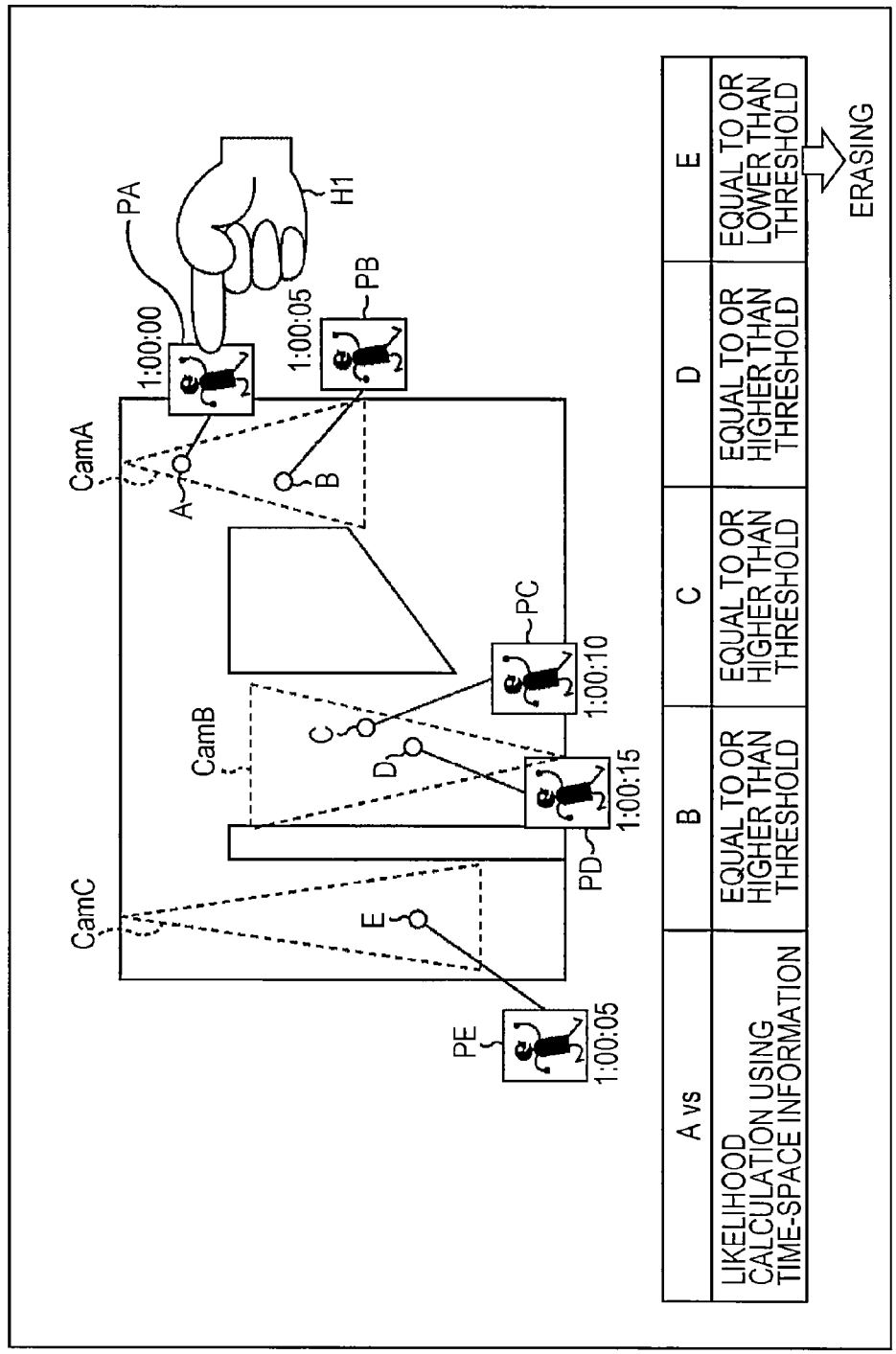
FIG. 14 is a diagram illustrating the matching amendment process of FIG. 11.

In step S96, the matching amendment processing unit 59 erases the moving-object information of interest from the result storage unit 56. That is, when the image indicating the searching and tracking result shown in the image P211 of FIG. 14 is displayed and the decision information is input in the moving-object image PA corresponding to the plot A, the moving-object information of the plot E in which the same person may not be present is erased, as shown in the table shown below the display image of FIG. 14 based on the time-space information. Since the searching and tracking result erroneously detected in the moving-object information matching process using only the moving-object images can be excluded through these processes, it is possible to realize the human searching and tracking of a searching target person with higher precision.

In step S89, the BTF image processing unit 95 determines whether the BTF is obtained. For example, when the BTF is not obtained, the process proceeds to step S93.

In step S93, the matching amendment processing unit 59 sets, as processing completion, the moving-object information which is the moving-object information of interest among the moving-object information stored in the result storage unit 56.

Figure 15:
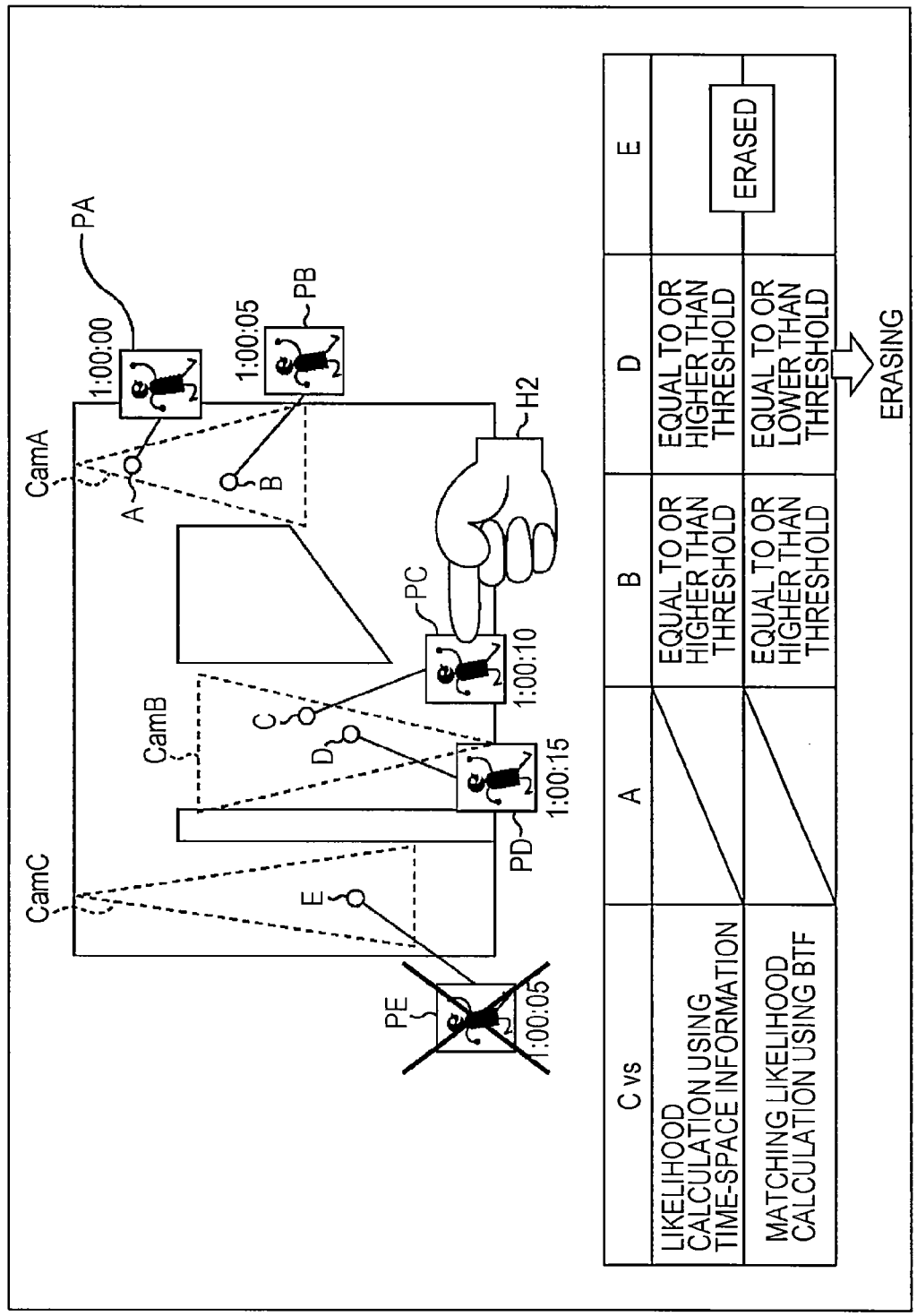
FIG. 15 is a diagram illustrating the matching amendment process of FIG. 11.

In step S94, the display image generating unit 57 reflects an update result of the result storage unit 56, updates and generates the image indicating the searching and tracking result, and displays the image on the display unit 58. That is, for example, as shown in the display screen in the upper portion of FIG. 15, the display corresponding to the plot E is erased and displayed. In FIG. 15, to indicate that the display is erased, a sign of a cross mark is expressed. However, in practice, the display itself is erased.

In step S95, the time-space likelihood calculating unit 93 determines whether there is unprocessed moving-object information among the moving-object information that is stored in the result storage unit 56 and is the moving-object information excluding the criterion moving-object information. When there is unprocessed moving-object information, the process returns to step S86. That is, the processes of steps S86 to S96 are repeated as long as there is unprocessed moving-object information. Then, when it is considered in step S95 that there is no unprocessed moving-object information, the process proceeds to step S97.

In step S97, the operation input recognizing unit 91 determines whether the matching amendment process is instructed additionally when the operation input unit 60 is operated, the moving-object image corresponding to one piece of moving-object information is selected, and the decision information is input. For example, as indicated by a hand H2 of FIG. 15, when the operation input unit 60 is operated, the moving-object image PC corresponding to the plot C is selected, and the decision information is input in step S97, the process returns to step S81 and the matching amendment process is performed additionally.

At this time, in step S84, the BTF can be considered to be calculable since the moving-object images for which the decision information is input are two moving-object images PA and PC and the camera IDs identifying the monitoring cameras 11 capturing the moving-object images are different from each other.

Accordingly, in this case, in step S85, the BTF calculating unit 92 calculates the BTF using the moving-object image PC of the moving-object information corresponding to the plot C and the moving-object image PA of the moving-object information corresponding to the plot A. In this case, since the criterion moving-object information is the moving-object information of the moving-object image PC corresponding to the plot C, the obtained BTF is assumed to be a function used to correct a change in the color of the moving-object image PA captured by the monitoring camera 11 imaging the imaging area CamA using the color of the moving-object image PC captured by the monitoring camera 11 imaging the imaging area CamB as a criterion.

As a result, when the moving-object information of interest is the moving-object information corresponding to the moving-object image PB captured in the imaging area CamA, the BTF is considered to be obtained in step S89, and thus the process proceeds to step S90.

In step S90, the BTF image processing unit 95 performs color correction by converting the color of the moving-object image of the moving-object information of interest using the calculated BTF. That is, in the present case, the BTF image processing unit 95 performs the color correction to correspond to the color of the moving-object image PC of the criterion moving-object information captured by the monitoring camera 11 imaging the imaging area CamB by applying the BTF to the moving-object image PB in FIG. 15.

In step S91, the BTF image likelihood calculating unit 96 calculates a BTF image likelihood which is a likelihood between the moving-object image of the criterion moving-object information and the moving-object image, which is the moving-object image of the moving-object information of interest and is subjected to the color conversion by the BTF. The BTF image likelihood is basically the same as the likelihood in the moving-object information likelihood calculation processing unit 54.

In step S92, the BTF image likelihood threshold determining unit 97 determines whether the moving-object image of the criterion moving-object information matches the moving-object information of the moving-object information of interest subjected to the color conversion by the BTF based on whether the calculated BTF image likelihood is higher than a predetermined threshold. When the BTF image likelihood is higher than the predetermined threshold in step S92, the process proceeds to step S93. That is, in this case, the moving-object information of the moving-object information of interest remains in the result storage unit 56.

Conversely, when the BTF image likelihood is lower than the predetermined threshold in step S92, the process proceeds to step S96. That is, in this case, through the process of step S96, the moving-object information of the moving-object information of interest is erased from the result storage unit 56.

That is, as shown in a table in the lower portion of FIG. 15, when the decision information is input to the moving-object image PA corresponding to the plot A and the decision information is subsequently input to the moving-object image PC corresponding to the plot C, the BTF is obtained which is used to correct the color of the image captured by the monitoring camera 11 imaging the imaging area CamA using the color of the image captured by the monitoring camera 11 imaging the imaging area CamB as a criterion. Then, the moving-object information corresponding to the plot B and including the moving-object image for which the time-space likelihood is higher than the predetermined threshold and the BTF image likelihood is higher than the predetermined threshold remains in the result storage unit 56. On the other hand, the moving-object information corresponding to the plot D and including the moving-object image for which the time-space likelihood is higher than the predetermined threshold and the BTF image likelihood is lower than the predetermined threshold is erased from the result storage unit 56. The reason why diagonal lines are drawn for the plot A in the table in the lower portion of FIG. 15 is that the moving-object information is the moving-object information for which the decision information is already input, and therefore is not a processing target.

That is, the matching correction process is repeatedly performed again based on the decision information when the user inputs the decision information in the foregoing matching amendment process. Therefore, as the decision information is input, the precision of the searching and tracking result can be improved. When the decision information is input for the moving-object images captured by the different monitoring cameras 11, the BTF can be obtained. Therefore, since the matching amendment process is performed based on the BTF image likelihood corresponding to the change in the color between the monitoring cameras 11 after the consideration of the time-space likelihood, it is possible to perform the human searching and tracking with higher precision.

Since the BTF of the moving-object image of the criterion moving-object information and the moving-object image of the moving-object information of interest and the BTF corresponding to only two monitoring cameras 11 may be merely calculated, a processing load for the calculation of the BTF is reduced, thereby improving a processing speed related to the calculation of the BTF.

The example has been described above in which the matching amendment process is repeated by designating a searching target person, searching for the moving-object information regarding the searching target person, displaying the display image indicating the human searching and tracking result from the searching result, and subsequently inputting the decision information. However, by variously changing a searching target person, the present technology can be applied to various uses.

For example, by setting a strange person or a suspicious person as a searching target person, a movement history of the strange person or the suspicious person can be confirmed from a human searching and tracking result and it can be practically confirmed whether there are suspicious points.

More specifically, for example, when a suspicious person who is not a company member is found inside a company, a movement history of the outside suspicious person can be confirmed by setting the outside suspicious person as a searching target person. Therefore, for example, when the outside suspicious person invades into a place where nobody can enter without carrying a staff identity card, it can be confirmed that the outside suspicious person invades into the place. Therefore, the present technology can be used in a so-called security system.

For example, by setting a plurality of users who are searching target persons on floors of stores as searching target persons, movement paths that the users moving on each floor follow in each floor can be confirmed from a human searching and tracking result. Therefore, this information can be applied to the stores. More specifically, for example, since movement histories of users within floors of customers can be confirmed and layouts of products can be changed optimally based on the movement histories, the present technology can be used in a so-called marketing research system.

<2. Second Embodiment>

The example has been described above in which the movement history of a person is obtained using the moving-object information detected through the moving-object detection. However, by using human information detected by human detection instead of the moving-object detection, a movement history may be obtained with higher precision. Hereinafter, an example with the human detection will be described in a second embodiment. The configuration of the monitoring system illustrated in FIG. 1 is the same, and thus the description thereof will be omitted. In the following description, the same names and the same reference numerals are given to constituent elements having the same functions as the constituent elements described with reference to FIGS. 1 to 15, and the description thereof will be appropriately omitted.

[Second Configuration Example of Monitoring Camera]

Next, a second configuration example of a monitoring camera 11 will be described with reference to the block diagram of FIG. 16.

Figure 16:
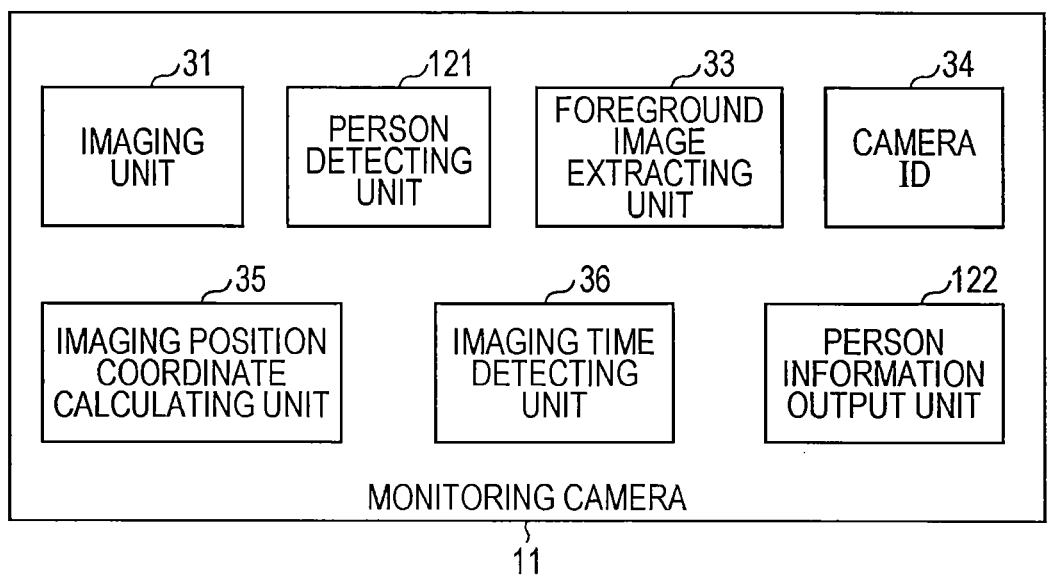
FIG. 16 is a block diagram illustrating a second configuration example of the monitoring camera.

The basic configuration of the monitoring camera 11 in FIG. 16 is the same as the monitoring camera 11 in FIG. 2, but is different in that a person detecting unit 121 and a person information output unit 122 are provided instead of the moving-object detecting unit 32 and the moving-object information output unit 37.

The person detecting unit 121 extracts a feature amount from each of the images captured by the imaging units 31, detects a region in which a person is imaged based on the extracted feature amount, and extracts image information indicating a person-imaged region in which, for example, the detected region in which the person is imaged is set to 1 and the other region is set to 0, as a person image. More specifically, when HOG (Histograms of Oriented Gradients) is used as an image feature amount, the person detecting unit 121 performs an edge extraction process on the captured image to extract an edge image for recognition of a silhouette of a subject from the captured image. Then; the person detecting unit 121 divides the edge-extracted image into sections in a gradient direction for each local region, takes a histogram, and sets the histogram as a feature amount. Based on the feature amount extracted in this way, the person detecting unit 121 determines whether the silhouette is a person. When it is determined that the silhouette is a person, the person detecting unit 121 generates an image in which a region considered to be a person is set to 1 and the other region is set to 0 and detects the image as a person image.

The person information output unit 122 generates person information including the captured image, the camera ID of the imaging unit 31 capturing the image, the global coordinates of the person, and the imaging time based on information regarding the captured image, the camera ID of the imaging unit 31 capturing the image, the global coordinates of the person, and the imaging time in regard to each of the person images extracted from the images captured by the imaging units 31, and then outputs the person information to the human searching and tracking server 12 via the network 13.

[Second Configuration Example of Human Searching and Tracking Server]

Figure 17:
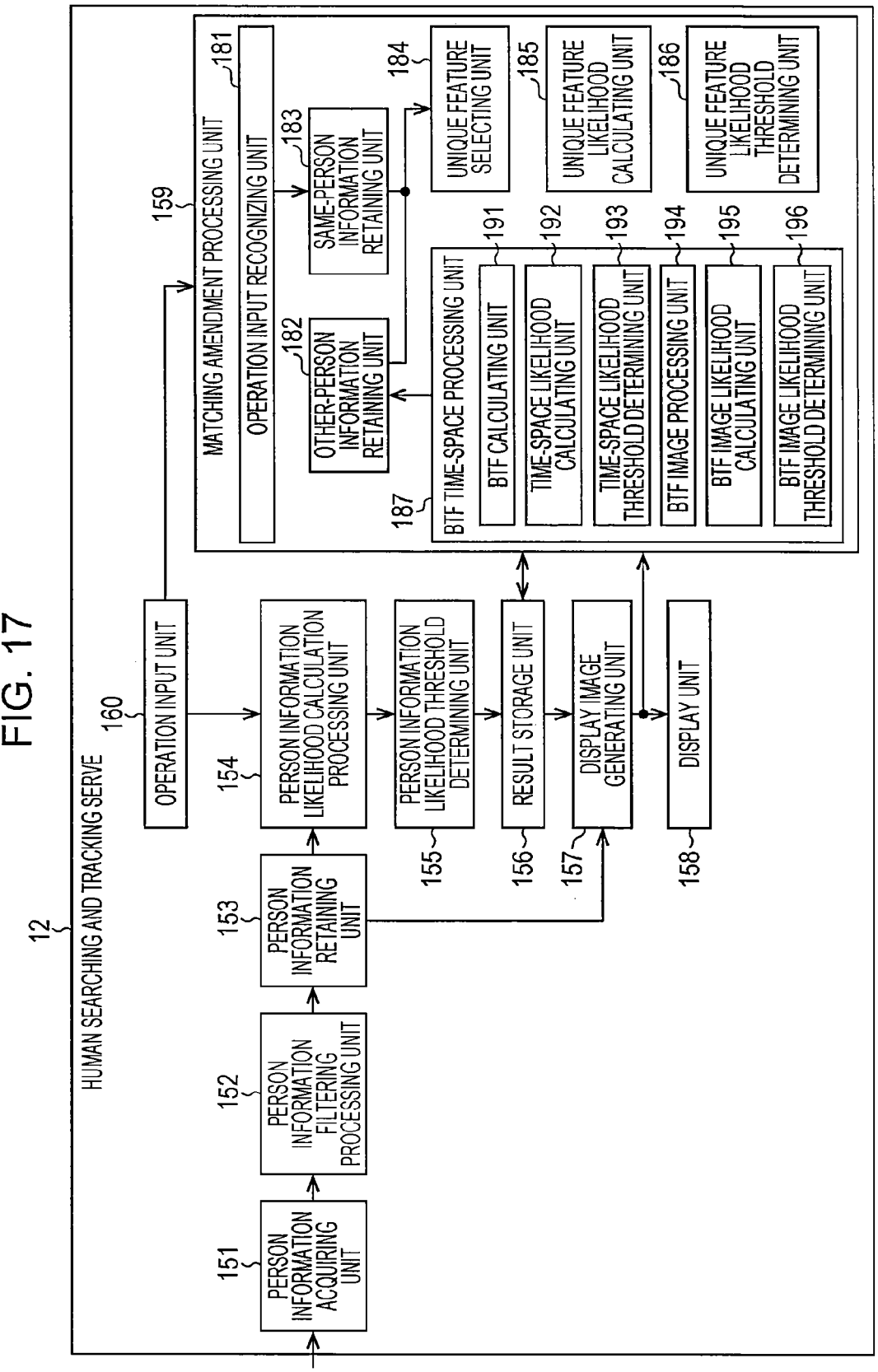
FIG. 17 is a block diagram illustrating a second configuration example of the human searching and tracking server.

Next, a second configuration example of the human searching and tracking server 12 will be described with reference to the block diagram of FIG. 17.

The human searching and tracking server 12 is configured to include a person information acquiring unit 151, a person information filtering processing unit 152, a person information retaining unit 153, a person information likelihood calculation processing unit 154, a person information likelihood threshold determining unit 155, a result storage unit 156, a display image generating unit 157, a display unit 158, a matching amendment processing unit 159, and an operation input unit 160. Since the display image generating unit 157, the display unit 158, and the operation input unit 160 have the same configurations as the display image generating unit 57, the display unit 58, and the operation input unit 60, the description thereof will be omitted.

The person information acquiring unit 151 acquires the person information supplied from the monitoring cameras 11 via the network 13, temporarily stores the person information, and supplies the person information to the person information filtering processing unit 152.

The person information filtering processing unit 152 filters the person information supplied from the person information acquiring unit 151 under a predetermined condition, extracts only person information suitable for the human searching, retains the extracted person information in the person information retaining unit 153, and destroys unsuitable person information. More specifically, the person information filtering processing unit 152 filters the person information depending on whether the person image included in the person information is an image in which the whole body of the person is captured, retains only the image in which the whole body of the person is captured in the person information retaining unit 153, and destroys the person information which is unsuitable and in which the whole body of the person is not captured.

The person information retaining unit 153 retains only the person information including the person image which is suitable for the human searching by the person information filtering processing unit 152 and in which the whole body of the person is captured, and then supplies the person information to the person information likelihood calculation processing unit 154 and the display image generating unit 157, as necessary.

The person information likelihood calculation processing unit 154 calculates, for each person information, a person image likelihood of the person image of the person information other than criterion person information, which is a searching target including the person image of the person information designated as a searching target, with respect to the criterion person information, among the person images included in the person information retained in the person information retaining unit 153, and then supplies the person image likelihood to the person information likelihood threshold determining unit 155.

The person information likelihood threshold determining unit 155 determines whether the person image likelihood obtained based on the person image calculated by the person information likelihood calculation processing unit 154 is higher than a threshold, and then stores the person information including the person image with a higher person image likelihood in the result storage unit 156. That is, the person information likelihood threshold determining unit 155 performs a person image matching process based on the person image likelihood of the person information other than the criterion person information which is a searching target with respect to the criterion person information and extracts the person information including the person image with the higher person image likelihood as information matched based on the person image. Then, the person information likelihood threshold determining unit 155 stores the extracted person information as a matching result with the criterion person information which is a searching target in the result storage unit 156.

The matching amendment processing unit 159 performs a matching amendment process based on decision information input through an operation of the operation input unit 160 when the user decides a person image of a searching target based on the person image displayed in the searching and tracking result displayed on the display unit 158. The matching amendment processing unit 159 performs the matching amendment process again at the time of the input of the decision information again even after performing the matching amendment process to repeat the matching amendment process when the decision information is input.

More specifically, the matching amendment processing unit 159 includes an operation input recognizing unit 181, an other-person information retaining unit 182, a same-person information retaining unit 183, a unique feature selecting unit 184, a unique feature likelihood calculating unit 185, a unique feature likelihood threshold determining unit 186, and a BTF time-space processing unit 187.

The operation input recognizing unit 181 recognizes that the decision information is input in regard to the selected person information in the searching and tracking result displayed on the display unit 158 based on the operation signal of the operation input unit 160.

The other-person information retaining unit 182 retains, as a person image of another person different from the person assumed to be the searching target, the person image for which the decision information is not input and which is the person image of the person information determined not to be the person image designated as the searching target by the BTF time-space processing unit 187 and thus destroyed.

The same-person information retaining unit 183 retains the person information including the person image for which the decision information is input and the person information including the person image of the person designated as the searching target, as person information of the same person as the searching target person.

The unique feature selecting unit 184 performs learning based on information regarding the person image which is not the person image of the searching target person registered in the other-person information retaining unit 182, i.e., the person image considered to be the person image of another person and extracts a feature amount of the person image of a person that is not a searching target person as a learning result. The unique feature selecting unit 184 performs learning based on information regarding the person image considered to be the person image of the same person as the searching target person registered in the same-person information retaining unit 183 and extracts a feature amount of the person image of the searching target person as a learning result. The unique feature selecting unit 184 extracts, as a unique feature, a feature amount of which there is a low probability of the person image of another person having and of which there is considered to be a high probability of the person image of the same person having by the learning and supplies the unique feature to the unique feature likelihood calculating unit 185.

The unique feature likelihood calculating unit 185 calculates, for each person information, a unique feature likelihood of the person image of the person information other than criterion person information, which includes the person image of the person information designated as the searching target and is a searching target, with respect to the criterion person information, among the person images included in the person information retained in the person information retaining unit 153 based on the extracted unique feature and supplies the unique feature likelihood to the unique feature likelihood threshold determining unit 186.

The unique feature likelihood threshold determining unit 186 determines whether the unique feature likelihood obtained based on the person image calculated by the unique feature likelihood calculation processing unit 185 is higher than a threshold and stores the person information including the person image with the high unique feature likelihood in the result storage unit 156. That is, the unique feature likelihood threshold determining unit 186 performs a person image matching process based on the unique feature likelihood of the person information other than the criterion person information with respect to the criterion person information which is the searching target and extracts the person information including the person image with the high unique feature likelihood as information matched based on the person image. The unique feature likelihood threshold determining unit 186 stores the extracted person information as a result matched with the criterion person information which is the searching target in the result storage unit 156.

The BTF time-space processing unit 187 performs a determination process using a time-space and the BTF image as in the process described in the first embodiment. More specifically, the BTF time-space processing unit 187 includes a BTF calculating unit 191, a time-space likelihood calculating unit 192, a time-space likelihood threshold determining unit 193, a BTF image processing unit 194, a BTF image likelihood calculating unit 195, and a BTF image likelihood threshold determining unit 196. Since the BTF calculating unit 191, the time-space likelihood calculating unit 192, the time-space likelihood threshold determining unit 193, the BTF image processing unit 194, the BTF image likelihood calculating unit 195, and the BTF image likelihood threshold determining unit 196 are the same as the BTF calculating unit 92, the time-space likelihood calculating unit 93, the time-space likelihood threshold determining unit 94, the BTF image processing unit 95, the BTF image likelihood calculating unit 96, and the BTF image likelihood threshold determining unit 97, the description thereof will be omitted.

[Imaging Process by Monitoring Camera in FIG. 16]

Next, the imaging process by the monitoring camera 11 in FIG. 16 will be described with reference to the flowchart of FIG. 4.

In step S101, the imaging unit 31 of the monitoring camera 11 continuously captures images configured from still images or a moving image of the monitoring area which can be monitored at the installation position.

In step S102, the person detecting unit 121 extracts a feature amount necessary to determine whether a person is imaged from each of the images captured by the imaging unit 31 and detects a region in which the person is imaged based on the extracted feature amount. For example, the person detecting unit 121 extracts, as a person image, image information indicating the person-imaged region in which a region in which the detected person is imaged is set to 1 and the other region is set to 0.

More specifically, when HOG (Histograms of Oriented Gradients) is used as an image feature amount, the person detecting unit 121 performs an edge extraction process on the captured image to extract an edge image for recognition of a silhouette of a subject from the captured image. Then, the person detecting unit 121 divides the edge-extracted image into sections in a gradient direction for each local region, takes a histogram, and sets the histogram as a feature amount. Based on the feature amount extracted in this way, the person detecting unit 121 determines whether the silhouette is a person. When it is determined that the silhouette is a person, the person detecting unit 121 generates a person image in which a region considered to be a person is set to 1 and the other region is set to 0 and outputs the person image as a detection result.

Figure 19:
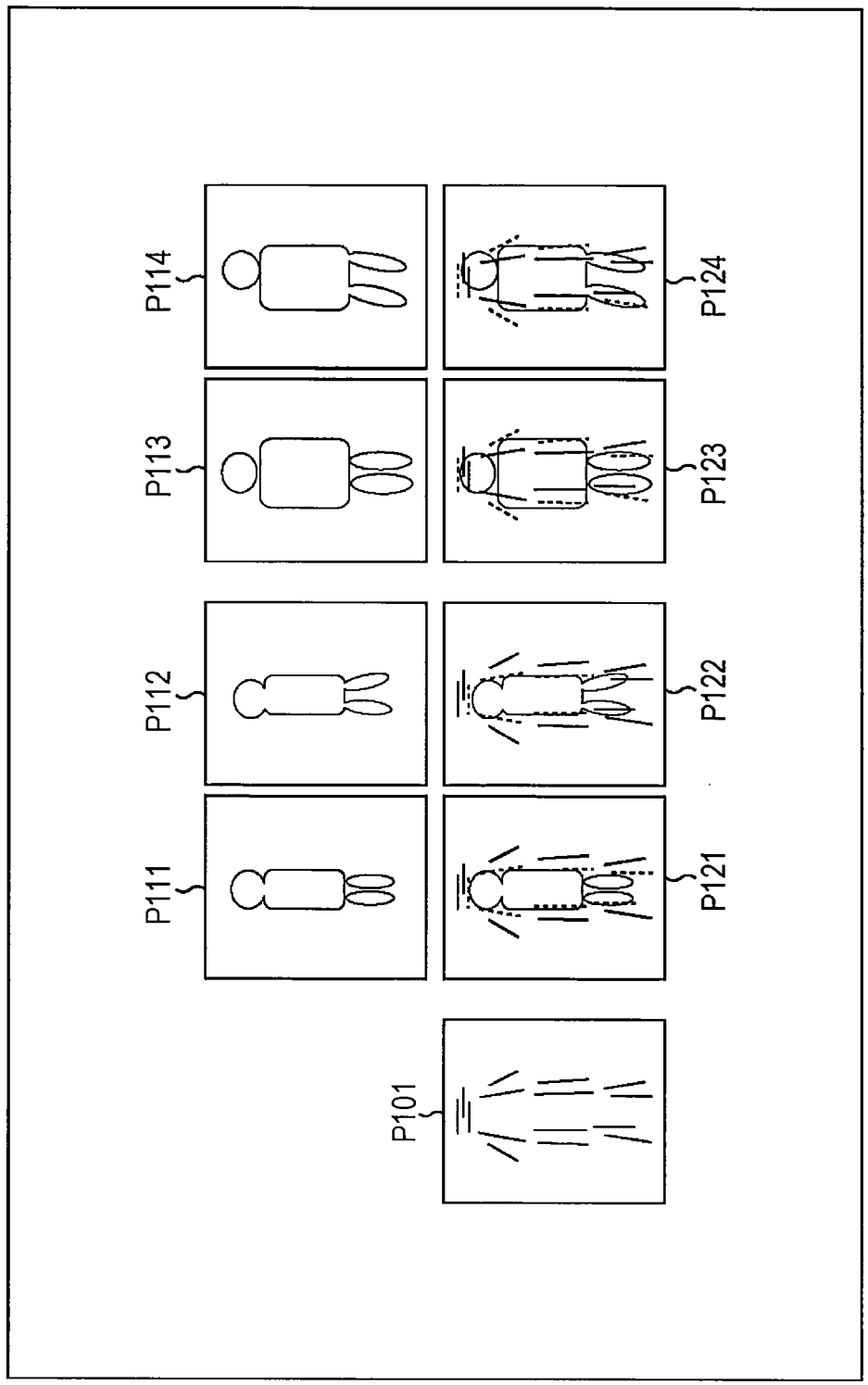
FIG. 19 is a diagram illustrating person detection.

That is, when an image shown as an image P111 in FIG. 19 is captured, the person detecting unit 121 retains a feature amount which is formed from line segments indicated by solid lines and is used to detect a silhouette of a person shown in an image P101, and the line segments are superimposed on the image P111 in which the person is imaged. At this time, a histogram in which sections are divided in a gradient direction for each local region shown as line segments indicated by dotted lines of an image P121 is extracted as a feature amount. Then, based on the extracted feature amount, the person detecting unit 121 determines whether the region is a person. When it is determined that the region is a person, the person detecting unit 121 extracts an image formed from the person region and the other region as a person image. In the case of FIG. 19, the image P111 is seen in which there is a person since the feature amount indicated by the dotted line accords with a feature amount stored in advance. The same process is also performed on captured images P112 to P114, and thus histograms in which sections are divided in a gradient direction for each local region formed from line segments shown in images P122 to P124 are extracted as feature amounts.

In regard to HOG (Histograms of Oriented Gradients), for example, Histograms of Oriented Gradients for Human Detection by N. Dalal, B. Trigg: Computer Vision and Pattern Recognition, San Diego, Calif., Jun. 20 to 25, 2005 may be referred to. A method other than HOG may be used as a feature amount extracting method used to detect a person. For example, a feature amount extracted by Haar like feature or HOG may be used a plurality of times. Here, in regard to Haar like features, An Extended Set of Haar-like Features for Rapid Object Detection by Rainer Lienhart and Jochen Maydt: IEEE ICIP 2002, Vol. 1, pp. 900 to 903, September 2002 may be referred to. In regard to a method of using a feature amount extracted by HOG a plurality of times, Japanese Unexamined Patent Application Publication No. 2009-301104 may be referred to.

In step S103, the imaging position coordinate calculating unit 35 calculates an imaging direction, an angle, and a distance based on the position or the size of the person present in the person image and calculates the global coordinates of the person which is a subject based on the global coordinates at which the monitoring camera is installed. That is, for example, based on the person image, the imaging position coordinate calculating unit 35 calculates the coordinate position expressed by the latitude and longitude or the like of the person on the Earth as global coordinates.

In step S104, the imaging time detecting unit 36 detects time information of a timing at which the image is captured, as an imaging time, based on the time information generated by a real-time clock (not illustrated).

In step S105, the person information output unit 122 reads the camera ID from the camera ID storage unit 34 and generates the person image, the global coordinates, and the imaging time collectively as the person information.

In step S106, the person information output unit 122 outputs the generated person information to the human searching and tracking server 12 via the network 13 such as the Internet.

Through the foregoing processes, the images are captured for each monitoring area by each of the monitoring cameras 11, the person is detected from the captured images, and the person images are extracted. Then, the person information configured from the person image and the information regarding the global coordinates of the person in the person image, and the imaging time at which the image is captured is generated and supplied to the human searching and tracking server 12.

[Person Information Filtering Process]

Figure 20:
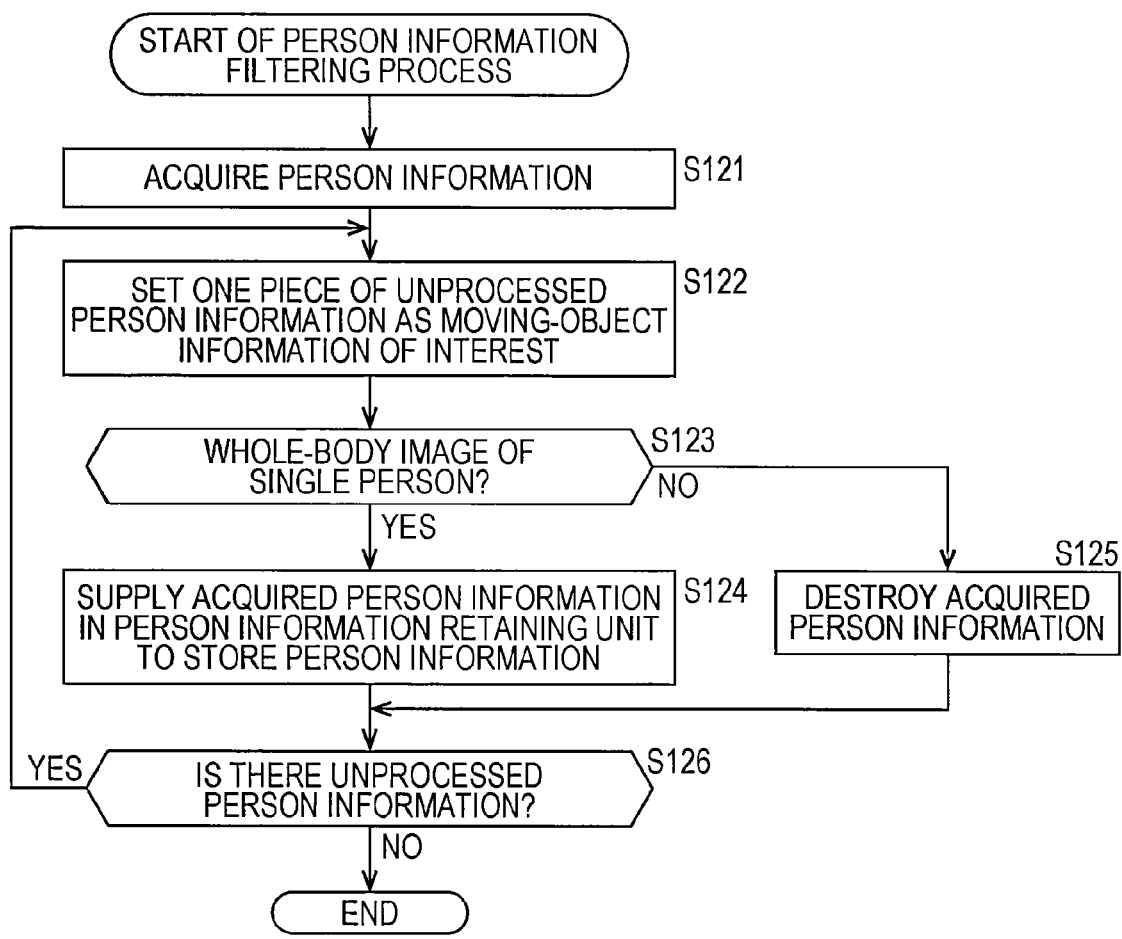
FIG. 20 is a flowchart illustrating a person information filtering process.

Next, a person information filtering process performed by the human searching and tracking server 12 will be described with reference to the flowchart of FIG. 20.

In step S121, the person information acquiring unit 151 acquires and stores the person information supplied sequentially from the monitoring servers 11 via the network 13.

In step S122, the person information filtering processing unit 152 sets one piece of unprocessed person information among the person information stored in the person information acquiring unit 151 as person information of interest which is a processing target.

In step S123, person information filtering processing unit 152 determines whether the person image is a single-person whole body image from the silhouette of the person image included in the person information of interest.

When it is determined in step S123 that the person image is the single-person whole body image from the silhouette of the person image included in the person information of interest, the process proceeds to step S124.

In step S124, the person information filtering processing unit 152 considers the person information of interest to be the person information suitable for the human searching and retains the person information of interest in the person information retaining unit 153.

Conversely, when it is determined in step S123 that the person image is not the single-person whole body image from the silhouette of the person image included in the person information of interest, the process proceeds to step S125.

In step S125, the person information filtering processing unit 152 considers the person information of interest not to be the person information suitable for the human searching and destroys the person information set as the acquired person information of interest.

In step S126, the person information filtering processing unit 152 determines whether there is unprocessed person information in the person information acquiring unit 151. When there is unprocessed person information, the process returns to step S122. That is, until there is no unprocessed person information, the processes of steps S122 to S126 are repeated. Conversely, when it is determined in step S126 that there is no unprocessed person information, the process ends.

That is, through the foregoing processes, only the person information in which the single-person whole body image is captured is considered to be the person image suitable for the human searching among the person information sequentially supplied from the monitoring cameras 11, and only the person information including such a person information is retained in the person information retaining unit 153 through the person information filtering process.

As a result, since only the person information including the person images suitable for the human searching is filtered through the person information filtering process and is retained in the person information retaining unit 153, it is possible to improve precision of the human searching. By destroying the person information unsuitable for the human searching, it is possible to rapidly perform a person information matching process which is necessary for the human searching and will be described below with reference to FIG. 21.

[Person Information Matching Process]

Next, a person information matching process performed by the human searching and tracking server 12 will be described with reference to the flowchart of FIG. 21. The flow of the person information matching process is similar to that of the moving-object information matching process described with reference to the flowchart of FIG. 11.

In step S151, the display image generating unit 157 displays a list of the person images in the person information retained in the person information retaining unit 153 on the display unit 158 and displays a display image to urge selection of the person image designating a searching target person.

In step S152, the person information likelihood calculation processing unit 154 determines whether the operation input unit 160 is operated and the person image designating the searching target person is selected. When the person image designating the searching target person is not selected, the process returns to step S151. That is, until the person image designating the searching target person is designated, the processes of steps S151 and S152 are repeated. Then, when the person image designating the searching target person is designated in step S152, the process proceeds to step S153.

In step S153, the person information likelihood calculation processing unit 154 sets, as criterion person information, the person information corresponding to the person image designated as the searching target in the person information retained in the person information retaining unit 153 and sets the other person information as unprocessed person information. At this time, the operation input recognizing unit 181 retains the person information corresponding to the person image designated as the searching target in the same-person information retaining unit 183 based on an operation signal of the operation input unit 160.

In step S154, the person information likelihood calculation processing unit 154 reads one piece of unprocessed person information retained in the person information retaining unit 153 and sets the read person information as person information of interest.

In step S155, the person information likelihood calculation processing unit 154 calculates a person image likelihood which is a likelihood between the person image included in the criterion person information and the person image included in the person information of interest and supplies the calculated person image likelihood together with the person information of interest to the person information likelihood threshold determining unit 155. That is, for example, the person information likelihood calculation processing unit 154 calculates the person image likelihood based on similarity which is higher as persons captured in the person images of the criterion person information and the person information of interest are more similar to each other.

In step S156, the person information likelihood threshold determining unit 155 determines whether the supplied person image likelihood is higher than a predetermined threshold. That is, the person information likelihood threshold determining unit 155 determines whether the persons of the person images of the criterion person information and the person information of interest accord with each other based on whether the person image likelihood is higher than the predetermined threshold. When it is considered in step S156 that the person image likelihood is higher than the predetermined threshold and the persons of the person images of the criterion person information and the person information of interest match each other (accord with each other), the process proceeds to step S157.

In step S157, the person information likelihood threshold determining unit 155 stores the person information of interest in the result storage unit 156. At this time, the person information likelihood calculation processing unit 154 sets the person information of interest retained in the person information retaining unit 153 as processed person information.

Conversely, when it is considered in step S156 that the person image likelihood is not higher than the predetermined threshold and the persons of the person images of the criterion person information and the person information of interest do not match each other (do not accord with each other), the process proceeds to step S159.

In step S159, the person information likelihood threshold determining unit 155 destroys the person information of interest. Then, the person information likelihood calculation processing unit 154 sets the person information of interest retained in the person information retaining unit 153 as processed person information.

In step S158, the person information likelihood calculation processing unit 154 determines whether unprocessed person information is retained in the person information retaining unit 153. For example, when unprocessed person information is retained, the process returns to step S154. That is, until there is no unprocessed person information in the person information retaining unit 153, the processes of steps S154 and S159 are repeated so that the matching process is repeated on the person images of all of the person information and the criterion person information.

When it is considered in step S158 that the unprocessed person information is considered not to be retained in the person information retaining unit 153, the process proceeds to step S160.

In step S160, the display image generating unit 157 generates a display image indicating a searching and tracking result based on the person information stored in the result storage unit 156.

In step S161, the display image generating unit 157 displays the display image indicating the searching and tracking result on the display unit 158.

In step S162, the matching amendment processing unit 159 determines whether one of the person images shown in the display image is selected based on information regarding the display image supplied from the display image generating unit 157 and an operation signal supplied from the operation input unit 160, the decision information is input, and the matching amendment process is instructed.

When one of the person images shown in the display image is selected and the decision information is input in step S162, the matching amendment process is considered to be instructed and the process proceeds to step S163.

In step S163, the matching amendment processing unit 159 performs the matching amendment process and displays a human searching and tracking result subjected to the amendment process. The matching amendment process will be described below in detail with reference to FIGS. 22 and 23.

In step S164, the matching amendment processing unit 159 determines whether ending is instructed. When ending is not instructed, the process returns to step S161. That is, the display screen indicating the human searching and tracking result is continuously displayed on the display unit 158. Conversely, when ending is instructed in step S164, the process ends.

By merely designating the person image of the searching target person through the foregoing person information matching process, it is possible to search for the person information which accords with the searching target person based on the person image and display the searching and tracking result indicating a movement path of the searching target person from the person information which is the searching result. The example has been described above in which when the searching target person is designated, the person is designated from the person image of the person information retained in the person information retaining unit 153. However, a searching target person may be designated by separately inputting an image other than the images captured by the monitoring cameras 11 and treating the image in the same way as the person image.

Figure 21:
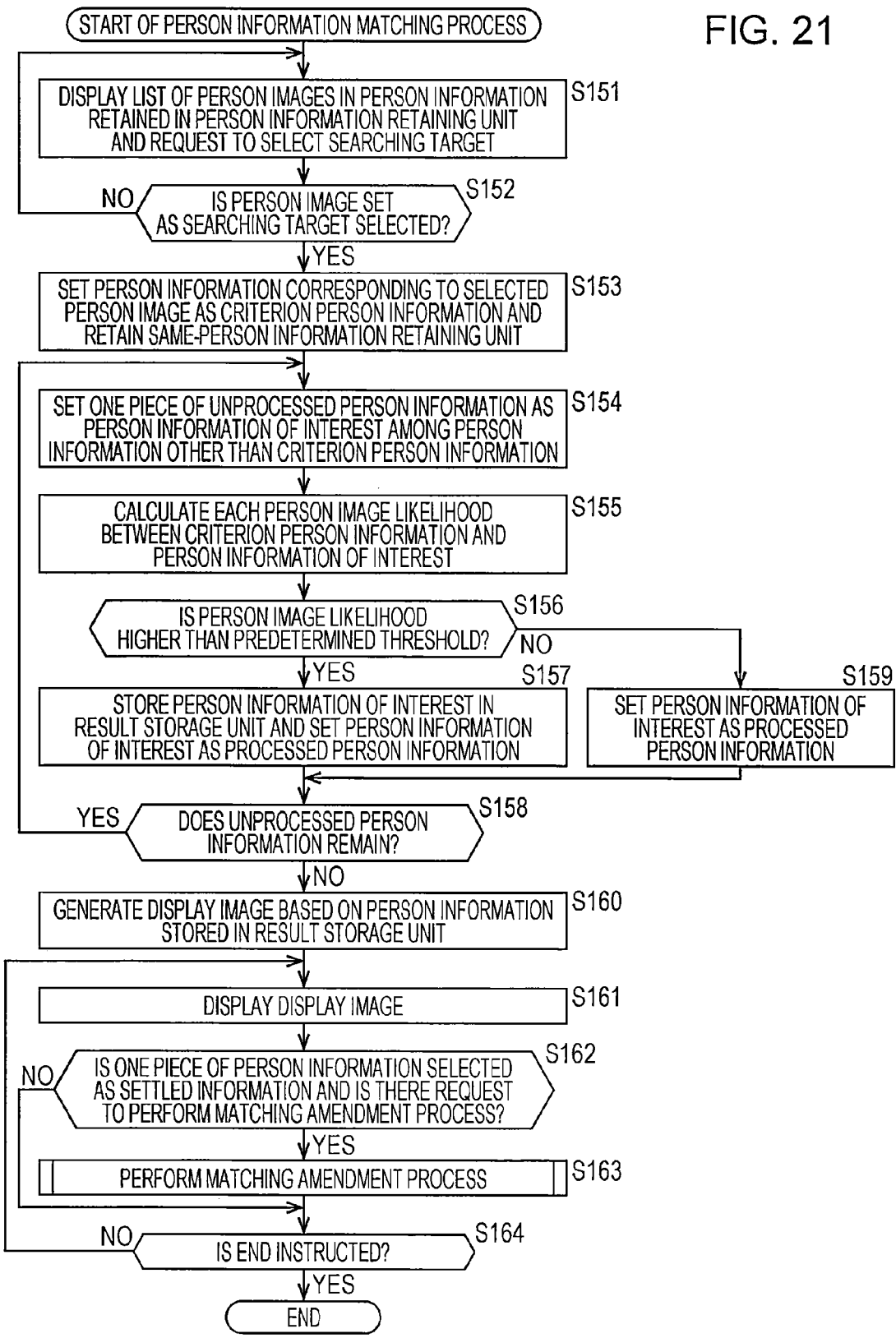
FIG. 21 is a flowchart illustrating a person information matching process.

[Matching Amendment Process of FIG. 21]

Figure 22:
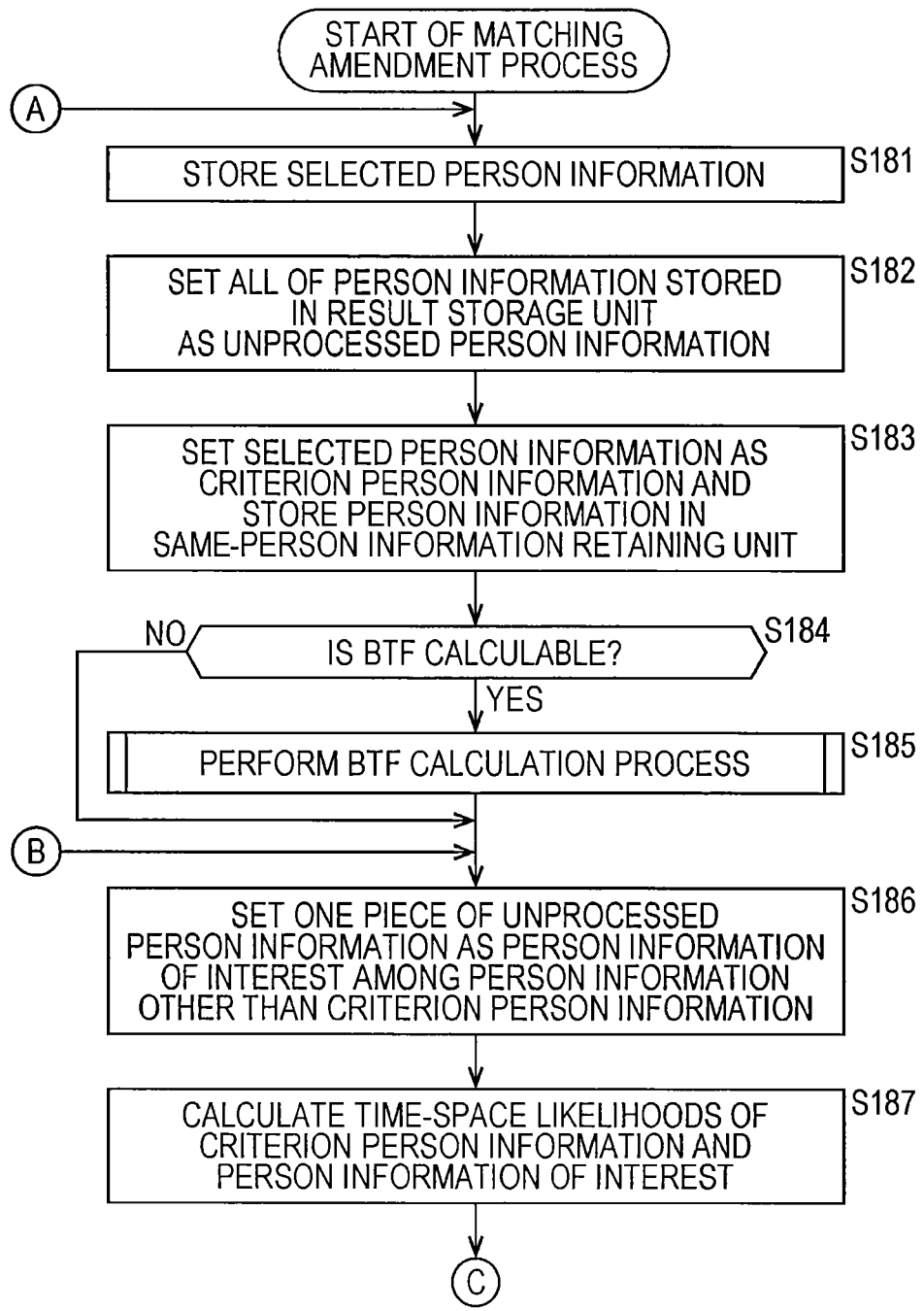
FIG. 22 is a flowchart illustrating a matching amendment process of FIG. 21.
Figure 23:
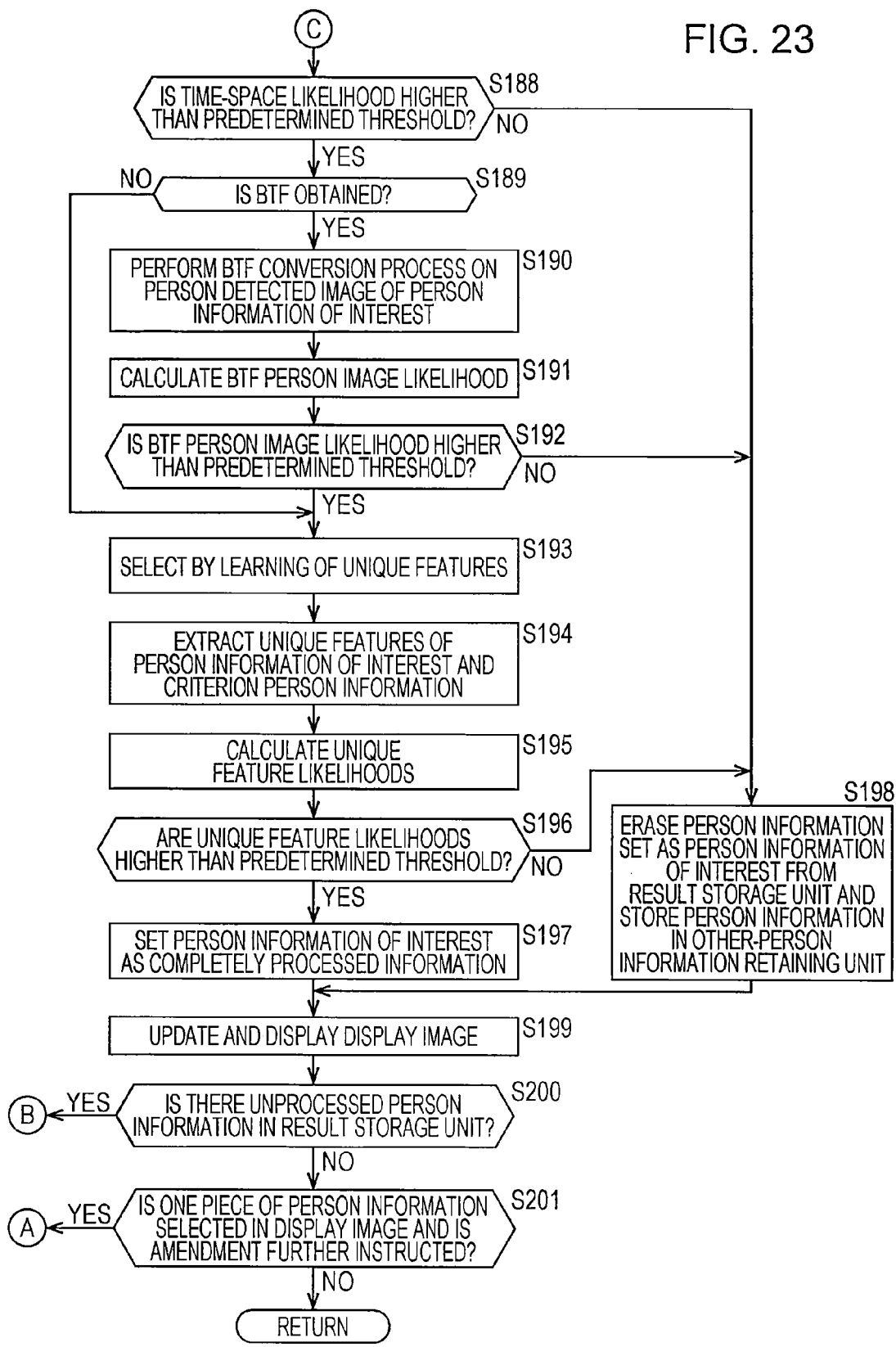
FIG. 23 is a flowchart illustrating the matching amendment process of FIG. 21.

Next, the matching amendment process of FIG. 21 performed by the human searching and tracking server 12 will be described with reference to the flowcharts of FIGS. 22 and 23.

In step S181, the matching amendment processing unit 159 stores information indicating that the person image for which the decision information is input by the operation input unit 160 is included, in association with the person information. Since it is decided that the person information for which the decision information is input is the person information appropriately extracted through the person image matching process, the person information is excluded from the searching target and is continuously stored in the result storage unit 153 in the subsequent processes. Simultaneously, the operation input recognizing unit 183 retains the person information for which the decision information is input in the same-person information retaining unit 183.

In step S182, the matching amendment processing unit 159 sets, as the unprocessed person information, all of the person information for which the decision information is not input among the person information stored in the result storage unit 156.

In step S183, the matching amendment processing unit 159 sets, as the criterion person information, the person information for which the decision information is recently input among the person information stored in the result storage unit 156.

In step S184, the BTF calculating unit 191 of the BTF time-space processing unit 187 determines whether the BTF can be calculated. In step S184, a first BTF-calculable condition is a case in which there is the person information including other person image which has the camera ID different from the camera ID included in the criterion person information and for which the decision information is input. A second BTF-calculable condition is a case in which there are two or more person images for which the decision information is input and the moving-object images are captured by the different monitoring cameras 11 with different camera IDs. Accordingly, based on whether the person information satisfying one of the foregoing two conditions is present in the result storage unit 156, the BTF calculating unit 92 determines whether the BTF can be calculated. When the BTF can be calculated in step S184, the BTF calculating unit 191 calculates the BTF by performing a BTF calculation process using information regarding the pixel values between the person images for which the decision information is input despite of different camera IDs or the person images included in the criterion person information in step S185. The BTF is a function indicating a mutual correspondence relation between colors of the person images including the same subject imaged by the monitoring cameras 11 specified by two different camera IDs. Accordingly, when the BTF is calculated, color correction can be performed by performing color conversion on one of the person images captured by two monitoring cameras 11 with different camera IDs, using the BTF, irrespective of whether there is the decision information. Through the color correction process, it is possible to correct a change in color occurring due to a difference in imaging environment light of the monitoring area between the different monitoring cameras 11 or an individual difference or the like of an image sensor of the imaging unit 31. As a result, the person images captured by two different monitoring cameras 11 are subjected to color correction as if the person images are captured by the same monitoring camera 11. Therefore, it is possible to calculate the person image likelihood between the person images more accurately.

On the other hand, for example, when the person image for which the decision information is input is captured by one kind of monitoring camera 11 in step S184, the BTF is considered not to be calculable and the process of step S185 is skipped.

In step S186, the time-space likelihood calculating unit 192 sets, as the person information of interest, one piece of the unprocessed person information among the person information which is stored in the result storage unit 156 and is the person information excluding the criterion person information.

In step S187, the time-space likelihood calculating unit 192 calculates a time-space likelihood based on information regarding the global coordinates and the imaging time included in the criterion person information and the person information of interest. More specifically, for example, the time-space likelihood calculating unit 192 obtains a movement distance from a difference between the global coordinates included in the criterion person information and the global coordinates included in the person information of interest and calculates the time-space likelihood of the person information based on a ratio of a time between the imaging times of the person information to an average necessary time taken to travel the movement distance at an average human movement speed.

In step S188 (FIG. 23), the time-space likelihood threshold determining unit 94 determines whether the calculated time-space likelihood is higher than a predetermined threshold. For example, when a display image indicating the human searching and tracking result is a display image illustrated in the upper portion of FIG. 24, as indicated by a hand H1, a person image PA corresponding to a plot A is selected by the operation input unit 160. When the decision information is input, the person information corresponding to the plot A becomes the criterion person information. In the case of the display image of FIG. 25, the imaging times are 1:00:00, 1:00:05, 1:00:10. 1:00:15, 1:00:13, 1:00:14, and 1:00:05 in the person information corresponding to the plots A to G, respectively. The plots A and B are person information corresponding to the person images PA and PB captured by the same monitoring camera 11 that images an imaging area CamA indicated by a triangle formed by the same dotted line. Likewise, the plots C to F are person information corresponding to the person images PC to PF captured by the same monitoring camera 11 that images an imaging area CamB indicated by a triangle formed by a dotted line. Further, the plot G is person information corresponding to the person image PE captured by the monitoring camera 11 that images an imaging area CamC indicated by a triangle formed by a dotted line.

In this case, when the person information corresponding to the plot B is person information of interest and a distance between the plots A and B is assumed to be a distance AB, the ratio of the time between the imaging times of the person information to the average necessary time taken to travel the movement distance at the average human movement speed is 5/(AB/w). Here, w indicates the average human movement speed. For example, when the distance AB is 5 m and the average human movement speed is 1 m/s, the ratio is 1 and the time-space likelihood is the highest value. Likewise, when the person information corresponding to the plots C and D is the person information of interest and the distances between the plots A and C, the plots A and D, the plots A and E, and the plots A and F are assumed to be a distance AC, a distance AD, a distance AE, and a distance AF, the ratios of the times between the imaging times of the person information to the average necessary time taken to travel the movement distances at the average human movement speed are 10/(AC/w), 15/(AD/w), 14/(AE/w), and 13/(AF/w), respectively. For example, when the distances AC, AD, AE, and AF are 10 m, 15 m, 14 m, and 13 m, respectively, and the average human movement speed is 1 m/s, the ratios are all 1 and the time-space likelihood is the highest value.

Thus, when the time-space likelihood is the highest value in step S188, the time-space likelihood threshold determining unit 193 considers the time-space likelihood to be higher a predetermined threshold and the process proceeds to step S189.

On the other hand, when the person information corresponding to the plot G is the person information of interest and the distance between the plots A and G is assumed to be a distance AG, the ratio of the time between the imaging times of the person information to the average necessary time taken to travel the movement distance at the average human movement speed is 5/(AE/w). That is, for example, when the distance AG is 25 m and the average human movement speed is 1 m/s, it takes about 5 seconds to travel 25 m. Therefore, the ratio is 0.2 and the time-space likelihood is a low value. When the time-space likelihood is low in step S188, the time-space likelihood threshold determining unit 193 considers the time-space likelihood to be lower than the predetermined threshold and the process proceeds to step S198.

Figure 24:
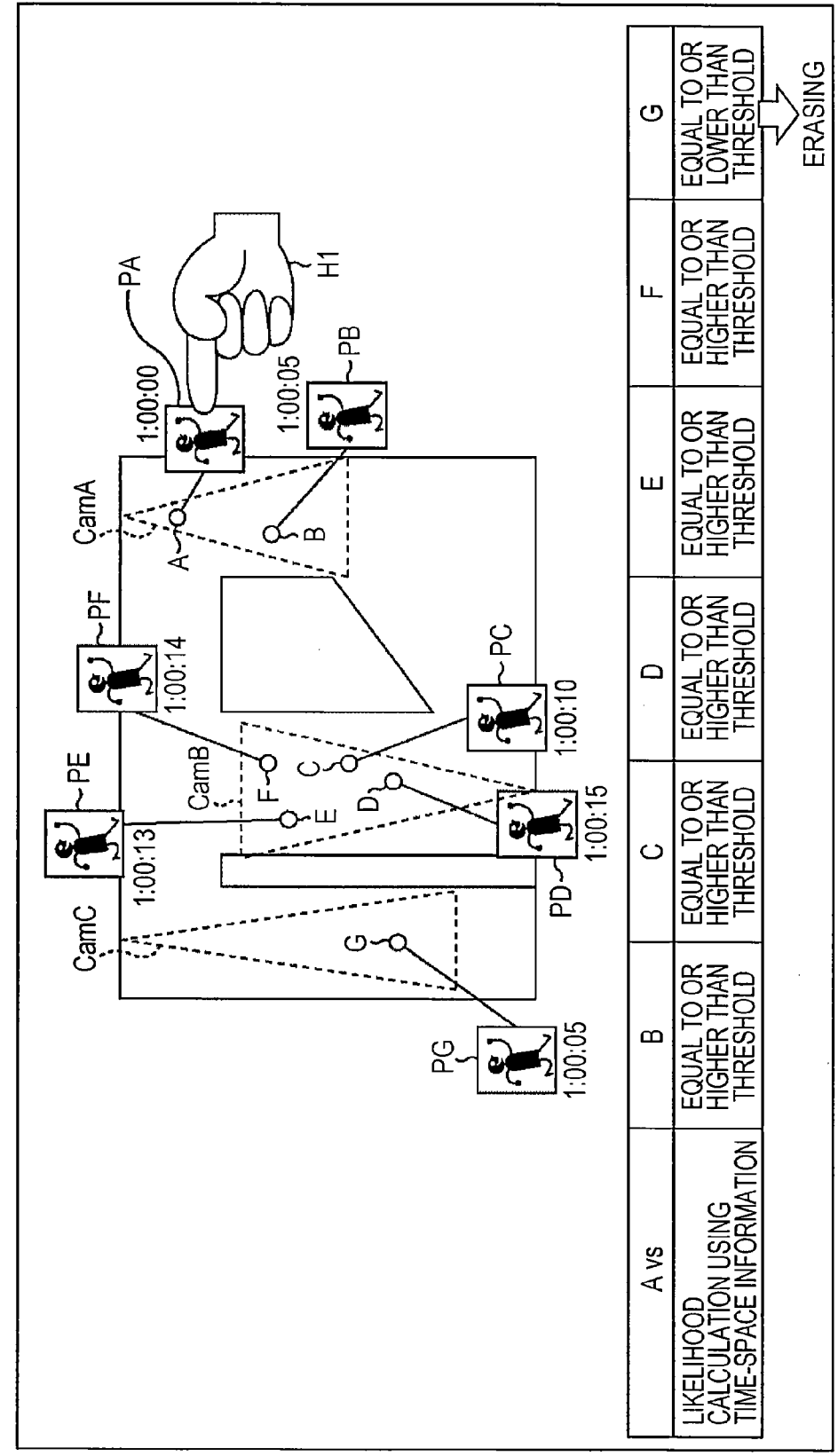
FIG. 24 is a diagram illustrating the matching amendment process of FIG. 21.

In step S198, the matching amendment processing unit 159 erases the person information of interest from the result storage unit 156 and retains the person information of interest in the other-person information retaining unit 182. That is, when the image indicating the searching and tracking result shown in the upper portion of FIG. 24 is displayed and the decision information is input in the person image PA corresponding to the plot A, the person information of the plot G in which the same person may not be present is erased, as shown in the table shown below the display image of FIG. 24 based on the time-space information. Since the searching and tracking result erroneously detected in the person information matching process using only the person images can be excluded through the processes, it is possible to realize the human searching and tracking of a searching target person with higher precision.

In step S189, the BTF image processing unit 194 determines whether the BTF is obtained. For example, when the BTF is not obtained, the process proceeds to step S197.

In step S197, the matching amendment processing unit 159 sets, as processing completion, the person information which is the person information of interest among the person information stored in the result storage unit 156.

Figure 25:
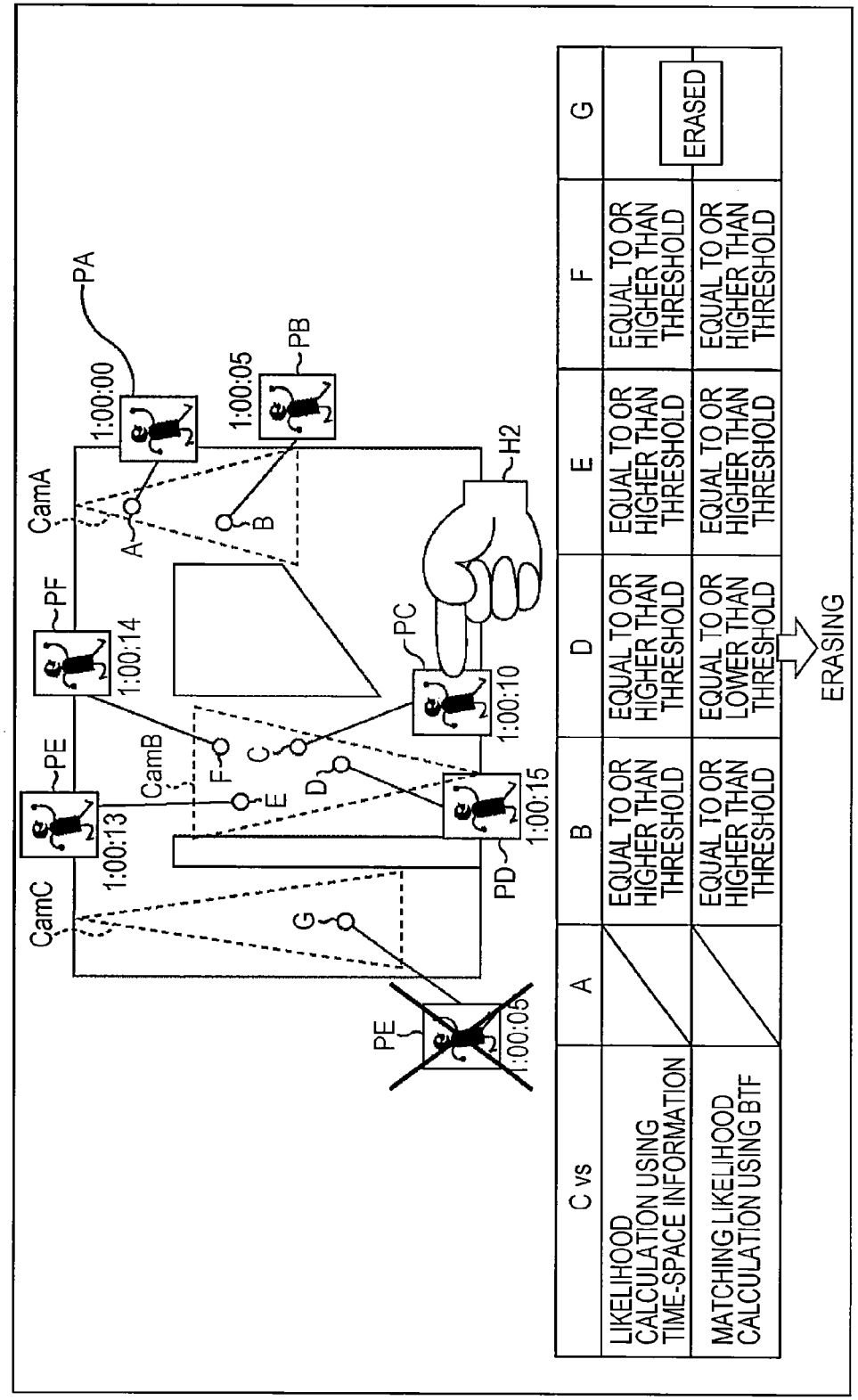
FIG. 25 is a diagram illustrating the matching amendment process of FIG. 21.

In step S199, the display image generating unit 157 reflects an update result of the result storage unit 156, updates and generates the image indicating the searching and tracking result, and displays the image on the display unit 158. That is, for example, as shown in the display screen in the upper portion of FIG. 25, the display corresponding to the plot G is erased and displayed. In FIG. 25, to indicate that the display is erased, a sign of a cross mark is expressed. However, in practice, the display itself is erased.

In step S200, the time-space likelihood calculating unit 192 determines whether there is unprocessed person information among the person information that is stored in the result storage unit 156 and is the person information excluding the criterion person information. When there is unprocessed person information, the process returns to step S186 (FIG. 22). That is, the processes of steps S186 to S200 are repeated as long as there is unprocessed person information. Then, when it is considered in step S200 that there is no unprocessed person information, the process proceeds to step S201.

In step S201, the operation input recognizing unit 181 determines whether the matching amendment process is additionally instructed when the operation input unit 160 is operated, the person image corresponding to one piece of person information is selected, and the decision information is input. For example, as indicated by a hand H2 of FIG. 25, when the operation input unit 160 is operated, the person image PC corresponding to the plot C is selected, and the decision information is input in step S201, the process returns to step S181 (FIG. 22) and the matching amendment process is performed additionally.

At this time, in step S184, the BTF can be considered to be calculable since the person images for which the decision information is input are two person images PA and PC and the camera IDs identifying the monitoring cameras 11 capturing the person images are different from each other.

Accordingly, in this case, in step S185, the BTF calculating unit 191 calculates the BTF using the person image PC of the person information corresponding to the plot C and the person image PA of the person information corresponding to the plot A. In this case, since the criterion person information is the person information of the person image PC corresponding to the plot C, the obtained BTF is assumed to be a function used to correct a change in the color of the person image PA captured by the monitoring camera 11 imaging the imaging area CamA using the color of the person image PC captured by the monitoring camera 11 imaging the imaging area CamB as a criterion.

As a result, when the person information of interest is the person information corresponding to the person image PB captured in the imaging area CamA, the BTF is considered to be obtained in step S189, and thus the process proceeds to step S190.

In step S190, the BTF image processing unit 194 performs color correction by converting the color of the person image of the person information of interest using the calculated BTF. That is, in the present case, the BTF image processing unit 194 performs the color correction to correspond to the color of the person image PC of the criterion person information captured by the monitoring camera 11 imaging the imaging area CamB by performing the BTF on the person image PB in FIG. 25.

In step S191, the BTF image likelihood calculating unit 196 calculates a BTF image likelihood which is a likelihood between the person image of the criterion person information and the person image, which is the person image of the person information of interest and is subjected to the color conversion by the BTF. The BTF image likelihood is basically the same as the likelihood in the person information likelihood calculation processing unit 154.

In step S192, the BTF image likelihood threshold determining unit 97 determines whether the person image of the criterion person information matches the person information of the person information of interest subjected to the color conversion by the BTF based on whether the calculated BTF image likelihood is higher than a predetermined threshold. When the BTF image likelihood is higher than the predetermined threshold in step S192, the process proceeds to step S193.

Conversely, when the BTF image likelihood is lower than the predetermined threshold in step S192, the process proceeds to step S198. That is, in this case, through the process of step S198, the person information of the person information of interest is erased from the result storage unit 156 and is retained in the other-person information retaining unit 182.

That is, as shown in a table in the lower portion of FIG. 25, when the decision information is input to the person image PA corresponding to the plot A and the decision information is subsequently input to the person image PC corresponding to the plot C, the BTF is obtained which is used to correct the color of the image captured by the monitoring camera 11 imaging the imaging area CamA using the color of the image captured by the monitoring camera 11 imaging the imaging area CamB as a criterion. Then, the person information corresponding to the plot B and including the person image for which the time-space likelihood is higher than the predetermined threshold and the BTF image likelihood is higher than the predetermined threshold remains in the result storage unit 156. On the other hand, the person information corresponding to the plot D and including the person image for which the time-space likelihood is higher than the predetermined threshold and the BTF image likelihood is lower than the predetermined threshold is erased from the result storage unit 156 and is retained in the other-person information retaining unit 182. The reason why diagonal lines are drawn for the plot A in the table in the lower portion of FIG. 25 is that the person information is the person information for which the decision information is already input, and therefore is not a processing target.

In step S193, the unique feature selecting unit 184 selects a unique feature by the learning based on the person information stored in the other-person information storage unit 182 and the person information stored in the same-person information storage unit 183.

Figure 18:
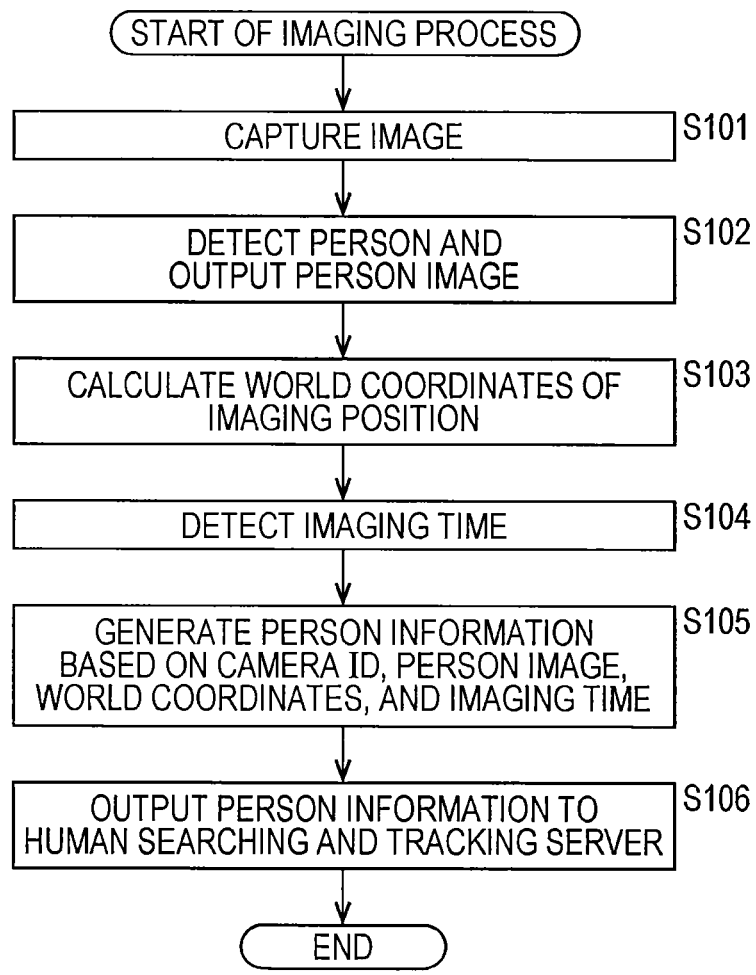
FIG. 18 is a flowchart illustrating an imaging process by the monitoring camera in FIG. 16.
Figure 26:
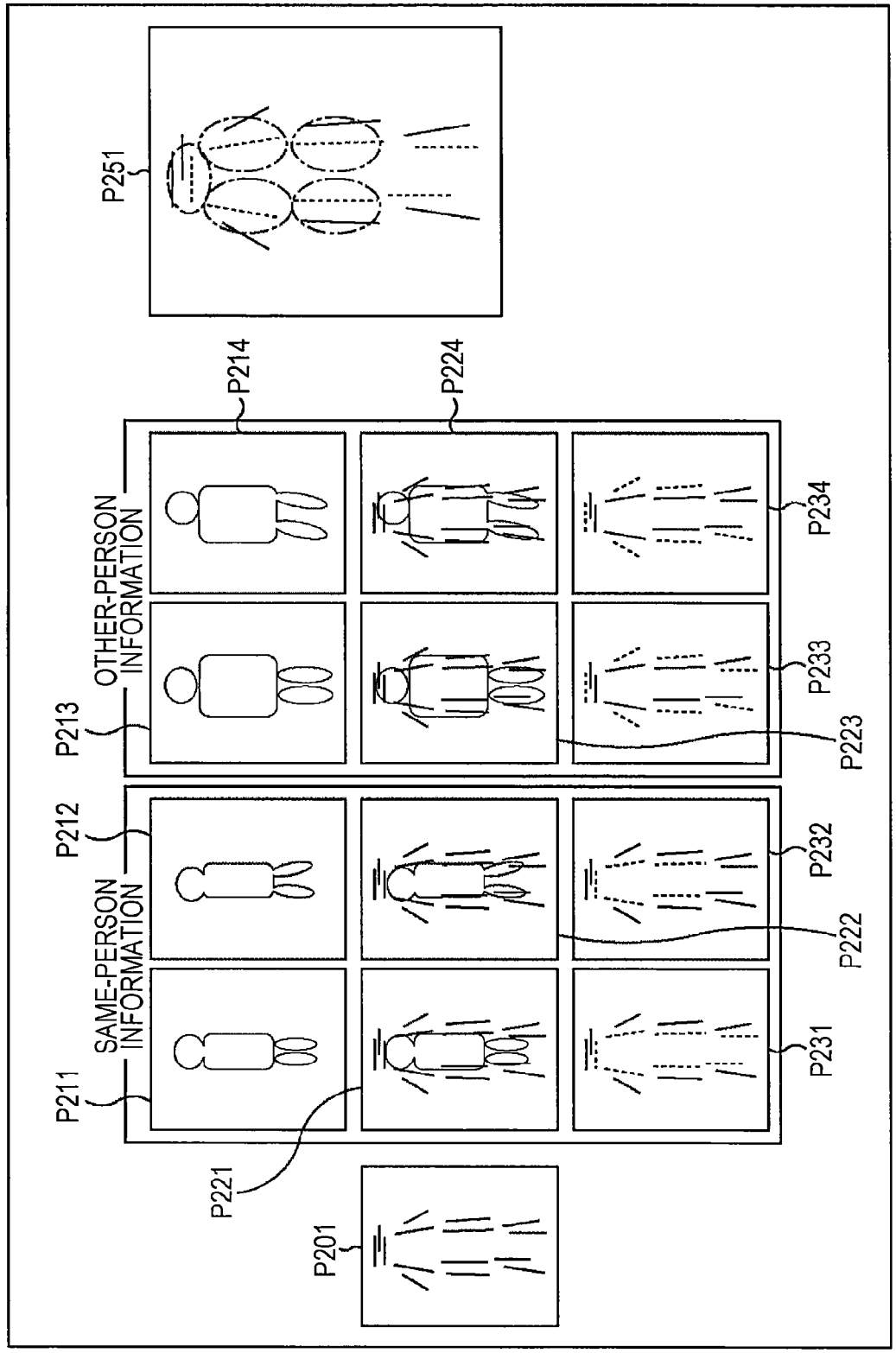
FIG. 26 is a diagram illustrating selection by learning of unique features.

That is, when the person is detected by the person detecting unit 121 in the process of step S102 of FIG. 18, the person image is detected using the feature amount using HOG and when the feature amount formed from various kinds of line segments shown in an image P201 of FIG. 26 is used for the detection of the person image, the feature amount in any one of the images P211 to P214 in FIG. 26 accords with the feature amount of one of the line segments, as shown in images P221 to P224, and therefore it is detected that there is the person.

Here, the unique feature selecting unit 184 analyzes information regarding the feature amount shown by the line segment by the learning, selects the feature amount in which a probability of the persons being suitable as the same person is high and a probability of the persons being suitable as another person is low as a unique feature, and supplies the selection result to the unique feature calculating unit 185.

That is, in regard to the person images included in the person information for which the decision information is input as the same person of the images P211 and P212 in FIG. 26, feature amounts shown by the line segments indicated by the dotted lines of the images P221 and P222 are specified by the learning as the feature amounts in which the probability of the persons being suitable as the same person is high. In regard to the person images included in the person information considered to be other-person information of the images P213 and P214, feature amounts surrounded by line segments indicated by solid lines in the images P223 and P224 are specified by the learning as feature amounts in which the probability of persons being suitable for other persons rather than the same person is low. Accordingly, in FIG. 26, a feature amount surrounded by a one-dot chain line ellipse and formed by line segments in an image P251 is selected as a useful unique feature satisfying any condition by the learning.

The learning is repeated when new person information is registered in the same-person information retaining unit 183 and the other-person information retaining unit 182. Therefore, since a unique feature with higher precision is selected as the unique feature, the human tracking precision is gradually improved whenever the learning is repeated.

In regard to the learning, algorithms described in, for example, "A decision-theoretic generalization of on-line learning and an application to boosting, Unpublished manuscript available electronically by Yoav Freund and Robert E. Schapir" and "Additive logistic regression by: J. Friedman, T. Hastie, and R. Tibshiran in a statistical view of boosting, Annals of statistics, 38: 337 to 374, 2000" may be used.

In step S194, the unique feature likelihood calculating unit 185 extracts feature amounts selected as unique features from the person image of the criterion person information and the person image of the person information of interest.

In step S195, the unique feature likelihood calculating unit 185 calculates a unique feature likelihood using the feature amounts extracted as the unique features from the person image of the criterion person information and the person image of the person information of interest and supplies the calculation result to the unique feature likelihood threshold determining unit 186. That is, for example, the unique feature likelihood calculating unit 185 calculates, as unique feature likelihoods, mutual similarity or the like based on the unique features from the person image of the criterion person information and the person image of the person information of interest.

In step S196, the unique feature likelihood threshold determining unit 186 determines whether the calculated unique feature likelihoods are higher than a predetermined threshold and are mutually similar to each other. When it is determined in step s196 that the unique feature likelihoods are not higher than the predetermined threshold and are not similar to each other, the process proceeds to step S198.

That is, in this case through the process of step S198, the person information of the person information of interest is erased from the result storage unit 156 and is retained in the other-person information retaining unit 182.

Conversely, when it is determined in step S196 that the unique feature likelihoods are higher than the predetermined threshold, the process proceeds to step S197.

Accordingly, in this case, the person information of the person information of interest remains in the result storage unit 156.

Figure 27:
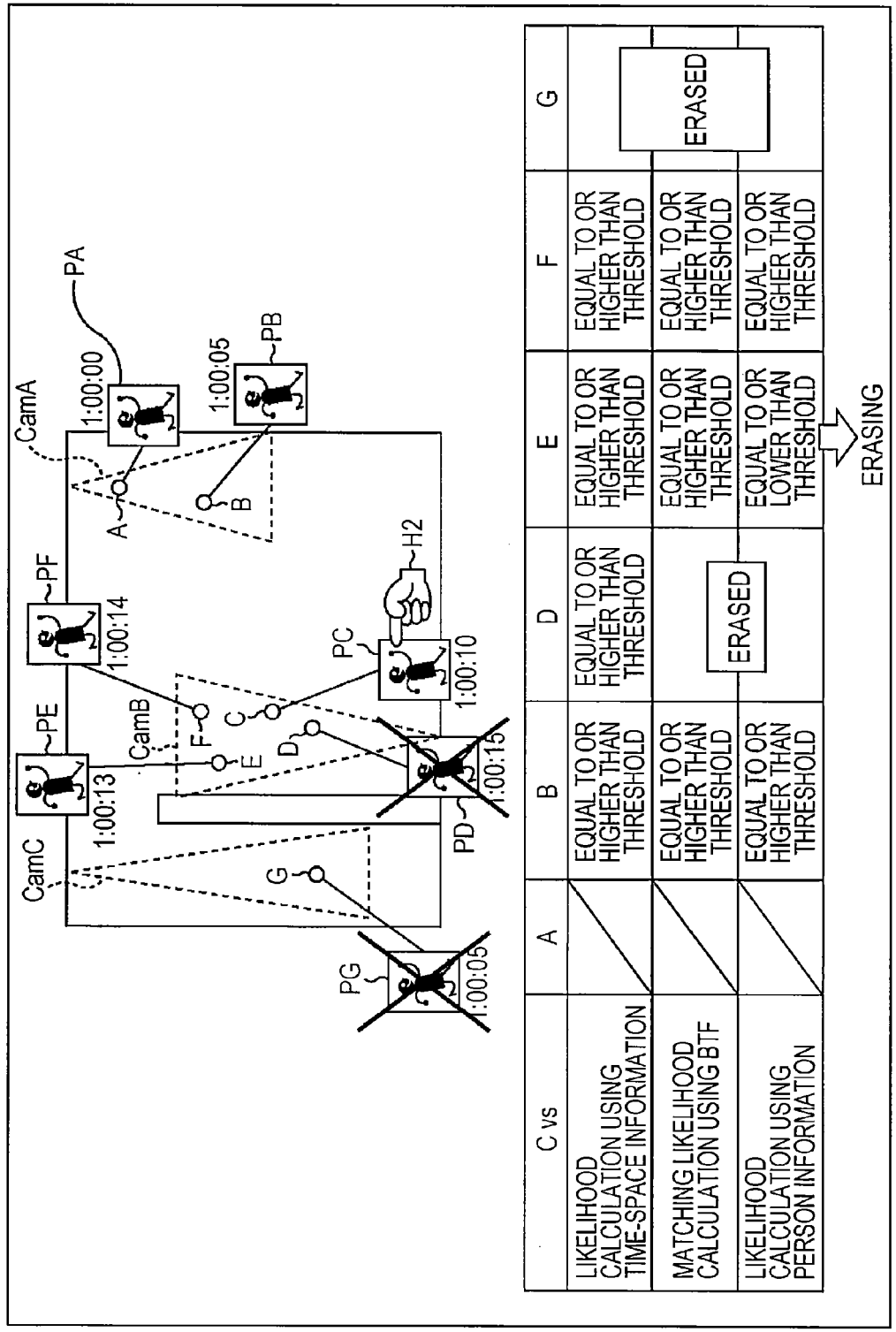
FIG. 27 is a diagram illustrating the matching amendment process of FIG. 21.
Figure 28:
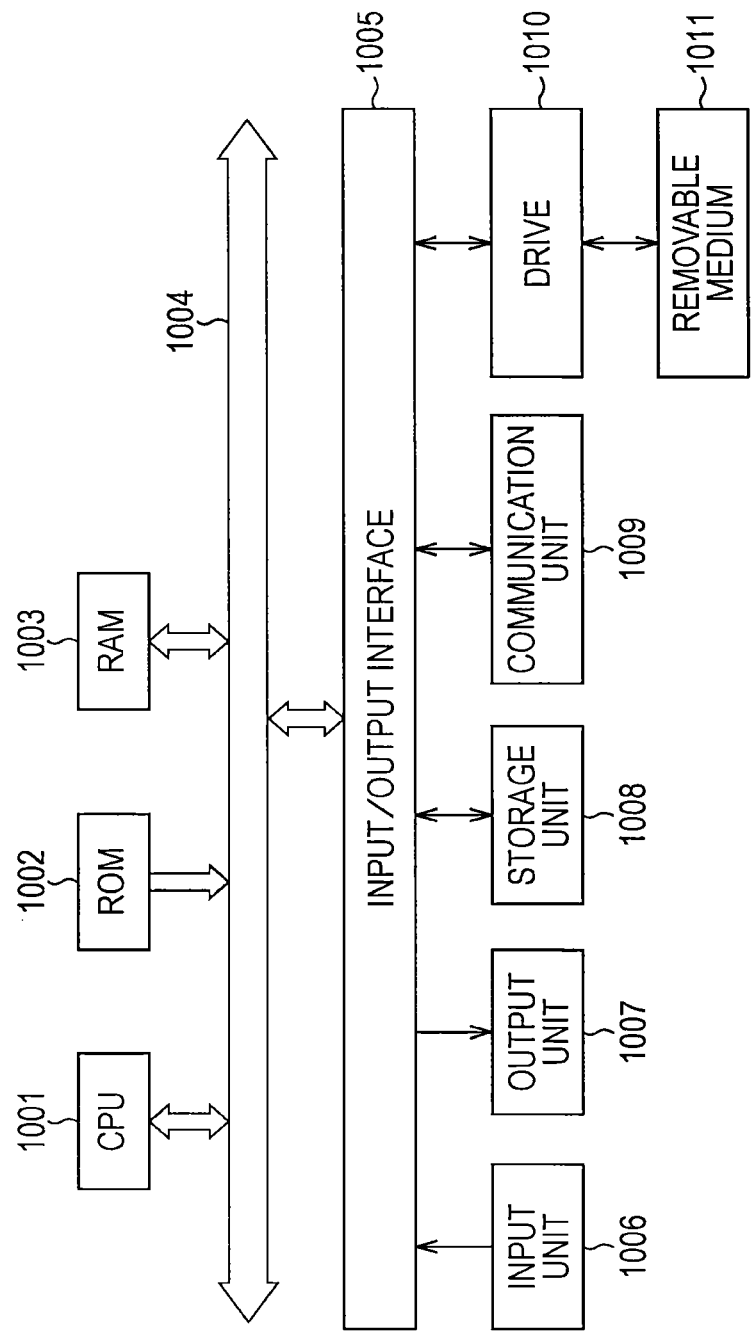
FIG. 28 is a diagram illustrating an example of the configuration of a general personal computer.

That is, as shown in a table in the lower portion of FIG. 27, when the decision information is input to the person image PA corresponding to the plot A and the decision information is subsequently input to the person image PC corresponding to the plot C, the BTF is obtained which is used to correct the color of the image captured by the monitoring camera 11 imaging the imaging area CamA using the color of the image captured by the monitoring camera 11 imaging the imaging area CamB as a criterion. Then, the person information corresponding to the plots B, D, and E and including the person images for which the time-space likelihood is higher than the predetermined threshold and the BTF image likelihood is higher than the predetermined threshold remains in the result storage unit 156. On the other hand, the person information corresponding to the plot D and including the person image for which the time-space likelihood is higher than the predetermined threshold and the BTF image likelihood is lower than the predetermined threshold is erased from the result storage unit 156 and is retained in the other-person information retaining unit 182. Further, when the unique feature likelihood is obtained using the person information, the plot D in which the unique feature likelihood is equal to or less than the threshold is erased and the plots B and F finally remain in the result storage unit 156.

That is, the matching correction process is repeatedly performed again based on the decision information when the user inputs the decision information in the foregoing matching amendment process. Therefore, as the decision information is input, the precision of the searching and tracking result can be improved. When the decision information is input for the person images captured by the different monitoring cameras 11, the BTF can be obtained. Therefore, since the matching amendment process is performed based on the BTF image likelihood corresponding to the change in the color between the monitoring cameras 11 after the consideration of the time-space likelihood, it is possible to perform the human searching and tracking with higher precision.

Since the BTF of the person image of the criterion person information and the person image of the person information of interest and the BTF corresponding to only two monitoring cameras 11 may be calculated, a processing load for the calculation of the BTF is reduced, thereby improving a processing speed related to the calculation of the BTF.

In addition to the process using the BTF, the matching amendment process is repeated based on the unique feature likelihood by the unique feature obtained by the learning, and thus the precision of the unique feature is improved. As a result, it is possible to realize the human searching and tracking with higher precision.

The example has been described above in which the matching amendment process is repeated by designating a searching target person, searching for the person information regarding the searching target person, displaying the display image indicating the human searching and tracking result from the searching result, and subsequently inputting the decision information. However, by variously changing a searching target person, the present technology can be applied to various uses.

For example, by setting a strange person or a suspicious person as a searching target person, a movement history of the strange person or the suspicious person can be confirmed from a human searching and tracking result and it can be practically confirmed whether there are suspicious points. More specifically, for example, when a suspicious person who is not a company member is found inside a company, a movement history of the outside suspicious person can be confirmed by setting the outside suspicious person as a searching target person. Therefore, for example, when the outside suspicious person invades into a place where nobody can enter without carrying a staff identity card, it can be confirmed that the outside suspicious person invades into the place. Therefore, the present technology can be used in a so-called security system.

For example, by setting a plurality of users who are searching target persons on floors of stores as searching target persons, movement paths that the users moving on each floor follow in each floor can be confirmed from a human searching and tracking result. Therefore, this information can be applied to the stores. More specifically, for example, since movement histories of users within floors of customers can be confirmed and layouts of products can be changed optimally based on the movement histories, the present technology can be used in a so-called marketing research system.

Through the foregoing processes, it is possible to realize the human searching and tracking in the monitoring areas by the plurality of monitoring cameras with high precision.

The above-described series of processes can be executed by hardware and can also be executed by software. When the series of processes are executed by software, a program for the software is installed from a recording medium to, for example, a computer embedded in dedicated hardware or a general personal computer capable of executing various functions by installing various programs.

FIG. 16 illustrates an example of the configuration of a general personal computer. The personal computer includes a CPU (Central Processing Unit) 1001. An input/output interface 1005 is connected to the CPU 1001 via a bus 1004. A ROM (Read-Only Memory) 1002 and a RAM (Random Access Memory) 1003 are connected to the bus 1004.

An input unit 1006 configured by an input device such as a keyboard or a mouse used for a user to input an operation command, an output unit 1007 outputting an image of a processing operation screen or a processing result to a display device, a storage unit 1008 configured by a hard disk drive or the like storing a program or various kinds of data, and a communication unit 1009 configured by a LAN (Local Area Network) adapter or the like and performing a communication process via a network such as the Internet are connected to the input/output interface 1005. A drive 1010 is also connected which reads and writes data from and on a removable medium 1011 such as a magnetic disk (including a flexible disk), an optical disc (including a CD-ROM (Compact Disc-Read Only Memory)), a DVD (Digital Versatile Disc), a magneto-optical disc (including an MD (Mini Disc)), or a semiconductor memory.

The CPU 1001 executes various kinds of processes according to a program stored in the ROM 1002 and a program read from the removable medium 1011 such as a magnetic disk, an optical disc, a magneto-optical disc, or a semiconductor memory, installed in the storage unit 1008, and loaded from the storage unit 1008 to the RAM 1003. The RAM 1003 appropriately stores data or the like necessary for the CPU 1001 to execute various processes.

In the computer having the above-described configuration, for example, the CPU 1001 executes the above-described series of processes by loading a program stored in the storage unit 1008 on the RAM 1003 via the input/output interface 1005 and the bus 1004 and executing the program.

A program executed by the computer (CPU 1001) can be recorded on the removable medium 1001 which is, for example, a packet medium to be provided. The program can also be provided via a wired or wireless transmission medium such as a local area network, the Internet, or digital satellite broadcasting.

In the computer, a program can be installed to the storage unit 1008 via the input/output interface 1005 by mounting the removable medium 1001 on the drive 1010. A program can be received by the communication unit 1009 via a wired or wireless transmission medium and can be installed to the storage unit 1008. Further, a program can be installed in advance to the ROM 1002 or the storage unit 1008.

A program executed by the computer may be a program that performs processes chronologically in the order described in the present specification or may be a program that performs processes in parallel or at necessary timings such as a calling time.

In the present specification, a system means a set of a plurality of constituent elements (devices, modules (components), and the like), and all of the constituent elements may be present or may not be present in the same casing. Accordingly, a plurality of apparatuses received in separate casings and connected to each other via a network and one apparatus of which a plurality of modules are received in one casing are both a system.

Embodiments of the present technology are not limited to the above-described embodiment, and the present technology can be modified in various ways within the scope of the present technology without departing from the gist of the present technology.

For example, the present technology can be realized as a configuration of cloud computing in which one function is distributed to a plurality of apparatuses and is processed in a cooperative manner via a network.

The steps described in the above-described flowcharts can be performed by one apparatus and can also be distributed and performed in a plurality of apparatuses.

When a plurality of processes are included in one step, the plurality of processes included in the one step can be performed by one apparatus and can also be distributed and performed in a plurality of apparatuses.

The present technology can also be realized as follows.

(1) An information processing apparatus includes: a plurality of imaging units that each capture an image, detect a moving object, extract a moving-object image configured from the image of the detected moving object, detect space position coordinates of the moving object based on the moving-object image, and output the moving-object image and moving-object information including the space position coordinates of the moving object and an imaging time at which the image is captured; a moving-object image likelihood calculating unit that calculates a moving-object image likelihood which is a likelihood of a moving-object image included in moving-object information other than searching target moving-object information, which is moving-object information including the moving-object image of the moving object which is a searching target, with respect to a moving-object image of the searching contrast moving-object information; a moving-object image threshold determining unit that determines whether each moving-object image likelihood calculated by the moving-object image likelihood calculating unit is greater than a predetermined threshold and searches for the moving-object information of the moving-object image likelihood greater than the predetermined threshold as searching result moving-object information, which is moving-object information including the moving-object image of the same moving object as the moving object of the moving-object image of the searching target moving-object information; a searching result moving-object information storage unit that stores the moving-object information searched for as the searching result moving-object information by the moving-object image threshold determining unit; an operation input unit that receives an input of decision information used for a user to decide the searching target moving-object information among the moving-object information stored as the searching result moving-object information in the result moving-object information storage unit based on the moving-object image; a time-space likelihood calculating unit that calculates a time-space likelihood which is configured from a likelihood based on the space position coordinates and the imaging time and is a likelihood of the moving-object information other than decision moving-object information, which is moving-object information for which the decision information is input, with respect to the decision moving-object information for which the decision information is input, among the moving-object information stored as the searching result moving-object information in the result moving-object information storage unit; and a time-space likelihood threshold determining unit that determines whether each time-space likelihood calculated by the time-space likelihood calculating unit is less than a predetermined threshold and erases the moving-object information of the time-space likelihood less than the predetermined threshold from the searching result moving-object information storage unit.

(2) In the information processing apparatus described in (1), after the time-space likelihood threshold determining unit determines whether each time-space likelihood calculated by the time-space likelihood calculating unit is less than the predetermined threshold, the operation input unit may receive an input of decision information used for the user to newly decide the searching target moving-object information among the moving-object information stored as the searching result moving-object information in the result moving-object information storage unit based on the moving-object image. The time-space likelihood calculating unit may newly calculate a time-space likelihood which is configured from the likelihood based on the space position coordinates and the imaging time and which is a likelihood of the moving-object information other than the decision moving-object information with respect to the decision moving-object information for which the decision information is newly input, among the moving-object information stored as the searching result moving-object information in the result moving-object information storage unit. The time-space likelihood threshold determining unit may determine whether each time-space likelihood newly calculated by the time-space likelihood calculating unit is less than the predetermined threshold and erase the moving-object information of the time-space likelihood less than the predetermined threshold from the searching result moving-object information storage unit. The operation input unit, the time-space likelihood calculating unit, and the time-space likelihood threshold determining unit may repeat the same processes whenever decision information is newly input by the operation input unit.

(3) In the information processing apparatus described in (2), the moving-object information may further include an ID identifying one of the plurality of imaging units capturing the moving-object image to be included. The information processing apparatus may further include: a BTF calculating unit that calculates a BTF (Brightness Transfer Function) of correcting a change in a color between the imaging units based on the two moving-object images with the different IDs identifying the plurality of imaging units each capturing the moving-object image in the searching target moving-object information, which is the moving-object information including the moving-object image of the moving object which is the searching target, and the decision moving-object information for which the input of the decision information used to decide the searching target moving-object information is received; a BTF processing unit that performs the BTF on the moving-object image of the moving-object information including the moving-object image captured by the imaging unit with the ID for which the BTF is obtained, among the moving-object information other than the decision moving-object information among the moving-object information stored as the searching result moving-object information in the result moving-object information storage unit; a BTF moving-object image likelihood calculating unit that calculates a BTF moving-object image likelihood which is configured from a likelihood based on the moving-object image and which is a likelihood of the moving-object information including the moving-object image processed using the BTF by the BTF processing unit with respect to the moving-object image of the decision moving-object information; and a BTF moving-object image threshold determining unit that determines whether each BTF moving-object image likelihood calculated by the BTF moving-object image likelihood calculating unit is less than a predetermined threshold. The time-space likelihood threshold determining unit may determine whether a time-space likelihood newly calculated by the time-space likelihood calculating unit is less than the predetermined threshold. The BTF moving-object image threshold determining unit may determine whether each BTF moving-object image likelihood calculated by the BTF moving-object image likelihood calculating unit is less than the predetermined threshold when the newly calculated time-space likelihood is not less than the predetermined threshold, and erase the moving-object information including the moving-object image for which the BTF moving-object image likelihood is less than the predetermined threshold from the searching result moving-object information storage unit when the BTF moving-object image likelihood is less than the predetermined threshold.

(4) In the information processing apparatus described in (1) or (2), the moving-object image likelihood calculating unit may calculate similarity indicating a degree of similarity of each moving object as the moving-object image likelihood based on a moving-object image included in each of the moving-object image of the searching target moving-object information, which is the moving-object information including the moving-object image of the moving object which is the searching target, and the moving-object image included in the moving-object information other than the searching contrast moving-object information.

(5) In the information processing apparatus described in any one of (1), (2), and (4), the time-space likelihood calculating unit may calculate the time-space likelihood from a relation between a time between the imaging times and a necessary time taken to travel a distance between the space position coordinates of the moving-object information other than the decision moving-object information and the decision moving-object information for which the decision information is input at an average human movement speed.

(6) There is provided an information processing method of an information processing apparatus including a plurality of imaging units that each capture an image, detect a moving object, extract a moving-object image configured from the image of the detected moving object, detect space position coordinates of the moving object based on the moving-object image, and output the moving-object image and moving-object information including the space position coordinates of the moving object and an imaging time at which the image is captured. The information processing method includes: a moving-object image likelihood calculating process of calculating a moving-object image likelihood which is a likelihood of a moving-object image included in moving-object information other than searching target moving-object information, which is moving-object information including the moving-object image of the moving object which is a searching target, with respect to a moving-object image of the searching contrast moving-object information; a moving-object image threshold determining process of determining whether each moving-object image likelihood calculated by the moving-object image likelihood calculating process is greater than a predetermined threshold and searching for the moving-object information of the moving-object image likelihood greater than the predetermined threshold as searching result moving-object information, which is moving-object information including the moving-object image of the same moving object as the moving object of the moving-object image of the searching target moving-object information; a searching result moving-object information storage process of storing the moving-object information searched for as the searching result moving-object information by the moving-object image threshold determining process; an operation input process of receiving an input of decision information used for a user to decide the searching target moving-object information among the moving-object information stored as the searching result moving-object information in the result moving-object information storage process based on the moving-object image; a time-space likelihood calculating process of calculating a time-space likelihood which is configured from a likelihood based on the space position coordinates and the imaging time and which is a likelihood of the moving-object information other than decision moving-object information, which is moving-object information for which the decision information is input, with respect to the decision moving-object information for which the decision information is input, among the moving-object information stored as the searching result moving-object information in the result moving-object information storage process; and a time-space likelihood threshold determining process of determining whether each time-space likelihood calculated by the time-space likelihood calculating process is less than a predetermined threshold and erasing the moving-object information of the time-space likelihood less than the predetermined threshold from the moving-object information stored in the searching result moving-object information storage process.

(7) There is provided a program of a computer controlling an information processing apparatus including a plurality of imaging units that each capture an image, detect a moving object, extract a moving-object image configured from the image of the detected moving object, detect space position coordinates of the moving object based on the moving-object image, and output the moving-object image and moving-object information including the space position coordinates of the moving object and an imaging time at which the image is captured. The program causes the computer to perform: a moving-object image likelihood calculating step of calculating a moving-object image likelihood which is a likelihood of a moving-object image included in moving-object information other than searching target moving-object information, which is moving-object information including the moving-object image of the moving object which is a searching target, with respect to a moving-object image of the searching contrast moving-object information; a moving-object image threshold determining step of determining whether each moving-object image likelihood calculated by a process of the moving-object image likelihood calculating step is greater than a predetermined threshold and searching for the moving-object information of the moving-object image likelihood greater than the predetermined threshold as searching result moving-object information, which is moving-object information including the moving-object image of the same moving object as the moving object of the moving-object image of the searching target moving-object information; a searching result moving-object information storage step of storing the moving-object information searched for as the searching result moving-object information by a process of the moving-object image threshold determining step; an operation input step of receiving an input of decision information used for a user to decide the searching target moving-object information among the moving-object information stored as the searching result moving-object information in a process of the result moving-object information storage step based on the moving-object image; a time-space likelihood calculating step of calculating a time-space likelihood which is configured from a likelihood based on the space position coordinates and the imaging time and which is a likelihood of the moving-object information other than decision moving-object information, which is moving-object information for which the decision information is input, with respect to the decision moving-object information for which the decision information is input, among the moving-object information stored as the searching result moving-object information in the process of the result moving-object information storage step; and a time-space likelihood threshold determining step of determining whether each time-space likelihood calculated by a process of the time-space likelihood calculating step is less than a predetermined threshold and erasing the moving-object information of the time-space likelihood less than the predetermined threshold from the moving-object information stored in the process of the searching result moving-object information storage step.

(8) An information processing apparatus includes: a plurality of imaging units that each capture an image, detect a person, extract a person image configured from the image of the detected person, detect space position coordinates of the person based on the person image, and output the person image and personal information including the space position coordinates of the person and an imaging time at which the image is captured; a person image likelihood calculating unit that calculates a person image likelihood which is a likelihood of a person image included in person information other than searching target person information, which is person information including the person image of the person which is a searching target, with respect to a person image of the searching contrast person information; a person image threshold determining unit that determines whether each person image likelihood calculated by the person image likelihood calculating unit is greater than a predetermined threshold and searches for the person information of the person image likelihood greater than the predetermined threshold as searching result person information, which is person information including the person image of the same person as the person of the person image of the searching target person information; a searching result person information storage unit that stores the person information searched for as the searching result person information by the person image threshold determining unit; an operation input unit that receives an input of decision information used for a user to decide the searching target person information among the person information stored as the searching result person information in the result person information storage unit based on the person image; a time-space likelihood calculating unit that calculates a time-space likelihood which is configured from a likelihood based on the space position coordinates and the imaging time and is a likelihood of the person information other than decision person information, which is person information for which the decision information is input, with respect to the decision person information for which the decision information is input, among the person information stored as the searching result person information in the result person information storage unit; and a time-space likelihood threshold determining unit that determines whether each time-space likelihood calculated by the time-space likelihood calculating unit is less than a predetermined threshold and erases the person information of the time-space likelihood less than the predetermined threshold from the searching result person information storage unit.

(9) In the information processing apparatus described in (8), after the time-space likelihood threshold determining unit determines whether each time-space likelihood calculated by the time-space likelihood calculating unit is less than the predetermined threshold, the operation input unit may receive an input of decision information used for the user to newly decide the searching target person information based on the person image among the person information stored as the searching result person information in the result person information storage unit. The time-space likelihood calculating unit may newly calculate a time-space likelihood which is configured from the likelihood based on the space position coordinates and the imaging time and which is a likelihood of the person information other than the decision person information with respect to the decision person information for which the decision information is newly input, among the person information stored as the searching result person information in the result person information storage unit. The time-space likelihood threshold determining unit may determine whether each time-space likelihood newly calculated by the time-space likelihood calculating unit is less than the predetermined threshold and erase the person information of the time-space likelihood less than the predetermined threshold from the searching result person information storage unit. The operation input unit, the time-space likelihood calculating unit, and the time-space likelihood threshold determining unit may repeat the same processes whenever decision information is newly input by the operation input unit.

(10) In the information processing apparatus described in (9), the person information may further include an ID identifying one of the plurality of imaging units capturing the person image to be included. The information processing apparatus may further include: a BTF calculating unit that calculates a BTF (Brightness Transfer Function) of correcting a change in a color between the imaging units based on the two person images with different IDs identifying the plurality of imaging units each capturing the person image in the searching target person information, which is the person information including the person image of the person which is the searching target, and the decision person information for which the input of the decision information used to decide the searching target person information is received; a BTF processing unit that performs the BTF on the person image of the person information including the person image captured by the imaging unit with the ID for which the BTF is obtained, among the person information other than the decision person information among the person information stored as the searching result person information in the result person information storage unit; a BTF person image likelihood calculating unit that calculates a BTF person image likelihood which is configured from a likelihood based on the person image and which is a likelihood of the person information including the person image processed using the BTF by the BTF processing unit with respect to the person image of the decision person information; and a BTF person image threshold determining unit that determines whether each BTF person image likelihood calculated by the BTF person image likelihood calculating unit is less than a predetermined threshold. The time-space likelihood threshold determining unit may determine whether a time-space likelihood newly calculated by the time-space likelihood calculating unit is less than the predetermined threshold. The BTF person image threshold determining unit may determine whether each BTF person image likelihood calculated by the BTF person image likelihood calculating unit is less than the predetermined threshold when the newly calculated time-space likelihood is not less than the predetermined threshold, and erase the person information including the person image for which the BTF person image likelihood is less than the predetermined threshold from the searching result person information storage unit when the BTF person image likelihood is less than the predetermined threshold.

(11) The information processing apparatus described in (10) may further include: a same-person information retaining unit that retains searching target person information which is person information including the person image of the person that is the searching target and decision person information for which an input of decision information used to decide the searching target person information is received, as person information of the same person as the searching target person; an other-person information retaining unit that retains, as other-person information which is person information of a person other than the searching target person, person information including a person image of which each time-space likelihood newly calculated by the time-space likelihood calculating unit is less than the predetermined threshold or each BTF person image likelihood calculated by the BTF person image likelihood calculating unit is less than the predetermined threshold; a unique feature searching unit that selects a unique feature used to search for the searching target person by learning based on the person image of the person information retained in the same-person information retaining unit and the person image of the person information retained in the other-person information retaining unit; a unique feature likelihood calculating unit that calculates a unique feature likelihood which is a likelihood based on the unique feature of the person image included in the person information other than the searching contrast person information with respect to the person image of the searching target person information; and a unique feature likelihood threshold determining unit that determines whether each unique feature likelihood calculated by the unique feature likelihood calculating unit is less than a predetermined threshold and erases the person information of the unique feature likelihood less than the predetermined threshold from the searching result person information storage unit. The time-space likelihood threshold determining unit may determine whether each time-space likelihood newly calculated by the time-space likelihood calculating unit is less than the predetermined threshold. The BTF person image threshold determining unit may determine whether each BTF person image likelihood calculated by the BTF person image likelihood calculating unit is less than the predetermined threshold when the newly calculated time-space likelihood is not less than the predetermined threshold. The unique feature likelihood threshold determining unit may determine whether each unique feature likelihood calculated by the unique feature likelihood calculating unit is less than the predetermined threshold and erase the person information of the unique feature likelihood less than the predetermined threshold from the searching result person information storage unit when the BTF person image likelihood is not less than the predetermined threshold.

(12) In the information processing apparatus described in (11), when the person information of the unique feature likelihood less than the predetermined threshold is erased from the searching result person information storage unit by the unique feature likelihood threshold determining unit, the other-person information retaining unit may retain the person information of the unique feature likelihood less than the predetermined threshold as other-person information which is person information of the other person.

(13) In the information processing apparatus described in (8), the unique feature searching unit may select, as the unique feature, a feature amount by which a likelihood between the person image of the person information retained in the same-person information retaining unit and the person image of the searching target person increases and by which a likelihood between the person image of the person information retained in the other-person information retaining unit and the person image of the searching target person, by the learning based on the person image of the person information retained in the same-person information retaining unit and the person image of the person information retained in the other-person information retaining unit.

(14) In the information processing apparatus described in (8), the unique feature likelihood calculating unit may calculate, as the unique feature likelihood, similarity indicating a degree of similarity of each person based on a unique feature of a person image included in each of the person image of the searching target person information, which is the person information including the person image of the person that is the searching target, and the person image included in the person information other than the searching contrast person information.

(15) In the information processing apparatus described in (8), the person image likelihood calculating unit may calculate similarity indicating a degree of similarity of each person as the person image likelihood based on a person image included in each of the person images of the searching target person information, which is the person information including the person image of the person that is the searching target, and the person image included in the person information other than the searching contrast person information.

(16) In the information processing apparatus described in (8), the time-space likelihood calculating unit may calculate the time-space likelihood from a relation between a time between the imaging times and a necessary time taken to travel a distance between the space position coordinates of the person information other than the decision person information and the decision person information for which the decision information is input at an average human movement speed.

(17) There is provided an information processing method of an information processing apparatus including a plurality of imaging units that each capture an image, detect a person, extract a person image configured from the image of the detected person, detect space position coordinates of the person based on the person image, and output the person image and personal information including the space position coordinates of the person and an imaging time at which the image is captured. The information processing method includes: a person image likelihood calculating process of calculating a person image likelihood which is a likelihood of a person image included in person information other than searching target person information, which is person information including the person image of the person which is a searching target, with respect to a person image of the searching contrast person information; a person image threshold determining process of determining whether each person image likelihood calculated by the person image likelihood calculating process is greater than a predetermined threshold and searching for the person information of the person image likelihood greater than the predetermined threshold as searching result person information, which is person information including the person image of the same person as the person of the person image of the searching target person information; a searching result person information storage process of storing the person information searched for as the searching result person information by the person image threshold determining process; an operation input process of receiving an input of decision information used for a user to decide the searching target person information among the person information stored as the searching result person information in the result person information storage process based on the person image; a time-space likelihood calculating process of calculating a time-space likelihood which is configured from a likelihood based on the space position coordinates and the imaging time and which is a likelihood of the person information other than decision person information, which is person information for which the decision information is input, with respect to the decision person information for which the decision information is input, among the person information stored as the searching result person information in the result person information storage process; and a time-space likelihood threshold determining process of determining whether each time-space likelihood calculated by the time-space likelihood calculating process is less than a predetermined threshold and erasing the person information of the time-space likelihood less than the predetermined threshold from the person information stored in the searching result person information storage process.

(18) There is provided a program of a computer controlling an information processing apparatus including a plurality of imaging units that each capture an image, detect a person, extract a person image configured from the image of the detected person, detect space position coordinates of the person based on the person image, and output the person image and personal information including the space position coordinates of the person and an imaging time at which the image is captured. The program causes the computer to perform: a person image likelihood calculating step of calculating a person image likelihood which is a likelihood of a person image included in person information other than searching target person information, which is person information including the person image of the person which is a searching target, with respect to a person image of the searching contrast person information; a person image threshold determining step of determining whether each person image likelihood calculated by a process of the person image likelihood calculating step is greater than a predetermined threshold and searching for the person information of the person image likelihood greater than the predetermined threshold as searching result person information, which is person information including the person image of the same person as the person of the person image of the searching target person information; a searching result person information storage step of storing the person information searched for as the searching result person information by a process of the person image threshold determining step; an operation input step of receiving an input of decision information used for a user to decide the searching target person information among the person information stored as the searching result person information in a process of the result person information storage step based on the person image; a time-space likelihood calculating step of calculating a time-space likelihood which is configured from a likelihood based on the space position coordinates and the imaging time and which is a likelihood of the person information other than decision person information, which is person information for which the decision information is input, with respect to the decision person information for which the decision information is input, among the person information stored as the searching result person information in the process of the result person information storage step; and a time-space likelihood threshold determining step of determining whether each time-space likelihood calculated by a process of the time-space likelihood calculating step is less than a predetermined threshold and erasing the person information of the time-space likelihood less than the predetermined threshold from the searching result person information storage unit.

REFERENCE SIGNS LIST

1 MONITORING SYSTEM, 11, 11-1 to 11-n MONITORING CAMERA, 12 HUMAN SEARCHING AND TRACKING SERVER, 13 NETWORK, 31 IMAGING UNIT, 32 MOVING-OBJECT DETECTION UNIT, 33 FOREGROUND IMAGE EXTRACTING UNIT, 34 CAMERA ID, 35 IMAGING POSITION COORDINATE CALCULATING UNIT, 36 IMAGING TIME DETECTING UNIT, 37 MOVING-OBJECT INFORMATION OUTPUT UNIT, 51 MOVING-OBJECT INFORMATION ACQUIRING UNIT, 52 MOVING-OBJECT INFORMATION FILTERING PROCESSING UNIT, 53 MOVING-OBJECT INFORMATION RETAINING UNIT, 54 MOVING-OBJECT INFORMATION LIKELIHOOD CALCULATION PROCESSING UNIT, 55 MOVING-OBJECT INFORMATION LIKELIHOOD THRESHOLD DETERMINING UNIT, 56 RESULT STORAGE UNIT, 57 DISPLAY IMAGE GENERATING UNIT, 58 DISPLAY UNIT, 59 MATCHING AMENDMENT PROCESSING UNIT, 60 OPERATION INPUT UNIT, 71 DETECTED-FRAME SIZE DETERMINING UNIT, 72 FOREGROUND BIAS DETERMINING UNIT, 73 FOREGROUND-AND-BACKGROUND CORRELATION DETERMINING UNIT, 74 EDGE LENGTH DETERMINING UNIT, 75 PLURAL NUMBER-OF-PERSONS DETERMINING UNIT, 91 OPERATION INPUT RECOGNIZING UNIT, 92 BTF CALCULATING UNIT, 93 TIME-SPACE LIKELIHOOD CALCULATING UNIT, 94 TIME-SPACE LIKELIHOOD THRESHOLD DETERMINING UNIT, 95 BTF IMAGE PROCESSING UNIT, 96 BTF IMAGE LIKELIHOOD CALCULATING UNIT, 97 BTF IMAGE LIKELIHOOD THRESHOLD DETERMINING UNIT

The invention claimed is:
1. An information processing apparatus, comprising:
a plurality of imaging circuits, each configured to
  capture an image;
  detect a moving object in the image;
  extract a moving-object image of the moving object from the image;
  detect space position coordinates of the moving object based on the moving-object image; and
  output moving-object information, the moving-object information including the moving-object image, the space position coordinates and an imaging time at which the image is captured; and
processing circuitry configured to
  calculate, for each moving-object information received from the plurality of imaging circuits, a moving-object image likelihood that the moving-object image included in the moving-object information is a searching target with respect to searching target moving-object information, the searching target moving-object information including a moving-object image of the searching target;
  determine whether each calculated moving-object image likelihood is greater than a predetermined threshold and searches for the moving-object infor- mation of the moving-object image likelihood greater than the predetermined threshold as searching result moving-object information, the searching result moving-object information including the moving-object image of the same moving object as the moving-object image of the searching target moving-object information;

store the moving-object information searched for as the searching result moving-object information;

receive decision information, via input from a user, to confirm the moving-object information stored as the searching result moving-object information;

calculate, for each moving-object information stored as the searching result moving-object information and not confirmed according to the decision information, a time-space likelihood based on the space position coordinates and the imaging time, that the moving-object image included in the moving-object information is the searching target;

determine whether each calculated time-space likelihood is less than a predetermined threshold; and erase the stored moving-object information for which the time-space likelihood is less than the predetermined threshold, wherein the moving-object information that is erased includes information about a moving-object that is not simultaneously present with a confirmed moving-object.

2. The information processing apparatus according to claim 1, wherein the processing circuitry is configured to receive, after determining whether each time-space likelihood is less than the predetermined threshold, second decision information from the user to newly confirm the moving-object information stored as the searching result moving-object information, calculate, for each moving-object information stored as the searching result moving-object information and not confirmed according to the second decision information, a second time-space likelihood based on the space position coordinates and the imaging time, that the moving-object image included in the moving-object information is the searching target, determine whether each calculated second time-space likelihood is less than the predetermined threshold, erase the stored moving-object information for which the time-space likelihood is less than the predetermined threshold, and repeat the calculating, determining and erasing when the processing circuitry receives new decision information.

3. The information processing apparatus according to claim 2, wherein the moving-object information further includes an ID that identifies one of the plurality of imaging circuits that captures the moving-object image included in the moving-object information, the processing circuitry is further configured to calculate a brightness transfer function (BTF) to correct a change in a color between the imaging circuits based on two moving-object images with different IDs in the searching target moving-object information;

perform the BTF on the moving-object image of the moving-object information including the moving-object image captured by the imaging circuit with the ID for which the BTF is obtained;

calculate a BTF moving-object image likelihood based on the moving-object image, the BTF moving-object image likelihood including the moving-object image processed using the BTF with respect to the moving-object image confirmed according to the decision information; and determine whether each BTF moving-object image likelihood is less than a predetermined threshold, the processing circuitry determines whether a time-space likelihood newly calculated is less than the predetermined threshold, and the processing circuitry determines whether each calculated BTF moving-object image likelihood is less than the predetermined threshold when the newly calculated time-space likelihood is not less than the predetermined threshold, and erases the stored moving-object information including the moving-object image for which the BTF moving-object image likelihood is less than the predetermined threshold when the BTF moving-object image likelihood is less than the predetermined threshold.

4. The information processing apparatus according to claim 1, wherein the processing circuitry calculates similarity indicating a degree of similarity of each moving object as the moving-object image likelihood based on the moving-object images.

5. The information processing apparatus according to claim 1, wherein the processing circuitry calculates the time-space likelihood from a relation between a time between the imaging times and a necessary time taken to travel a distance between the space position coordinates of the moving-object information not confirmed according to the decision information and the moving-object information that is confirmed according to the decision information at an average human movement speed.

6. An information processing method of an information processing apparatus including a plurality of imaging circuits that each capture an image, detect a moving object in the image, extract a moving-object image of the moving object from the image, detect space position coordinates of the moving object based on the moving-object image, and output moving-object information, moving-object information including the moving-object image, the space position coordinates and an imaging time at which the image is captured, the information processing method comprising:

calculating, by processing circuitry of the information processing apparatus for each moving-object information received from the plurality of imaging circuits, a moving-object image likelihood that the moving-object image included in the moving-object information is a searching target with respect to searching target moving-object information, the searching target moving-object information including a moving-object image of the searching target;

determining, by the processing circuitry, whether each calculated moving-object image likelihood is greater than a predetermined threshold;

searching for the moving-object information of the moving-object image likelihood greater than the predetermined threshold as searching result moving-object information, the searching result moving-object information including the moving-object image of the same moving object as the moving-object image of the searching target moving-object information;

storing the moving-object information searched for as the searching result moving-object information;

receiving decision information, via an input from a user, to confirm the moving-object information stored as the searching result moving-object information;

calculating, by the processing circuitry for each moving-object information stored as the searching result moving-object information and not confirmed according to the decision information, a time-space likelihood based on the space position coordinates and the imaging time, that the moving-object image included in the moving-object information is the searching target;

determining, by the processing circuitry, whether each calculated time-space likelihood is less than a predetermined threshold, and erasing the stored moving-object information for which the time-space likelihood is less than the predetermined threshold, wherein the moving-object information that is erased includes information about a moving-object that is not simultaneously present with a confirmed moving-object.

7. A non-transitory computer readable medium storing computer executable instructions that, when executed by processing circuitry of a computer controlling an information processing apparatus including a plurality of imaging circuits that each capture an image, detect a moving object in the image, extract a moving-object image of the moving object from the image, detect space position coordinates of the moving object based on the moving-object image, and output moving-object information, the moving-object information including the moving-object image, the space position coordinates and an imaging time at which the image is captured, cause the processing circuitry to:

calculate, for each moving-object information received from the plurality of imaging circuits, a moving-object image likelihood that the moving-object image included in the moving-object information is a searching target with respect to searching target moving-object information, the searching target moving-object information including a moving-object image of the searching target;

determine whether each calculated moving-object image likelihood is greater than a predetermined threshold;

search for the moving-object information of the moving-object image likelihood greater than the predetermined threshold as searching result moving-object information, the searching result moving-object information including the moving-object image of the same moving object as the moving-object image of the searching target moving-object information;

store the moving-object information searched for as the searching result moving-object information;

receive decision information, via an input from a user, to confirm the moving-object information stored as the searching result moving-object information;

calculate, for each moving-object information stored as the searching result moving-object information and not confirmed according to the decision information, a time-space likelihood based on the space position coordinates and the imaging time that the moving-object image included in the moving-object information is the searching target;

determine whether each calculated time-space likelihood is less than a predetermined threshold; and erase the stored moving-object information for which the time-space likelihood is less than the predetermined threshold, wherein the moving-object information that is erased includes information about a moving-object that is not simultaneously present with a confirmed moving-object.

8. An information processing apparatus, comprising:
a plurality of imaging circuits, each configured to
capture an image;
detect a person in the image;
extract a person image of the person from the image;
detect space position coordinates of the person based on the person image; and
output person information, the person information including the person image, the space position coordinates and an imaging time at which the image is captured; and processing circuitry configured to
calculate, for each person information received from the plurality of imaging circuits, a person image likelihood that the person image included in the person information is a searching target with respect to searching target person information, the searching target person information including a person image of the searching target;

determine whether each calculated person image likelihood is greater than a predetermined threshold and searches for the person information of the person image likelihood greater than the predetermined threshold as searching result person information, the searching result person information including the person image of the same person as the person image of the searching target person information;

store the person information searched for as the searching result person information;

receive decision information, via input from a user, to confirm the person information stored as the searching result person information;

calculate, for each person information stored as the searching result person information and not confirmed according to the decision information, a time-space likelihood based on the space position coordinates and the imaging time, that the person image included in the person information is the searching target;

determine whether each calculated time-space likelihood is less than a predetermined threshold; and erase the stored person information for which the time-space likelihood is less than the predetermined threshold, wherein the person information that is erased includes information about a person that is not simultaneously present with a confirmed person.

9. The information processing apparatus according to claim 8, wherein the processing circuitry is configured to
receive, after determining whether each time-space likelihood is less than the predetermined threshold, second decision information from the user to newly confirm the person image among the person information stored as the searching result person information, calculate, for each person information stored as the searching result person information and not confirmed according to the second decision information, a second time-space likelihood based on the space position coordinates and the imaging time, that the person image included in the person information is the searching target, determine whether each calculated second time-space likelihood is less than the predetermined threshold, erase the stored person information for which the time-space likelihood is less than the predetermined threshold, and repeat the calculating, determining and erasing when the processing circuitry receives new decision information.

10. The information processing apparatus according to claim 9, wherein
the person information further includes an ID that identifies one of the plurality of imaging circuits that captures the person image included in the person information,
the processing circuitry is further configured to
calculate a brightness transfer function (BTF) to correct a change in a color between the imaging circuits based on two person images with different IDs in the searching target person information;
perform the BTF on the person image of the person information including the person image captured by the imaging circuit with the ID for which the BTF is obtained;
calculate a BTF person image likelihood based on the person image, the BTF person likelihood including the person image processed using the BTF with respect to the person image confirmed according to the decision information; and
determine whether each BTF person image likelihood is less than a predetermined threshold,
the processing circuitry determines whether a time-space likelihood newly calculated is less than the predetermined threshold, and
the processing circuitry determines whether each calculated BTF person image likelihood is less than the predetermined threshold when the newly calculated time-space likelihood is not less than the predetermined threshold, and erases the stored person information including the person image for which the BTF person image likelihood is less than the predetermined threshold when the BTF person image likelihood is less than the predetermined threshold.

11. The information processing apparatus according to claim 10, wherein the processing circuitry is configured to
retain searching target person information, as person information of the same person as the searching target person, the searching target person information including the person image of the person that is the searching target and confirmed according to the decision information;
retain, as other-person information which is person information of a person other than the searching target person, person information including a person image of which each calculated time-space likelihood is less than the predetermined threshold or each calculated BTF person image likelihood is less than the predetermined threshold;
select a unique feature used to search for the searching target person by learning based on the person image of the person information and the person image of the other-person information;
calculate a unique feature likelihood based on the unique feature of the person image included in the other-person information with respect to the person image of the searching target person information;
determine whether each unique feature likelihood is less than a predetermined threshold and erase the person information of the unique feature likelihood is less than the predetermined threshold,
determine whether each time-space likelihood newly calculated is less than the predetermined threshold,
determine whether each BTF person image likelihood is less than the predetermined threshold when the newly calculated time-space likelihood is not less than the predetermined threshold, and
determine whether each unique feature likelihood is less than the predetermined threshold and erase the person information of the unique feature likelihood is less than the predetermined threshold when the BTF person image likelihood is not less than the predetermined threshold.

12. The information processing apparatus according to claim 11, wherein when the person information of the unique feature likelihood is less than the predetermined threshold is erased, the processing circuitry retains the person information of the unique feature likelihood that is less than the predetermined threshold as other-person information.

13. The information processing apparatus according to claim 8, wherein the processing circuitry selects, as the unique feature, a feature amount by which a likelihood between the person image of the person information and the person image of the searching target person increases and by which a likelihood between the person image of the other-person information and the person image of the searching target person, by the learning based on the person image of the person information and the person image of the other-person information.

14. The information processing apparatus according to claim 8, wherein processing circuitry calculates, as the unique feature likelihood, similarity indicating a degree of similarity of each person based on a unique feature of a person image included in each of the person images.

15. The information processing apparatus according to claim 8, wherein the processing circuitry calculates similarity indicating a degree of similarity of each person as the person image likelihood based on the person images.

16. The information processing apparatus according to claim 8, wherein the processing circuitry calculates the time-space likelihood from a relation between a time between the imaging times and a necessary time taken to travel a distance between the space position coordinates of the person information not confirmed according to the decision information and the person information that is confirmed according to the decision information at an average human movement speed.

17. An information processing method of an information processing apparatus including a plurality of imaging circuits that each capture an image, detect a person in the image, extract a person image of the person from the image, detect space position coordinates of the person based on the person image, and output person information, the person information including the person image, the space position coordinates of the person and an imaging time at which the image is captured, the information processing method comprising:
calculating, by processing circuitry of the information processing apparatus for each person information received from the plurality of imaging circuits, a person image likelihood that the person image included in the person information is a searching target with respect to searching target person information, the searching target person information including a person image of the searching target;
determining, by the processing circuitry, whether each calculated person image likelihood is greater than a predetermined threshold;
searching for the person information of the person image likelihood greater than the predetermined threshold as searching result person information, the searching result person information including the person image of the same person as the person image of the searching target person information;
storing the person information searched for as the searching result person information;

receiving decision information, via an input from a user, to confirm the person information stored as the searching result person information;

calculating, by the processing circuitry for each person information stored as the searching result person information and not confirmed according to the decision information, a time-space likelihood based on the space position coordinates and the imaging time, the person image included in the person information is the searching target;

determining, by the processing circuitry, whether each calculated time-space likelihood is less than a predetermined threshold; and erasing the stored person information for which the time-space likelihood is less than the predetermined threshold, wherein the person information that is erased includes information about a person that is not simultaneously present with a confirmed person.

18. A non-transitory computer readable medium storing computer executable instructions that, when executed by processing circuitry of a computer controlling an information processing apparatus including a plurality of imaging circuits that each capture an image, detect a person in the image, extract a person image of the person from the image, detect space position coordinates of the person based on the person image, and output person information, the person information including the person image, the space position coordinates and an imaging time at which the image is captured, cause the processing circuitry to:

calculate, for each person information received from the plurality of imaging circuits, a person image likelihood that the person image included in the person information is a searching target with respect to searching target person information, the searching target person information including a person image of the searching target determine whether each calculated person image likelihood is greater than a predetermined threshold;

search for the person information of the person image likelihood greater than the predetermined threshold as searching result person information, the searching result person information including the person image of the same person as the person image of the searching target person information;

store the person information searched for as the searching result person information;

receive decision information, via an input from a user, to confirm the person information stored as the searching result person information;

calculate, for each person information stored as the searching result person information and not confirmed according to the decision information, a time-space likelihood based on the space position coordinates and the imaging time, that person information is the searching target;

determine whether each calculated time-space likelihood is less than a predetermined threshold; and erase the stored person information for which the time-space likelihood is less than the predetermined threshold, wherein the person information that is erased includes information about a person that is not simultaneously present with a confirmed person.

\* \* \* \* \*